(12) United States Patent
Rukes et al.

(10) Patent No.: US 10,602,035 B2
(45) Date of Patent: Mar. 24, 2020

(54) TEMPERATURE-CONTROLLED CAMERA ASSEMBLY

(71) Applicant: GOOGLE LLC, Mountain View, CA (US)

(72) Inventors: Jason Rukes, Mountain View, CA (US); Tyler Wilson, San Francisco, CA (US); Amber Volmering, Cupertino, CA (US); William Dong, Palo Alto, CA (US); Jeffrey Law, San Francisco, CA (US); Jason Goulden, Los Gatos, CA (US); Guangxun Liao, San Jose, CA (US); Kevin Edward Booth, Mountain View, CA (US); Dietrich Ho, Mountain View, CA (US); Daniel Patrick Foran, San Francisco, CA (US); Oliver Mueller, San Francisco, CA (US); Mark Kraz, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/793,908

(22) Filed: Oct. 25, 2017

(65) Prior Publication Data
US 2019/0089872 A1    Mar. 21, 2019

Related U.S. Application Data

(60) Provisional application No. 62/560,611, filed on Sep. 19, 2017.

(51) Int. Cl.
*H04N 5/225* (2006.01)
*G03B 17/55* (2006.01)
(Continued)

(52) U.S. Cl.
CPC .......... *H04N 5/2252* (2013.01); *G03B 17/08* (2013.01); *G03B 17/55* (2013.01);
(Continued)

(58) Field of Classification Search
None
See application file for complete search history.

(56) References Cited

U.S. PATENT DOCUMENTS

| 3,165,899 A | 1/1965 | Shatto, Jr. |
| 3,351,904 A | 11/1967 | Noruk |

(Continued)

OTHER PUBLICATIONS

Google, Notification of Registration, EU 004086734, dated Jul. 14, 2017, 6 pgs.

*Primary Examiner* — James M Hannett
(74) *Attorney, Agent, or Firm* — Morgan, Lewis & Bockius LLP

(57) ABSTRACT

The various implementations described herein include a video camera assembly that includes: (1) a housing; (2) an image sensor encased in the housing and configured to capture activity of the smart home environment; (3) a wireless radio configured to transmit video frames captured by the image sensor to an electronic device via a remote server; (4) at least one infrared transmitter configured to selectively illuminate the smart home environment; (5) one or more circuit boards encased in the housing, the one or more circuit boards including at least one processor mounted thereon; and (6) a heating component coupled to the image sensor, the heating component configured to continuously maintain the image sensor at a temperature above a threshold temperature while the image sensor is capturing the activity of the smart home environment.

30 Claims, 26 Drawing Sheets

(51) Int. Cl.
    *G08B 13/196*     (2006.01)
    *H04N 5/33*     (2006.01)
    *G03B 17/08*     (2006.01)

(52) U.S. Cl.
    CPC ... *G08B 13/19626* (2013.01); *H04N 5/22521* (2018.08); *H04N 5/33* (2013.01); *G03B 2206/00* (2013.01)

(56) References Cited

U.S. PATENT DOCUMENTS

| | | | |
|---|---|---|---|
| 4,498,038 | A | 2/1985 | Malueg |
| 5,201,896 | A | 4/1993 | Kruszewski |
| 5,790,910 | A | 8/1998 | Haskin |
| 7,736,071 | B2 | 6/2010 | Wahl et al. |
| 8,267,361 | B1 | 9/2012 | Dordick |
| 9,718,405 | B1* | 8/2017 | Englander ............... G01S 19/13 |
| 2002/0131781 | A1 | 9/2002 | Buck |
| 2003/0174865 | A1* | 9/2003 | Vernon ................ G06K 9/2018 382/105 |
| 2004/0233623 | A1 | 11/2004 | Hillman et al. |
| 2005/0275725 | A1 | 12/2005 | Olsson et al. |
| 2007/0290117 | A1 | 12/2007 | Hetrick et al. |
| 2008/0210832 | A1 | 9/2008 | Speggiorin |
| 2009/0317071 | A1 | 12/2009 | David |
| 2010/0128165 | A1 | 5/2010 | Newcomb et al. |
| 2011/0242321 | A1 | 10/2011 | Nakajima et al. |
| 2012/0263450 | A1 | 10/2012 | Totani |
| 2013/0062228 | A1* | 3/2013 | Danilov ............. G02B 27/0006 206/216 |
| 2013/0176434 | A1 | 7/2013 | Pierce et al. |
| 2014/0240589 | A1 | 8/2014 | Hoof Van |
| 2014/0263908 | A1 | 9/2014 | Franklin |
| 2016/0119516 | A1 | 4/2016 | Clearman |
| 2016/0127643 | A1* | 5/2016 | Huerta ............... H04N 5/23241 348/211.2 |
| 2018/0091775 | A1 | 3/2018 | Jung et al. |
| 2018/0109704 | A1 | 4/2018 | Gilbert |
| 2018/0296365 | A1 | 10/2018 | Nielsen et al. |
| 2018/0325228 | A1 | 11/2018 | Leimer |
| 2019/0075225 | A1 | 3/2019 | Maggard et al. |

\* cited by examiner

TEMPERATURE-CONTROLLED CAMERA ASSEMBLY

RELATED APPLICATIONS

This application claims priority to U.S. Provisional Application No. 62/560,611, filed Sep. 19, 2017, which is hereby incorporated by reference in its entirety.

This application is related to U.S. application Ser. No. 15/710,770, filed Sep. 20, 2017, entitled "Camera Assembly with Concave-Shaped Front Face," U.S. patent application Ser. No. 15/710,758, filed Sep. 20, 2017, entitled "Mount Hinge for an Electronic Device," and U.S. patent application Ser. No. 15/710,765, filed Sep. 20, 2017, entitled "Mount Attachment for an Electronic Device," each of which is hereby incorporated by reference in its entirety.

TECHNICAL FIELD

This relates generally to camera assemblies, including but not limited to, temperature-controlled video camera assemblies.

BACKGROUND

Video surveillance cameras are used extensively. Usage of video cameras in residential and commercial environments has increased substantially, in part due to lower prices and simplicity of deployment.

As consumer demands change and the complexity of home automation and related systems increases, various new challenges, such as temperature and illumination management, arise in designing such camera products. These challenges are particularly important for outdoor products that tend to be exposed to larger temperature shifts and environmental conditions. For example, cameras having fixed-focus image sensors require that the operating temperature be within a particular range to prevent distortions and/or degraded quality in the captured images. For another example, users may desire to mount the cameras in locations where the cameras are exposed to rain and direct sunlight. For yet another example, users may desire a wide range of freedom to adjust the orientation (e.g., pitch and yaw) of the cameras after they are mounted. For yet another example, users may desire to mount the cameras in unsecure locations where the cameras are at risk of being appropriated by scofflaws.

SUMMARY

Accordingly, there is a need for systems and/or devices with more efficient, accurate, and effective methods for maintaining particular temperatures within a camera assembly; capturing, analyzing, and transmitting scenes by the camera assembly; compensating for exposure of the camera assembly to rain and/or direct sunlight; enabling a wide range of positional freedom for the camera assembly; and securing the camera assembly to structure; among other things. Such systems, devices, and methods optionally complement or replace conventional systems, devices, and methods.

The present disclosure describes compact all-weather camera implementations with high-powered on-camera processing, low-light (e.g., night-time) illumination, microphones and speakers for capturing and relaying audio information, passive cooling, active heating, waterproofing, impact resistance, pressure equalization, an ability to concurrently transmit multiple HD video streams, and an ability to wirelessly communicate with other devices over multiple protocols (e.g., Wi-Fi, Bluetooth, and IEEE 15.4). Such devices generate large amounts of heat (e.g., from the processors) and yet include heat-sensitive components, such as the image sensor. In such devices, it is important to maintain the temperature of the high-sensitive components (e.g., via active heating and passive cooling) while maintaining the compact, passively-cooled aspects of the camera(s). In addition, the camera image sensors are inherently sensitive to light, and thus it is important to keep light from the camera's illuminators, color or IR, from entering the image sensor. Components for manipulating the light from the camera's illuminators, e.g., lenses and diffusers, are important to prevent wash out or anomalies in the captured images. The implementations described herein include components configured to prevent heat and/or light from interfering with sensitive camera components.

It is desirable to have a means of maintaining the temperature of the image sensor(s) in a video camera. Image sensors are impacted by changes in ambient and/or operating temperatures. In many cases, the larger the temperature changes the bigger the impact. In particular, changes in temperature can affect the focus or sharpness of the captured images. Thus, maintaining the temperature of the image sensor(s) is of particular importance for fixed-focus cameras that do not have a means of refocusing to compensate for the temperature effects. Also, outdoor cameras may experience a wider range of temperatures (e.g., from minus 40 Celsius to 55 Celsius). Thus, maintaining the temperature of the image sensor(s) is also of particular importance for outdoor cameras. In some implementations disclosed herein, the camera(s) include an active heating component configured to maintain the image sensor(s) at desirable operating temperatures during operation of the camera(s) by selectively supplying heat to the image sensor(s). In some implementations disclosed herein, the camera(s) include passive cooling component(s) configured to maintain the image sensor(s) at desirable operating temperatures during operation of the camera(s) by dissipating heat away from the image sensor(s).

It is also desirable to have lenses (e.g., toroidal lenses) for the IR illuminators to direct the illumination to uniformly illuminate the portion of the scene in the camera's field of view as this reduces anomalies and improves the quality of images captured by the image sensor. It is also desirable to have the lenses adapted to minimize the amount of illumination sent outside of the camera's field of view. By reducing the amount of illumination sent outside of the camera's field of view, the amount and/or intensity of the IR illuminators required to provide adequate illumination is reduced. Although, for convenience, the illuminators and lenses are described herein as adapted for infrared light, in some implementations other types of non-visible illuminators and lenses are used (e.g., ultraviolet illuminators and corresponding lenses).

It is also desirable to have a concave front face (also sometimes called a cover glass or cover lens) as it inhibits water accumulation on front face, provides shading (e.g., inhibits direct sunlight) for the image sensor, and increases a quality of the images captured by the image sensor.

It is also desirable that the camera provide visual and/or audio feedback to a user (e.g., via a user interface in a smart home application, or via audio and/or visual feedback from the camera). The feedback may concern an operational status of the camera itself, the operational status of another electronic device associated with the camera, and/or the operational status of a set of electronic devices associated with the camera.

In environments in which security cameras are commonly deployed, such as in a work or home environment (indoors or outdoors), it is advantageous to configure the camera with physical features that can provide real time camera status information and/or audio/visual content that indicates or complements camera processing activity, to occupants of the environment without disturbing operation of the camera or the occupants. In some implementations, such physical features include a light ring that is provided at a periphery of the camera and is configured to be visible to occupants of the environment from a wide range of positions in the environment. For example, in some camera implementations, the light ring is configured to be visible in a range of positions that includes at least areas of the environment that fall within the camera's field of view. In some camera implementations, the light ring has a plurality of individual lighting elements, each having associated lighting characteristics that are individually controllable to reflect local camera status and/or a camera processing state/operation. In some configurations, the controllable lighting characteristics include one or more of on/off state, hue, saturation and/or brightness/intensity. In some configurations, the lighting elements are controlled individually to display an overall pattern (e.g., an entire ring or one or more portions of a ring) that can be static or dynamic (e.g., one or more rotating portions of a ring) consisting of a single displayed color or two or more different displayed colors. Each of the patterns can conform to a visual language and correspond to a camera status and/or a camera processing operation. For example, a color or a pattern of two or more different colors (static or dynamic) can indicate that the camera is on or off, has an active or inactive connection to a server (e.g., a server that performs image processing or that distributes video and notifications to remote users), is actively processing local information from the environment, or has received a notification or status information from another smart device in the home environment or a server. In camera implementations that include a speaker, the physical feature (e.g., a light ring) can be controlled by the camera to display patterns that correspond to audible beats/rhythm of music being played from the speaker in a range of colors selected to match the tempo/feeling of the music. Providing such information via light patterns is advantageous as this is readily perceived by all/most users in the environment (even if they do not have access to camera smart phone app.) without intruding on activity of occupants in the environment, as audible alerts could do.

It is also desirable that the camera have a mount that both encloses the various interconnect wires and has a wide degree of rotational freedom. Enclosing the interconnect wires reduces wear on the wires, reduces the odds of the wires being damaged, increases the aesthetics for the camera, and increases the rotational freedom of the camera. Increasing the rotational freedom of the camera increases user satisfaction with the camera as it increases the potential locations where the camera can be placed to have a desired field of view. It is also desirable for the camera mount to provide stable support for the camera, which, due to its substantial on-board processing power and communications capabilities, can be relatively heavy in comparison to its size, while also being compact and portable, so as to allow for a high degree of flexibility in placement of the camera, and to provide for stable use of the camera, or for attachment of the camera to a wide range of mounting surfaces in a wide range of orientations.

It is also desirable that the camera operate continuously, or near continuously, and thus heat generation and dissipation is very important. Accordingly, there is a need for a substantially compact electronic device to incorporate some heat dissipation mechanisms that dissipate heat generated within the electronic device away from a heat-sensitive assembly of the electronic device. Specifically, in accordance with some implementations, the heat dissipation mechanisms passively conduct heat generated by a heat-sensitive electronic assembly and/or another heat generating electronic assembly away from the heat-sensitive electronic assembly efficiently without using a fan. Given a compact form factor of the electronic device, the heat dissipation mechanisms are also configured to mechanically support the heat-sensitive electronic assembly, the heat generating electronic assembly or both without interfering with intended functions of the electronic device.

For example, the electronic device may include an Internet camera that contains a plurality of electronic assemblies in a compact housing and has various capabilities for capturing, processing and streaming video images in real time. The electronic assemblies of the Internet camera include an image sensor assembly that is configured to capture and/or process the video image. The image sensor assembly is sensitive to heat generated by itself or by another system-on-chip (SoC) assembly. To deter a detrimental impact from the heat, two separate sets of thermally conductive parts could be used to conduct heat generated by the heat generating electronic assembly (e.g., the image sensor assembly of the camera) and/or the heat-sensitive electronic assembly (e.g., the SoC assembly of the camera) away from the heat-sensitive electronic assembly, respectively. The two separate sets of thermally conductive parts are closely disposed within the compact housing while being thermally isolated from each other.

In one aspect, some implementations include camera assembly for deployment in a smart home environment. The camera assembly includes: (1) a housing; (2) an image sensor encased in the housing and configured to capture activity of the smart home environment; (3) a wireless radio configured to transmit video frames captured by the image sensor to an electronic device via a remote server; (4) at least one infrared transmitter configured to selectively illuminate the smart home environment; (5) one or more circuit boards encased in the housing, the one or more circuit boards including at least one processor mounted thereon; and (6) a heating component coupled to the image sensor, the heating component configured to continuously maintain the image sensor at a temperature above a threshold temperature while the image sensor is capturing the activity of the smart home environment.

In another aspect, some implementations include a camera assembly adapted for use in a smart home environment. The camera assembly includes: (1) a housing; (2) an image sensor positioned within the housing and having a field of view corresponding to a scene in the smart home environment; and (3) a concave-shaped front face positioned in front of the image sensor such that light from the scene passes through the front face prior to entering the image sensor. In some implementations, the front face includes: an inner section corresponding to the image sensor; and an outer section between the housing and the inner section, the outer section having a concave shape that extends from the outer periphery of the outer section to the inner periphery of the outer section. In some implementations, the concave shape extends around the entirety of the periphery. In some implementations, the housing and the front face are uniform in shape and symmetrical around a central axis.

In another aspect, some implementations include an electronic device having: (1) a base including a stem having a ball; (2) a hinge assembly coupled to an electronics module and having a socket including an interior surface that conforms to a first outer surface of the ball assembly to allow rotation and/or tipping of the socket about the ball; and (3) a biasing member coupled to the camera module and configured to impose a force on a second outer surface of the ball assembly, the second outer surface being on a side of the ball opposite the first outer surface and the force being sufficient to hold the electronics module in a set position relative to the base.

In another aspect, some implementations include an attachment mechanism for an electronic device having: (1) a mounting plate having at least one projection; and (2) a base assembly having a mounting surface configured to engage the mounting plate and including an arm assembly forming a central opening with a first position in which the arm assembly projects partially into the recess and a second position in which the central opening is larger than in the first position, the arm assembly configured to engage with and capture the at least one projection during a mounting operation in which the attachment mechanism is detachably mounted to the mounting plate, the arm assembly being concealed by the base assembly and the mounting plate when the base assembly is attached to the mounting plate, the base assembly including an actuation mechanism coupled to the arm assembly such that operation of the actuation mechanism causes movement of the arm assembly from the first position to the second position, enabling detachment of the base assembly from the mounting plate.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Figure 1:
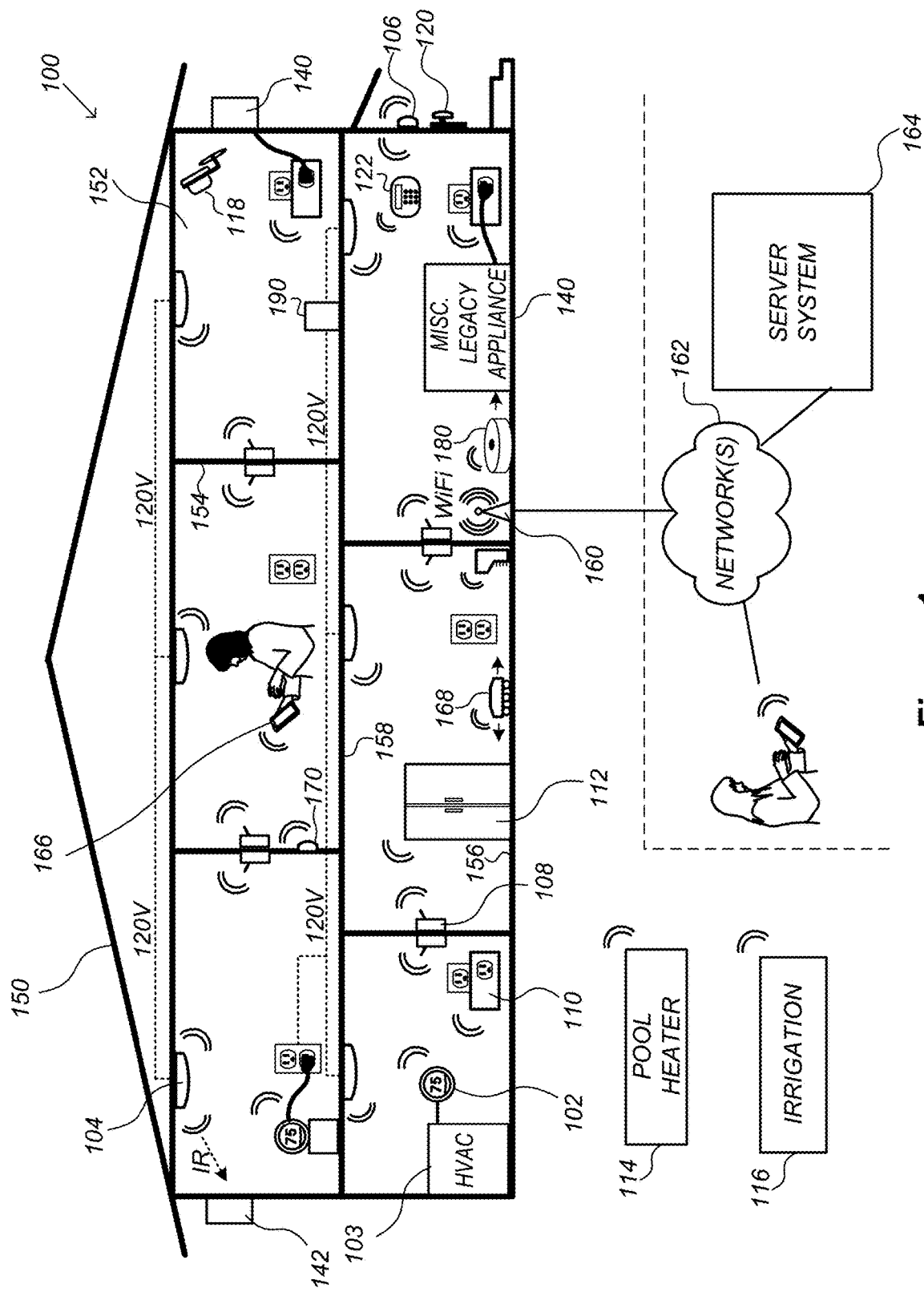
FIG. 1 is an example smart home environment in accordance with some implementations.

FIG. 1 is an example smart home environment 100 in accordance with some implementations. The smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, several devices in the smart home environment 100 need not be physically within the structure 150. For example, a device controlling a pool heater 114 or irrigation system 116 may be located outside of the structure 150.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the smart home environment 100 include intelligent, multi-sensing, network-connected devices that integrate seamlessly with each other in a smart home network (e.g., 202 FIG. 2A) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (hereinafter referred to as "smart doorbells 106" and "smart door locks 120"), and one or more intelligent, multi-sensing, network-connected alarm systems 122 (hereinafter referred to as "smart alarm systems 122").

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding blackbody radiation data as output.

The smart doorbell 106 and/or the smart door lock 120 may detect a person's approach to or departure from a location (e.g., an outer door), control doorbell/door locking functionality (e.g., receive user inputs from a portable electronic device 166-1 to actuate bolt of the smart door lock 120), announce a person's approach or departure via audio or visual means, and/or control settings on a security system (e.g., to activate or deactivate the security system when occupants go and come). In some implementations, the smart doorbell 106 includes some or all of the components and features of the camera 118. In some implementations, the smart doorbell 106 includes a camera 118.

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected camera assemblies 118 (sometimes called cameras 118) that are configured to provide video monitoring and security in the smart home environment 100. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). Cameras 118 may additionally include one or more sensors (e.g., IR sensors, motion detectors), input devices (e.g., microphone for capturing audio), and output devices (e.g., speaker for outputting audio). In some implementations, the cameras 118 are each configured to operate in a day mode and in a low-light mode (e.g., a night mode). In some implementations, the cameras 118 each include one or more IR illuminators for providing illumination while the camera is operating in the low-light mode. In some implementations, the cameras 118 include one or more outdoor cameras. In some implementations, the outdoor cameras include additional features and/or components such as weatherproofing and/or solar ray compensation.

The smart home environment 100 may additionally or alternatively include one or more other occupancy sensors (e.g., the smart doorbell 106, smart door locks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116, 118, 120, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a server system 164 (also called a central server system and/or a cloud-computing system herein). The server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the server system 164 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub device. In some implementations, hub device 180 further comprises a local storage device for storing data related to, or output by, smart devices of smart home environment 100. In some implementations, the data includes one or more of: video data output by a camera device, metadata output by a smart device, settings information for a smart device, usage logs for a smart device, and the like.

In some implementations, smart home environment 100 includes a local storage device 190 for storing data related to, or output by, smart devices of smart home environment 100. In some implementations, the data includes one or more of: video data output by a camera device (e.g., camera 118), metadata output by a smart device, settings information for a smart device, usage logs for a smart device, and the like. In some implementations, local storage device 190 is communicatively coupled to one or more smart devices via a smart home network (e.g., smart home network 202, FIG. 2A). In some implementations, local storage device 190 is selectively coupled to one or more smart devices via a wired and/or wireless communication network. In some implementations, local storage device 190 is used to store video data when external network conditions are poor. For example, local storage device 190 is used when an encoding bitrate of camera 118 exceeds the available bandwidth of the external network (e.g., network(s) 162). In some implementations, local storage device 190 temporarily stores video data from one or more cameras (e.g., camera 118) prior to transferring the video data to a server system (e.g., server system 164).

Figure 2A:
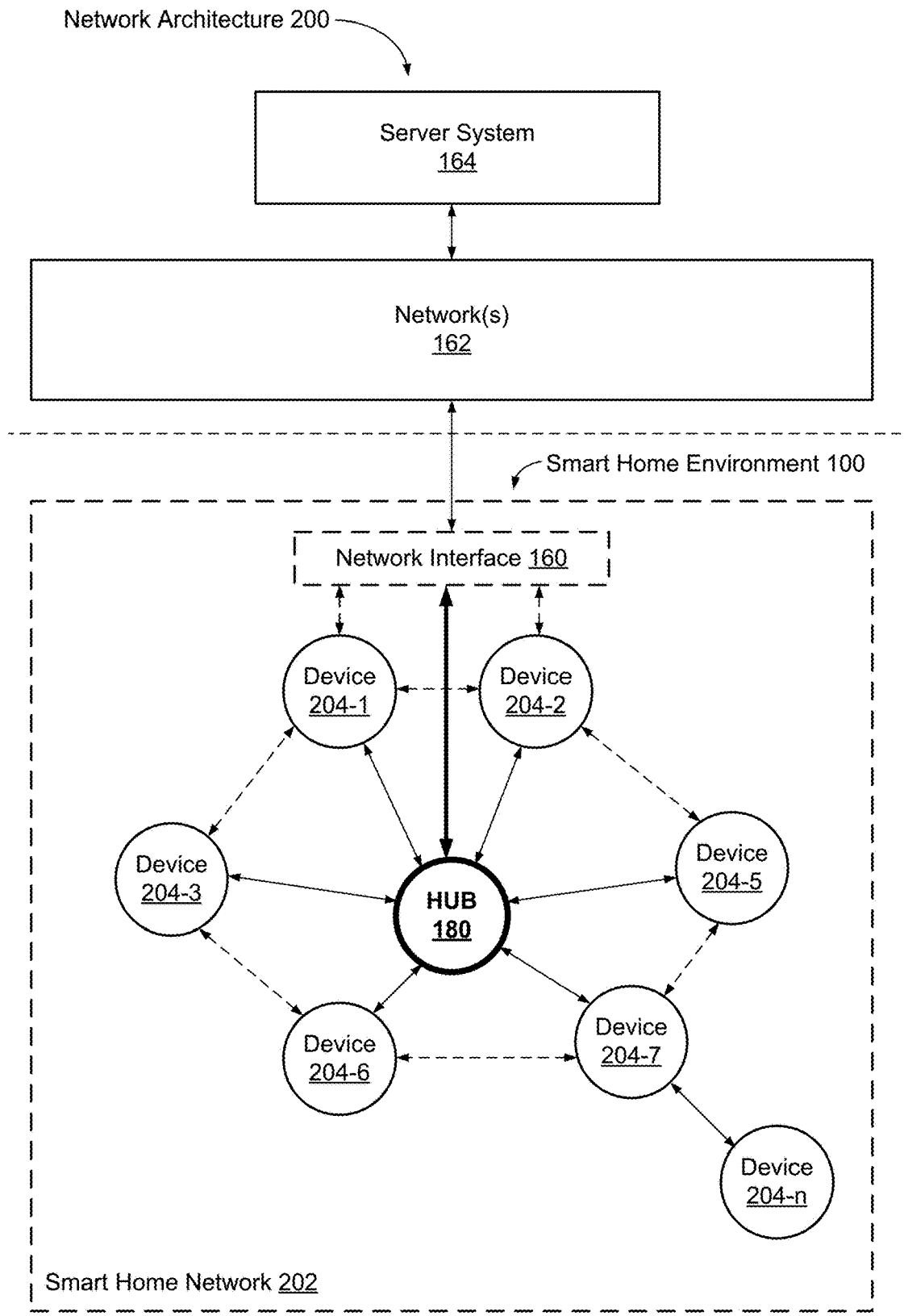
FIG. 2A is a block diagram illustrating a representative network architecture that includes a smart home network in accordance with some implementations.

FIG. 2A is a block diagram illustrating a representative network architecture 200 that includes a smart home network 202 in accordance with some implementations. In some implementations, the smart devices 204 in the smart home environment 100 (e.g., devices 102, 104, 106, 108, 110, 112, 114, 116, 118, 120, and/or 122) combine with the hub device 180 to create a mesh network in smart home network 202. In some implementations, one or more smart devices 204 in the smart home network 202 operate as a smart home controller. Additionally and/or alternatively, hub device 180 operates as the smart home controller. In some implementations, a smart home controller has more computing power than other smart devices. In some implementations, a smart home controller processes inputs (e.g., from smart devices 204, electronic device 166, and/or server system 164) and sends commands (e.g., to smart devices 204 in the smart home network 202) to control operation of the smart home environment 100. In some implementations, some of the smart devices 204 in the smart home network 202 (e.g., in the mesh network) are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, ZWave, 6LoWPAN, Thread, Bluetooth, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes.

In some implementations, some low-power nodes are capable of only a limited bidirectional communication. For example, other devices are able to communicate with the low-power nodes only during a certain time period.

As described, in some implementations, the smart devices serve as low-power and spokesman nodes to create a mesh network in the smart home environment 100. In some implementations, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some implementations, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the server system 164 (using, e.g., the relatively high-power communication protocol). Thus, the low-powered nodes using low-power communication protocols are able to send and/or receive messages across the entire smart home network 202, as well as over the Internet 162 to the server system 164. In some implementations, the mesh network enables the server system 164 to regularly receive data from most or all of the smart devices in the home, make inferences based on the data, facilitate state synchronization across devices within and outside of the smart home network 202, and send commands to one or more of the smart devices to perform tasks in the smart home environment.

As described, the spokesman nodes and some of the low-powered nodes are capable of "listening." Accordingly, users, other devices, and/or the server system 164 may communicate control commands to the low-powered nodes. For example, a user may use the electronic device 166 (e.g., a smart phone) to send commands over the Internet to the server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the server system 164.

In some implementations, a smart nightlight 170 (FIG. 1), which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet 162 to the server system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 104 may send messages that correspond to each of the respective sensors to the other devices and/or the server system 164, such as by using the mesh network as described above.

Examples of spokesman nodes include smart doorbells 106, smart thermostats 102, smart wall switches 108, and smart wall plugs 110. These devices are often located near and connected to a reliable power source, and therefore may include more power-consuming components, such as one or more communication chips capable of bidirectional communication in a variety of protocols.

In some implementations, the smart home environment 100 includes service robots 168 (FIG. 1) that are configured to carry out, in an autonomous manner, any of a variety of household tasks.

As explained above with reference to FIG. 1, in some implementations, the smart home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the smart home environment 100. Communication protocols used by the radio communication network include, but are not limited to, ZigBee, Z-Wave, Insteon, EuOcean, Thread, OSIAN, Bluetooth Low Energy and the like. In some implementations, the hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 2B:
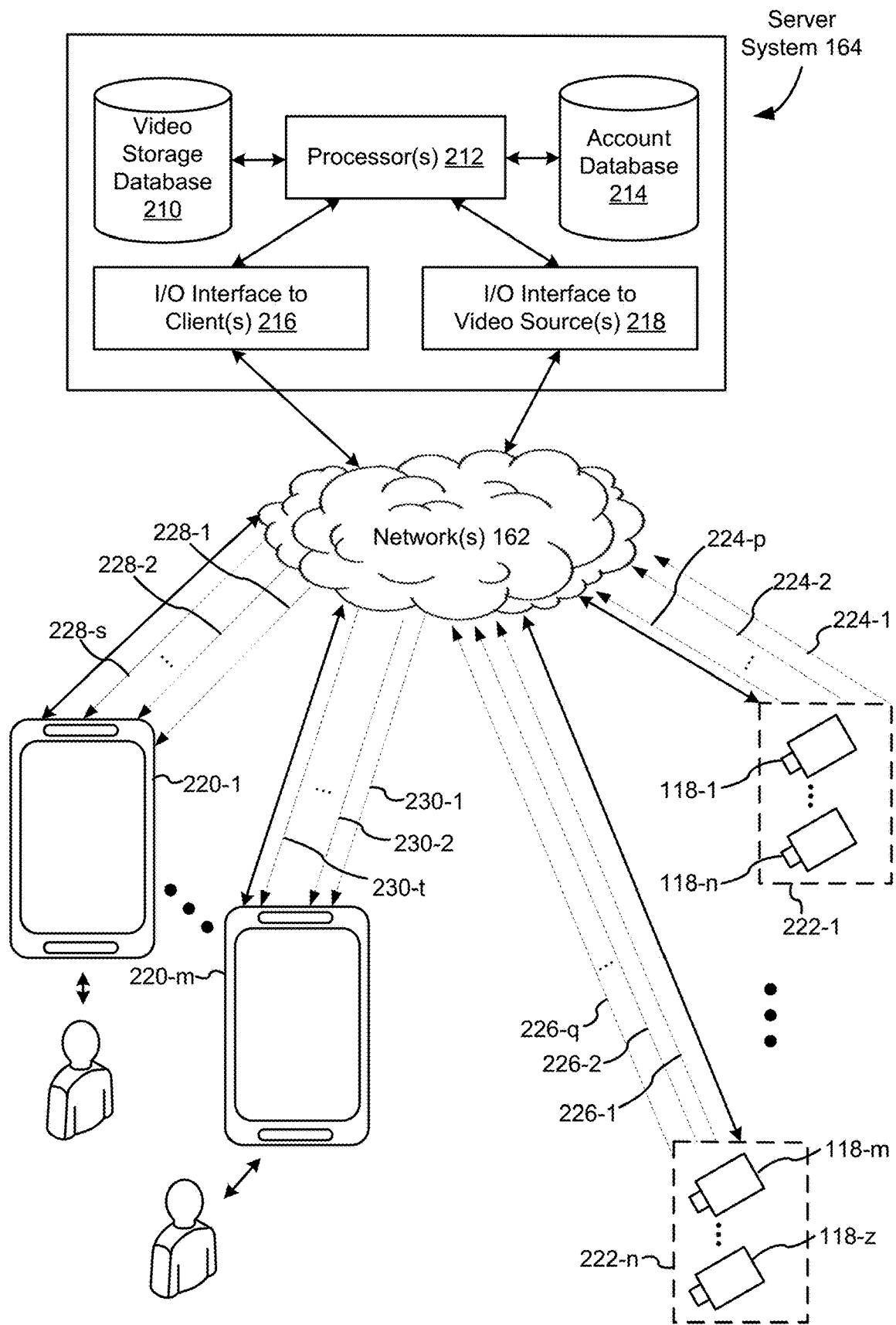
FIG. 2B is a representative operating environment in which a server system interacts with client devices and smart devices in accordance with some implementations.

FIG. 2B illustrates a representative operating environment in which a server system 164 provides data processing for monitoring and facilitating review of events (e.g., motion, audio, security, etc.) in video streams captured by video cameras 118. As shown in FIG. 2B, the server system 164 receives video data from video sources 222 (including cameras 118) located at various physical locations (e.g., inside homes, restaurants, stores, streets, parking lots, and/or the smart home environments 100 of FIG. 1). Each video source 222 may be bound to one or more reviewer accounts, and the server system 164 provides video monitoring data for the video source 222 to client devices 220 associated with the reviewer accounts. For example, the portable electronic device 166 is an example of the client device 220. In some implementations, the server system 164 is a video processing server that provides video processing services to video sources and client devices 220.

In some implementations, each of the video sources 222 includes one or more video cameras 118 that capture video and send the captured video to the server system 164 substantially in real-time. In some implementations, each of the video sources 222 includes a controller device (not shown) that serves as an intermediary between the one or more cameras 118 and the server system 164. The controller device receives the video data from the one or more cameras 118, optionally performs some preliminary processing on the video data, and sends the video data to the server system 164 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the server system 164.

In accordance with some implementations, each of the client devices 220 includes a client-side module. The client-side module communicates with a server-side module executed on the server system 164 through the one or more networks 162. The client-side module provides client-side functionality for the event monitoring and review processing and communications with the server-side module. The server-side module provides server-side functionality for event monitoring and review processing for any number of client-side modules each residing on a respective client device 220. The server-side module also provides server-side functionality for video processing and camera control for any number of the video sources 222, including any number of control devices and the cameras 118.

In some implementations, the server system 164 includes one or more processors 212, a video storage database 210, an account database 214, an I/O interface to one or more client devices 216, and an I/O interface to one or more video sources 218. The I/O interface to one or more clients 216 facilitates the client-facing input and output processing. The account database 214 stores a plurality of profiles for reviewer accounts registered with the video processing server, where a respective user profile includes account credentials for a respective reviewer account, and one or more video sources linked to the respective reviewer account. The I/O interface to one or more video sources 218 facilitates communications with one or more video sources 222 (e.g., groups of one or more cameras 118 and associated controller devices). The video storage database 210 stores raw video data received from the video sources 222, as well as various types of metadata, such as motion events, event categories, event category models, event filters, and event masks, for use in data processing for event monitoring and review for each reviewer account.

Examples of a representative client device 220 include a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, a vehicle-mounted computer, an ebook reader, or a combination of any two or more of these data processing devices or other data processing devices.

Examples of the one or more networks 162 include local area networks (LAN) and wide area networks (WAN) such as the Internet. The one or more networks 162 are implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the server system 164 is implemented on one or more standalone data processing apparatuses or a distributed network of computers. In some implementations, the server system 164 also employs various virtual devices and/or services of third party service providers (e.g., third-party cloud service providers) to provide the underlying computing resources and/or infrastructure resources of the server system 164. In some implementations, the server system 164 includes, but is not limited to, a server computer, a handheld computer, a tablet computer, a laptop computer, a desktop computer, or a combination of any two or more of these data processing devices or other data processing devices.

The server-client environment shown in FIG. 2B includes both a client-side portion (e.g., the client-side module) and a server-side portion (e.g., the server-side module). The division of functionality between the client and server portions of operating environment can vary in different implementations. Similarly, the division of functionality between a video source 222 and the server system 164 can vary in different implementations. For example, in some implementations, the client-side module is a thin-client that provides only user-facing input and output processing functions, and delegates all other data processing functionality to a backend server (e.g., the server system 164). Similarly, in some implementations, a respective one of the video sources 222 is a simple video capturing device that continuously captures and streams video data to the server system 164 with limited or no local preliminary processing on the video data. Although many aspects of the present technology are described from the perspective of the server system 164, the corresponding actions performed by a client device 220 and/or the video sources 222 would be apparent to one of skill in the art. Similarly, some aspects of the present technology may be described from the perspective of a client device or a video source, and the corresponding actions performed by the video server would be apparent to one of skill in the art. Furthermore, some aspects of the present technology may be performed by the server system 164, a client device 220, and a video source 222 cooperatively.

In some implementations, a video source 222 (e.g., a camera 118) transmits one or more streams of video data to the server system 164. In some implementations, the one or more streams may include multiple streams, of respective resolutions and/or frame rates, of the raw video captured by the camera 118. In some implementations, the multiple streams may include a "primary" stream with a certain resolution and frame rate, corresponding to the raw video captured by the camera 118, and one or more additional streams. An additional stream may be the same video stream as the "primary" stream but at a different resolution and/or frame rate, or a stream that captures a portion of the "primary" stream (e.g., cropped to include a portion of the field of view or pixels of the primary stream) at the same or different resolution and/or frame rate as the "primary" stream.

In some implementations, one or more of the streams are sent from the video source 222 directly to a client device 220 (e.g., without being routed to, or processed by, the server system 164). In some implementations, one or more of the streams is stored at the camera 118 (e.g., in memory 406, FIG. 4) and/or a local storage device (e.g., a dedicated recording device), such as a digital video recorder (DVR). For example, in accordance with some implementations, the camera 118 stores the most recent 24 hours of video footage recorded by the camera. In some implementations, portions of the one or more streams are stored at the camera 118 and/or the local storage device (e.g., portions corresponding to particular events or times of interest).

In some implementations, the server system 164 transmits one or more streams of video data to a client device 220 to facilitate event monitoring by a user. In some implementations, the one or more streams may include multiple streams, of respective resolutions and/or frame rates, of the same video feed. In some implementations, the multiple streams include a "primary" stream with a certain resolution and frame rate, corresponding to the video feed, and one or more additional streams. An additional stream may be the same video stream as the "primary" stream but at a different resolution and/or frame rate, or a stream that shows a portion of the "primary" stream (e.g., cropped to include portion of the field of view or pixels of the primary stream) at the same or different resolution and/or frame rate as the "primary" stream, as described in greater detail in U.S. patent application Ser. No. 15/594,518.

Figure 3A:
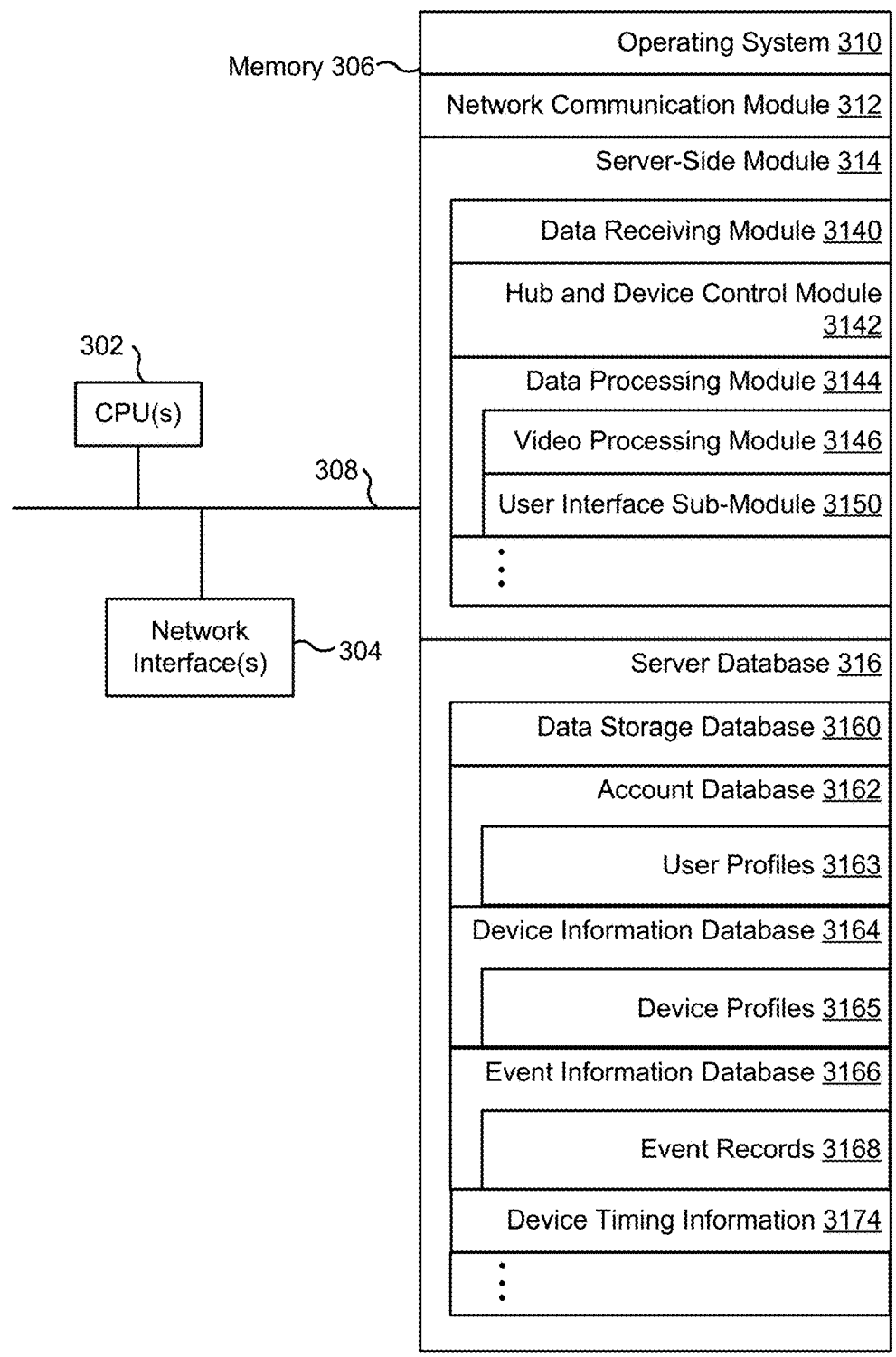
FIG. 3A is a block diagram illustrating a representative server system, in accordance with some implementations.

FIG. 3A is a block diagram illustrating the server system 164 in accordance with some implementations. The server system 164 typically includes one or more processing units (CPUs) 302, one or more network interfaces 304 (e.g., including an I/O interface to one or more client devices and an I/O interface to one or more electronic devices), memory 306, and one or more communication buses 308 for interconnecting these components (sometimes called a chipset). The memory 306 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 306, optionally, includes one or more storage devices remotely located from one or more processing units 302. The memory 306, or alternatively the non-volatile memory within memory 306, includes a non-transitory computer readable storage medium. In some implementations, the memory 306, or the non-transitory computer readable storage medium of the memory 306, stores the following programs, modules, and data structures, or a subset or superset thereof:

- an operating system 310 including procedures for handling various basic system services and for performing hardware dependent tasks;
- a network communication module 312 for connecting the server system 164 to other systems and devices (e.g., client devices, electronic devices, and systems connected to one or more networks 162) via one or more network interfaces 304 (wired or wireless);
- a server-side module 314, which provides server-side functionalities for device control, data processing, and data review, including, but not limited to:

a data receiving module 3140 for receiving data from electronic devices (e.g., video data from a camera 118, FIG. 1) via the hub device 180, and preparing the received data for further processing and storage in the data storage database 3160;

a hub and device control module 3142 for generating and sending server-initiated control commands to modify operation modes of electronic devices (e.g., devices of a smart home environment 100), and/or receiving (e.g., from client devices 220) and forwarding user-initiated control commands to modify operation modes of the electronic devices;

a data processing module 3144 for processing the data provided by the electronic devices, and/or preparing and sending processed data to a device for review (e.g., client devices 220 for review by a user), including, but not limited to:

an event processor sub-module 3146 for processing event candidates and/or events within a received video stream (e.g., a video stream from cameras 118); and a user interface sub-module 3150 for communicating with a user (e.g., sending alerts, timeline events, etc. and receiving user edits and zone definitions and the like)

a server database 316, including but not limited to:

a data storage database 3160 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, where (optionally) all or a portion of the data and/or processing associated with the hub device 180 or smart devices are stored securely;

an account database 3162 for storing account information for user accounts, including user account information such as user profiles 3163, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles;

a device information database 3164 for storing device information related to one or more devices such as device profiles 3165, e.g., device identifiers and hub device specific secrets, independently of whether the corresponding hub devices have been associated with any user account; and an event information database 3166 for storing event information such as event records 3168, e.g., event log information, event categories, and the like.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 306, optionally, stores a subset of the modules and data structures identified above. Furthermore, the memory 306, optionally, stores additional modules and data structures not described above.

Figure 3B:
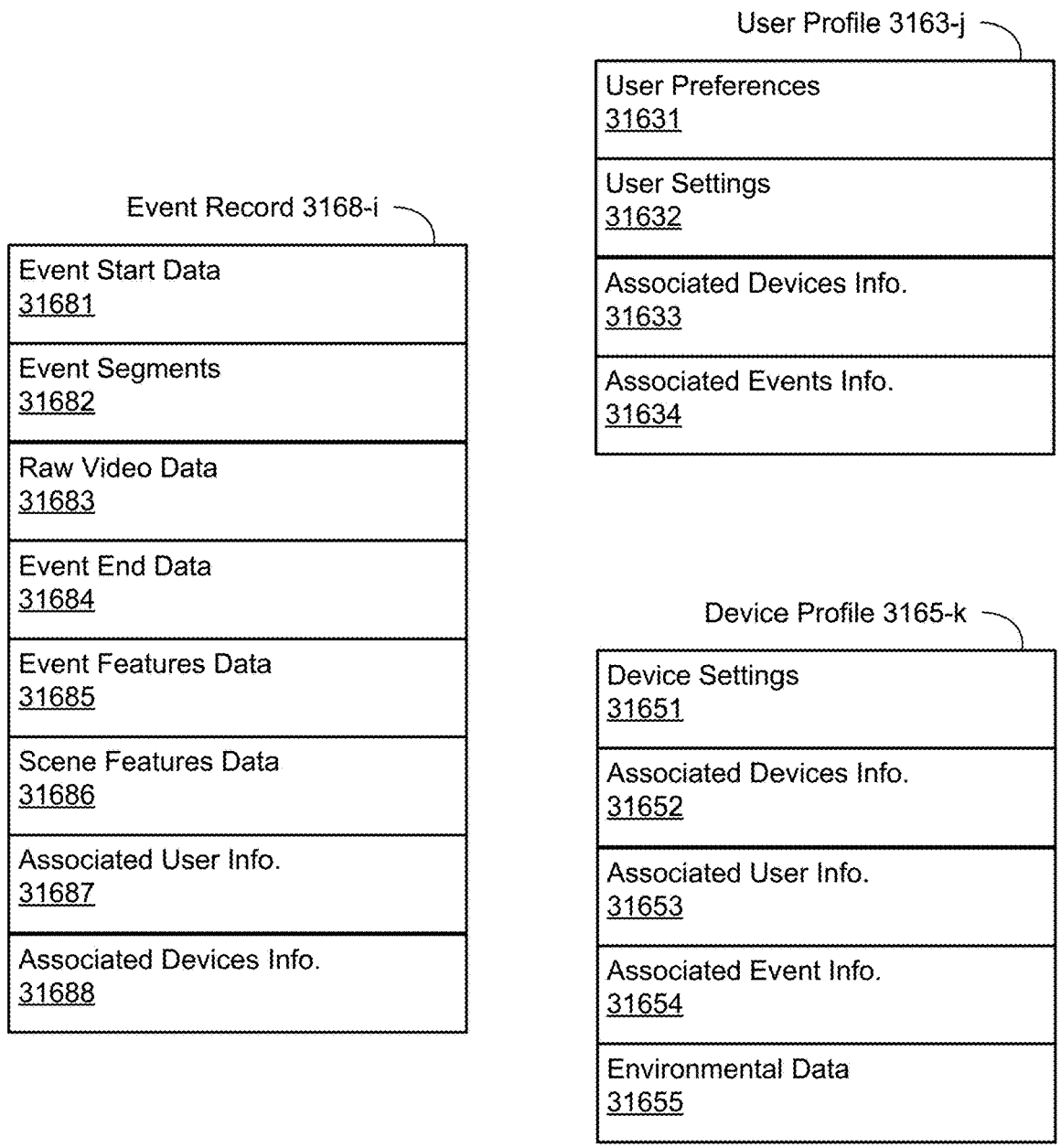
FIG. 3B illustrates various data structures used by some implementations.

FIG. 3B illustrates various data structures used by some implementations, including an event record 3168-*i*, a user profile 3163-*j*, and a device profile 3165-*j*. The event record 3168-*i* corresponds to an event i and data for the event i. In some instances, the data for motion event i includes event start data 31681 indicating when and/or how the event started, event segments data 31682, raw video data 31683, event end data 31684 indicating when and/or how the event ended, event features data 31685, scene features data 31686, associated user information 31687, and associated devices information 31688. In some instances, the event record 3168-*i* includes only a subset of the above data. In some instances, the event record 3168-*i* includes additional event data not shown such as data regarding event/motion masks.

The event start data 31681 includes date and time information such as a timestamp and optionally includes additional information such as information regarding the amount of motion present, a motion start location, amount of audio present, characteristics of the audio, and the like. Similarly, the event end data 31684 includes date and time information such as a timestamp and optionally includes additional information such as information regarding the amount of motion present, a motion start location, amount of audio present, characteristics of the audio, and the like.

The event segments 31682 includes information regarding segmentation of motion event i. In some instances, event segments are stored separately from the raw video data 31683. In some instances, the event segments are stored at a lower display resolution than the raw video data. For example, the event segments are optionally stored at 480p or 780p and the raw video data is stored at 1080i or 1080p. Storing the event segments at a lower display resolution enables the system to devote less time and resources to retrieving and processing the event segments. In some instances, the event segments are not stored separately and the segmentation information includes references to the raw video data 31683 as well as date and time information for reproducing the event segments. In some implementations, the event segments include one or more audio segments (e.g., corresponding to video segments).

The event features data 31685 includes information regarding event features such as event categorizations/classifications, object masks, motion masks, identified/recognized/tracked motion objects (also sometimes called blobs), information regarding features of the motion objects (e.g., object color, object dimensions, velocity, size changes, etc.), information regarding activity in zones of interest, and the like. The scene features data 31686 includes information regarding the scene in which the event took place such as depth map information, information regarding the location of windows, televisions, fans, the ceiling/floor, etc., information regarding whether the scene is indoors or outdoors, information regarding zones of interest, and the like. In some implementations, the event features data includes audio data, such as volume, pitch, characterizations, and the like.

The associated user information 31687 includes information regarding users associated with the event such as users identified in the event, users receiving notification of the event, and the like. In some instances, the associated user information 31687 includes a link, pointer, or reference to a user profile 3163 for to the user. The associated devices information 31688 includes information regarding the device or devices involved in the event (e.g., a camera 118 that recorded the event). In some instances, the associated devices information 31688 includes a link, pointer, or reference to a device profile 3165 for the device.

The user profile 3163-*j* corresponds to a user j associated with the smart home network (e.g., smart home network 202) such as a user of a hub device 204, a user identified by a hub device 204, a user who receives notifications from a hub device 204 or from the server system 164, and the like. In some instances, the user profile 3163-*j* includes user preferences 31631, user settings 31632, associated devices information 31633, and associated events information 31634. In some instances, the user profile 3163-*j* includes only a subset of the above data. In some instances, the user profile 3163-*j* includes additional user information not shown such as information regarding other users associated with the user j.

The user preferences 31631 include explicit user preferences input by the user as well as implicit and/or inferred user preferences determined by the system (e.g., server system 164 and/or client device 220). In some instances, the inferred user preferences are based on historical user activity and/or historical activity of other users. The user settings 31632 include information regarding settings set by the user j such as notification settings, device settings, and the like. In some instances, the user settings 31632 include device settings for devices associated with the user j.

The associated devices information 31633 includes information regarding devices associated with the user j such as devices within the user's smart home environment 100 and/or client devices 220. In some instances, associated devices information 31633 includes a link, pointer, or reference to a corresponding device profile 3165. Associated events information 31634 includes information regarding events associated with user j such as events in which user j was identified, events for which user j was notified, events corresponding to user j's smart home environment 100, and the like. In some instances, the associated events information 31634 includes a link, pointer, or reference to a corresponding event record 3168.

The device profile 3165-*k* corresponds to a device k associated with a smart home network (e.g., smart home network 202) such a hub device 204, a camera 118, a client device 220, and the like. In some instances, the device profile 3165-*k* includes device settings 31651, associated devices information 31652, associated user information 31653, associated event information 31654, and environmental data 31655. In some instances, the device profile 3165-*k* includes only a subset of the above data. In some instances, the device profile 3165-*k* includes additional device information not shown such as information regarding whether the device is currently active.

The device settings 31651 include information regarding the current settings of device k such as positioning information, mode of operation information, and the like. In some instances, the device settings 31651 are user-specific and are set by respective users of the device k. The associated devices information 31652 includes information regarding other devices associated with device k such as other devices linked to device k and/or other devices in the same smart home network as device k. In some instances, the associated devices information 31652 includes a link, pointer, or reference to a respective device profile 3165 corresponding to the associated device.

The associated user information 31653 includes information regarding users associated with the device such as users receiving notifications from the device, users registered with the device, users associated with the smart home network of the device, and the like. In some instances, the associated user information 31653 includes a link, pointer, or reference to a user profile 3163 corresponding to the associated user.

The associated event information 31654 includes information regarding events associated with the device k such as historical events involving the device k. In some instances, the associated event information 31654 includes a link, pointer, or reference to an event record 3168 corresponding to the associated event.

The environmental data 31655 includes information regarding the environment of device k such as information regarding whether the device is outdoors or indoors, information regarding the light level of the environment, information regarding the amount of activity expected in the environment (e.g., information regarding whether the device is in a private residence versus a busy commercial property), information regarding environmental objects (e.g., depth mapping information for a camera), and the like.

Figure 4:
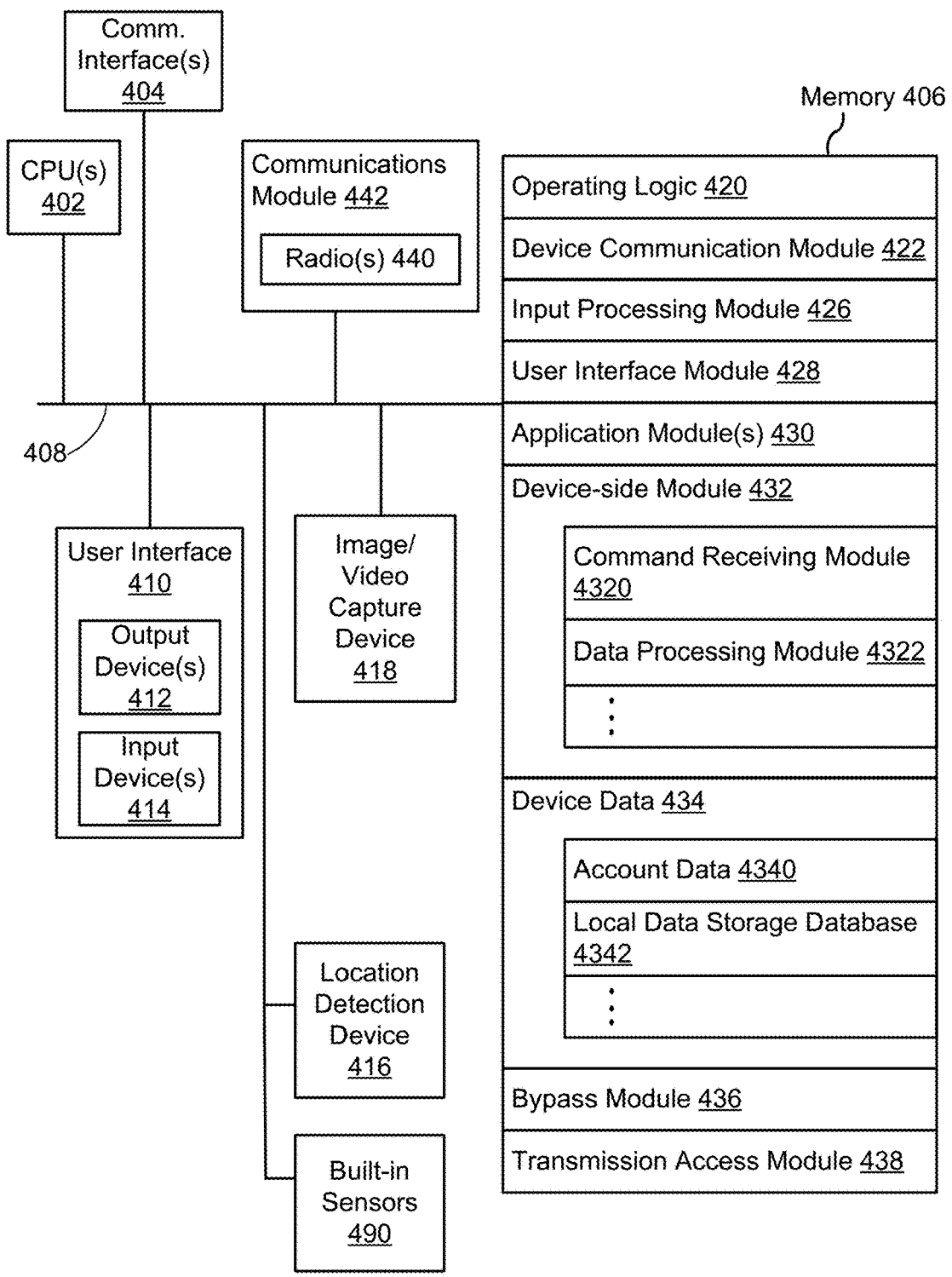
FIG. 4 is a block diagram illustrating a representative smart device, in accordance with some implementations.

FIG. 4 is a block diagram illustrating a representative smart device 204 in accordance with some implementations. In some implementations, the smart device 204 (e.g., any devices of a smart home environment 100, FIG. 1) includes one or more processing units (e.g., CPUs, ASICs, FPGAs, microprocessors, and the like) 402, one or more communication interfaces 404, memory 406, communications module 442 with radios 440, and one or more communication buses 408 for interconnecting these components (sometimes called a chipset). In some implementations, the user interface 410 includes one or more output devices 412 that enable presentation of media content, including one or more speakers and/or one or more visual displays. In some implementations, the user interface 410 also includes one or more input devices 414, including user interface components that facilitate user input such as a keyboard, a mouse, a voice-command input unit or microphone, a touch screen display, a touch-sensitive input pad, a gesture capturing camera, or other input buttons or controls. Furthermore, some smart devices 204 use a microphone and voice recognition or a camera and gesture recognition to supplement or replace the keyboard. In some implementations, the smart device 204 includes one or more image/video capture devices 418 (e.g., cameras, video cameras, scanners, photo sensor units).

The built-in sensors 490 include, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radios 440 enable one or more radio communication networks in the smart home environments, and allow a smart device 204 to communicate with other devices. In some implementations, the radios 440 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) custom or standard wired protocols (e.g., Ethernet, HomePlug, etc.), and/or any other suitable communication protocol, including communication protocols not yet developed as of the filing date of this document.

The communication interfaces 404 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

The memory 406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 406, or alternatively the non-volatile memory within the memory 406, includes a non-transitory computer readable storage medium. In some implementations, the memory 406, or the non-transitory computer readable storage medium of the memory 406, stores the following programs, modules, and data structures, or a subset or superset thereof:

- operating logic 420 including procedures for handling various basic system services and for performing hardware dependent tasks;
- a device communication module 422 for connecting to and communicating with other network devices (e.g., network interface 160, such as a router that provides Internet connectivity, networked storage devices, network routing devices, server system 164, etc.) connected to one or more networks 162 via one or more communication interfaces 404 (wired or wireless);
- an input processing module 426 for detecting one or more user inputs or interactions from the one or more input devices 414 and interpreting the detected inputs or interactions;
- a user interface module 428 for providing and displaying a user interface in which settings, captured data, and/or other data for one or more devices (e.g., the smart device 204, and/or other devices in smart home environment 100) can be configured and/or viewed;
- one or more applications 430 for execution by the smart device (e.g., games, social network applications, smart home applications, and/or other web or non-web based applications) for controlling devices (e.g., executing commands, sending commands, and/or configuring settings of the smart device 204 and/or other client/electronic devices), and for reviewing data captured by devices (e.g., device status and settings, captured data, or other information regarding the smart device 204 and/or other client/electronic devices);
- a device-side module 432, which provides device-side functionalities for device control, data processing and data review, including but not limited to:
  - a command receiving module 4320 for receiving, forwarding, and/or executing instructions and control commands (e.g., from a client device 220, from a server system 164, from user inputs detected on the user interface 410, etc.) for operating the smart device 204;
  - a data processing module 4322 for processing data captured or received by one or more inputs (e.g., input devices 414, image/video capture devices 418, location detection device 416), sensors (e.g., built-in sensors 490), interfaces (e.g., communication interfaces 404, radios 440), and/or other components of the smart device 204, and for preparing and sending processed data to a device for review (e.g., client devices 220 for review by a user); and
- device data 434 storing data associated with devices (e.g., the smart device 204), including, but is not limited to:
  - account data 4340 storing information related to user accounts loaded on the smart device 204, wherein such information includes cached login credentials, smart device identifiers (e.g., MAC addresses and UUIDs), user interface settings, display preferences, authentication tokens and tags, password keys, etc.;
  - local data storage database 4342 for selectively storing raw or processed data associated with the smart device 204 (e.g., video surveillance footage captured by a camera 118);
- a bypass module 436 for detecting whether radio(s) 440 are transmitting signals via respective antennas coupled to the radio(s) 440 and to accordingly couple radio(s) 440 to their respective antennas either via a bypass line or an amplifier (e.g., a low noise amplifier); and
- a transmission access module 438 for granting or denying transmission access to one or more radio(s) 440 (e.g., based on detected control signals and transmission requests).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 406, optionally, stores a subset of the modules and data structures identified above. Furthermore, the memory 406, optionally, stores additional modules and data structures not described above.

Figure 5:
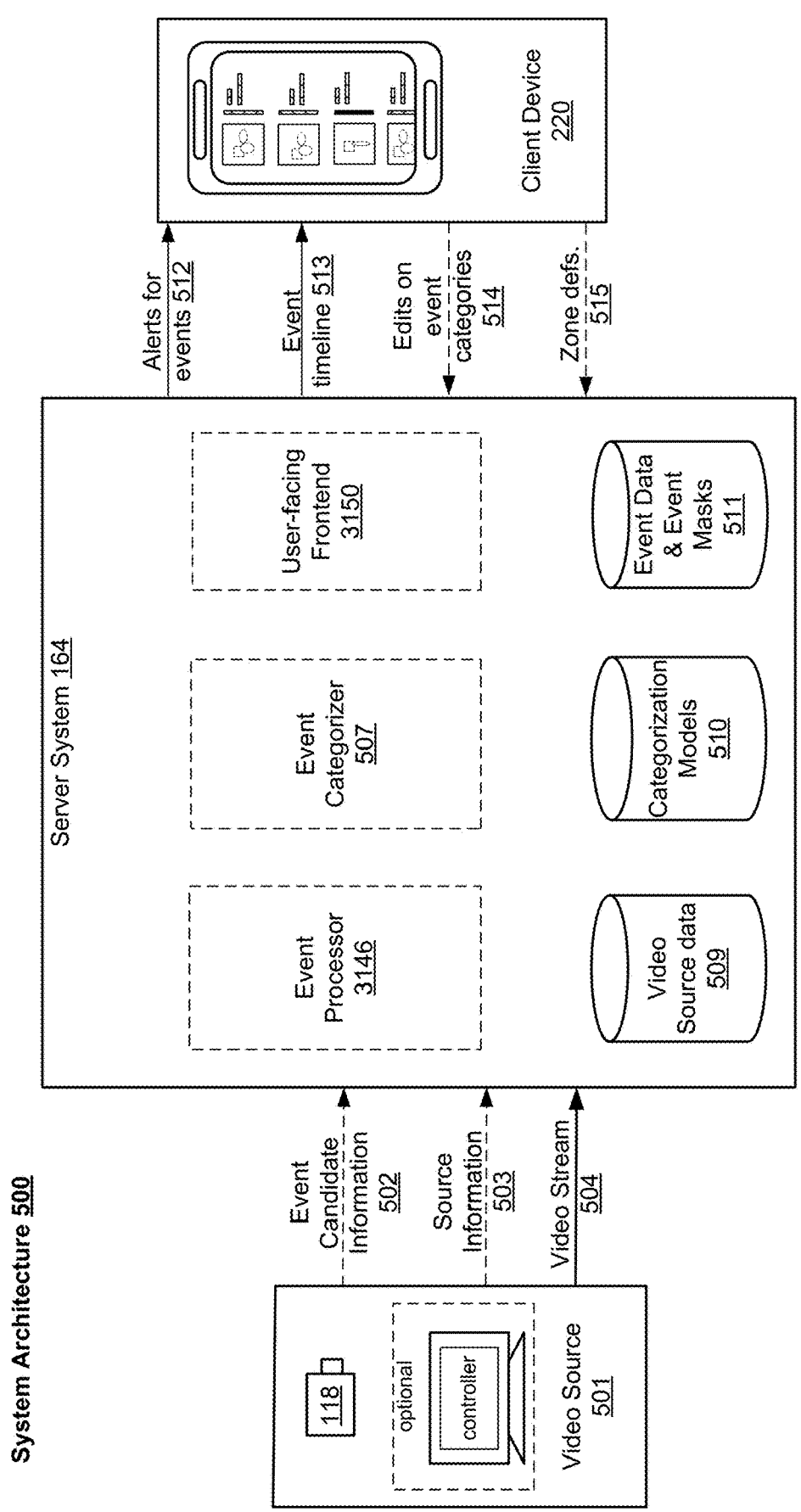
FIG. 5 illustrates a representative system architecture for video analysis and categorization, in accordance with some implementations.

FIG. 5 illustrates a representative system architecture 500. In some implementations, the server system 164 includes functional modules for an event processor 3146, an event categorizer 507, and a user-facing frontend 3150. The event processor 3146 obtains the event candidates (e.g., by processing the video stream or by receiving the event start information from the video source 501). In some implementations, the event candidates comprise motion event candidates. In some implementations, the event candidates include audio and/or visual aspects. The event categorizer 507 categorizes the event candidates into different event categories. The user-facing frontend 3150 generates event alerts and facilitates review of the events by a reviewer through a review interface on a client device 220. The user-facing frontend 3150 also receives user edits on the event categories, user preferences for alerts and event filters, and zone definitions for zones of interest. The event categorizer optionally revises event categorization models and results based on the user edits received by the user-facing frontend 3150. The server system 164 also includes a video source data database 509, event categorization models database 510, and event data and event masks database 511. In some implementations, each of these databases is part of the server database 316 (e.g., part of data storage database 3160).

The server system 164 receives one or more video stream(s) 504 from the video source 501 (e.g., a video source 222) and optionally receives event candidate information 502 such as event start information (e.g., motion start information) and source information 503 such as device settings for a camera 118 (e.g., a device profile 3165 for camera 118). In some implementations, the event processor sub-module 3146 communicates with the video source 501. The server system sends alerts for events 512 and event timeline information 513 to the client device 220. The server system 164 optionally receives user information from the client device 220 such as edits on event categories 514 and zone definitions 515.

A data processing pipeline processes video information (e.g., a live video feed) received from a video source 501 (e.g., including a camera 118 and an optional controller device) and/or audio information received from one or more smart devices in real-time to identify and categorize events occurring in the smart home environment, and sends real-time event alerts and a refreshed event timeline to a client device 220 associated with a reviewer account for the smart home environment. The data processing pipeline also processes stored information (such as stored video feeds from a video source 501) to reevaluate and/or re-categorize events as necessary, such as when new information is obtained regarding the event and/or when new information is obtained regarding event categories (e.g., a new activity zone is obtained from the user).

After video and/or audio data is captured at a smart device, the data is processed to determine if any potential event candidates are present. In some implementations, the data is initially processed at the smart device (e.g., video source 501 or camera 118). Thus, in some implementations, the smart device sends event candidate information, such as event start information, to the server system 164. In some implementations, the data is processed at the server system 164 for event start detection. In some implementations, the video and/or audio data is stored on server system 164 (e.g., in video and source data database 509). In some implementations, the video stream is stored on a server distinct from server system 164. In some implementations, after a motion start is detected, the relevant portion of the video stream is retrieved from storage (e.g., from video and source data database 509).

In some implementations, the event identification process includes segmenting the video stream into multiple segments then categorizing the event candidate within each segment. In some implementations, categorizing the event candidate includes an aggregation of background factors, entity detection and identification, motion vector generation for each motion entity, entity features, and scene features to generate motion features for the event candidate. In some implementations, the event identification process further includes categorizing each segment, generating or updating an event log based on categorization of a segment, generating an alert for the event based on categorization of a segment, categorizing the complete event, updating the event log based on the complete event, and generating an alert for the event based on the complete event. In some implementations, a categorization is based on a determination that the event occurred within a particular zone of interest. In some implementations, a categorization is based on a determination that the event candidate involves one or more zones of interest. In some implementations, a categorization is based on audio data and/or audio event characterization.

The event analysis and categorization process may be performed by the smart device (e.g., the video source 501) and the server system 164 cooperatively, and the division of the tasks may vary in different implementations, for different equipment capability configurations, and/or for different network and server load situations. After the server system 164 categorizes the event candidate, the result of the event detection and categorization may be sent to a reviewer associated with the smart home environment.

In some implementations, the server system 164 stores raw or compressed video data (e.g., in a video and source data database 509), event categorization models (e.g., in an event categorization model database 510), and event masks and other event metadata (e.g., in an event data and event mask database 511) for each of the video sources 222. In some implementations, the video data is stored at one or more display resolutions such as 480p, 780p, 1080i, 1080p, and the like.

In some implementations, the video source 501 (e.g., the camera 118) transmits a live video feed to the remote server system 164 via one or more networks (e.g., the network(s) 162). In some implementations, the transmission of the video data is continuous as the video data is captured by the camera 118. In some implementations, the transmission of video data is irrespective of the content of the video data, and the video data is uploaded from the video source 501 to the server system 164 for storage irrespective of whether any motion event has been captured in the video data. In some implementations, the video data may be stored at a local storage device of the video source 501 by default, and only video portions corresponding to motion event candidates detected in the video stream are uploaded to the server system 164 (e.g., in real-time).

In some implementations, the video source 501 dynamically determines at what display resolution the video stream is to be uploaded to the server system 164. In some implementations, the video source 501 dynamically determines which parts of the video stream are to be uploaded to the server system 164. For example, in some implementations, depending on the current server load and network conditions, the video source 501 optionally prioritizes the uploading of video portions corresponding to newly detected motion event candidates ahead of other portions of the video stream that do not contain any motion event candidates; or the video source 501 uploads the video portions corresponding to newly detected motion event candidates at higher display resolutions than the other portions of the video stream. This upload prioritization helps to ensure that important motion events are detected and alerted to the reviewer in real-time, even when the network conditions and server load are less than optimal. In some implementations, the video source 501 implements two parallel upload connections, one for uploading the continuous video stream captured by the camera 118, and the other for uploading video portions corresponding to detected motion event candidates. At any given time, the video source 501 determines whether the uploading of the continuous video stream needs to be suspended temporarily to ensure that sufficient bandwidth is given to the uploading of the video segments corresponding to newly detected motion event candidates.

In some implementations, the video stream uploaded for cloud storage is at a lower quality (e.g., lower resolution, lower frame rate, higher compression, etc.) than the video segments uploaded for motion event processing.

As shown in FIG. 5, the video source 501 includes a camera 118, and an optional controller device. In some implementations, the camera 118 includes sufficient onboard processing power to perform all necessary local video processing tasks (e.g., cuepoint detection for motion event candidates, video uploading prioritization, network connection management, etc.), and the camera 118 communicates with the server system 164 directly, without any controller device acting as an intermediary. In some implementations, the camera 118 captures the video data and sends the video data to the controller device for the necessary local video processing tasks. The controller device optionally performs the local processing tasks for multiple cameras. For example, there may be multiple cameras in one smart home environment (e.g., the smart home environment 100, FIG. 1), and a single controller device receives the video data from each camera and processes the video data to detect motion event candidates in the video stream from each camera. The controller device is responsible for allocating sufficient outgoing network bandwidth to transmitting video segments containing motion event candidates from each camera to the server before using the remaining bandwidth to transmit the video stream from each camera to the server system 164. In some implementations, the continuous video stream is sent and stored at one server facility while the video segments containing motion event candidates are send to and processed at a different server facility.

In some implementations, the smart device sends additional source information 503 to the server system 164. This additional source information 503 may include information regarding a device state (e.g., IR mode, AE mode, DTPZ settings, etc.) and/or information regarding the environment in which the device is located (e.g., indoors, outdoors, night-time, day-time, etc.). In some implementations, the source information 503 is used by the server system 164 to perform event detection and/or to categorize event candidates. In some implementations, the additional source information 503 includes one or more preliminary results from video processing performed by the camera 118 (e.g., categorizations, object recognitions, motion masks, etc.).

In some implementations, the video portion after an event start incident is detected is divided into multiple segments. In some implementations, the segmentation continues until event end information (sometimes also called an "end-of-event signal") is obtained. In some implementations, the segmentation occurs within the server system 164 (e.g., by the event processor module 3146). In some implementations, the segmentation comprises generating overlapping segments. For example, a 10-second segment is generated every second, such that a new segment overlaps the prior segment by 9 seconds.

In some implementations, each of the multiple segments is of the same or similar duration (e.g., each segment has a 10-12 second duration). In some implementations, the first segment has a shorter duration than the subsequent segments. Keeping the first segment short allows for real time initial categorization and alerts based on processing the first segment. The initial categorization may then be revised based on processing of subsequent segments. In some implementations, a new segment is generated if the motion entity enters a new zone of interest.

In some implementations, after the event processor module obtains the video portion corresponding to an event candidate, the event processor module 3146 obtains background factors and performs motion entity detection identification, motion vector generation for each motion entity, and feature identification. Once the event processor module 3146 completes these tasks, the event categorizer 507 aggregates all of the information and generates a categorization for the motion event candidate. In some implementations, false positive suppression is optionally performed to reject some motion event candidates before the motion event candidates are submitted for event categorization. In some implementations, determining whether a motion event candidate is a false positive includes determining whether the motion event candidate occurred in a particular zone. In some implementations, determining whether a motion event candidate is a false positive includes analyzing an importance score for the motion event candidate. The importance score for a motion event candidate is optionally based on zones of interest involved with the motion event candidate, background features, motion vectors, scene features, entity features, motion features, motion tracks, and the like.

In some implementations, the video source 501 has sufficient processing capabilities to perform, and does perform, the background estimation, motion entity identification, the motion vector generation, and/or the feature identification.

Figure 6:
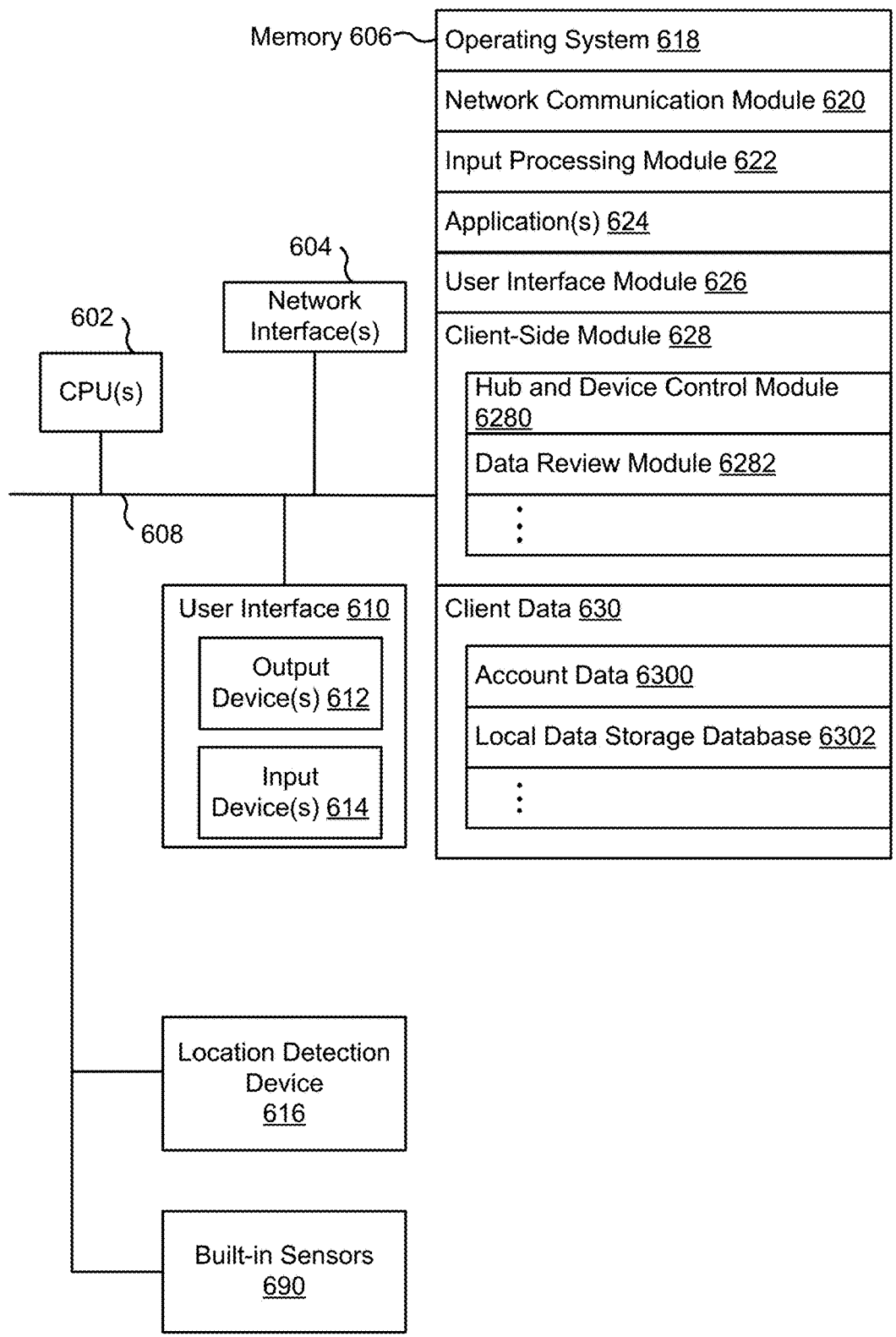
FIG. 6 is a block diagram illustrating a representative client device, in accordance with some implementations.

FIG. 6 is a block diagram illustrating a representative client device 220 associated with a user account in accordance with some implementations. The client device 220, typically, includes one or more processing units (CPUs) 602, one or more network interfaces 604, memory 606, and one or more communication buses 608 for interconnecting these components (sometimes called a chipset). Optionally, the client device also includes a user interface 610 and one or more built-in sensors 690 (e.g., accelerometer and gyroscope). The user interface 610 includes one or more output devices 612 that enable presentation of media content, including one or more speakers and/or one or more visual displays. The user interface 610 also includes one or more input devices 614, including user interface components that facilitate user input such as a keyboard, a mouse, a voice-command input unit or microphone, a touch screen display, a touch-sensitive input pad, a gesture capturing camera, or other input buttons or controls. Furthermore, some the client devices use a microphone and voice recognition or a camera and gesture recognition to supplement or replace the keyboard. In some implementations, the client device includes one or more cameras, scanners, or photo sensor units for capturing images (not shown). Optionally, the client device includes a location detection device 616, such as a GPS (global positioning satellite) or other geo-location receiver, for determining the location of the client device.

The memory 606 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 606, optionally, includes one or more storage devices remotely located from one or more processing units 602. The memory 606, or alternatively the non-volatile memory within the memory 606, includes a non-transitory computer readable storage medium. In some implementations, the memory 606, or the non-transitory computer readable storage medium of the memory 606, stores the following programs, modules, and data structures, or a subset or superset thereof:

- an operating system 618 including procedures for handling various basic system services and for performing hardware dependent tasks;
- a network communication module 620 for connecting the client device 220 to other systems and devices (e.g., client devices, electronic devices, and systems connected to one or more networks 162) via one or more network interfaces 604 (wired or wireless);
- an input processing module 622 for detecting one or more user inputs or interactions from one of the one or more input devices 614 and interpreting the detected input or interaction;
- one or more applications 624 for execution by the client device (e.g., games, social network applications, smart home applications, and/or other web or non-web based applications) for controlling devices (e.g., sending commands, configuring settings, etc. to hub devices and/or other client or electronic devices) and for reviewing data captured by the devices (e.g., device status and settings, captured data, or other information regarding the hub device or other connected devices);

- a user interface module 622 for providing and displaying a user interface in which settings, captured data, and/or other data for one or more devices (e.g., smart devices 204 in smart home environment 100) can be configured and/or viewed;
- a client-side module 628, which provides client-side functionalities for device control, data processing and data review, including but not limited to:
  - a hub device and device control module 6280 for generating control commands for modifying an operating mode of the hub device or the electronic devices in accordance with user inputs; and
  - a data review module 6282 for providing user interfaces for reviewing data processed by the server system 164; and
- client data 630 storing data associated with the user account and electronic devices, including, but not limited to:
  - account data 6300 storing information related to both user accounts loaded on the client device and electronic devices (e.g., of the video sources 222) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc.; and
  - a local data storage database 6302 for selectively storing raw or processed data associated with electronic devices (e.g., of the video sources 222, such as a camera 118).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise rearranged in various implementations. In some implementations, the memory 606, optionally, stores a subset of the modules and data structures identified above. Furthermore, the memory 606, optionally, stores additional modules and data structures not described above.

Figure 7A:
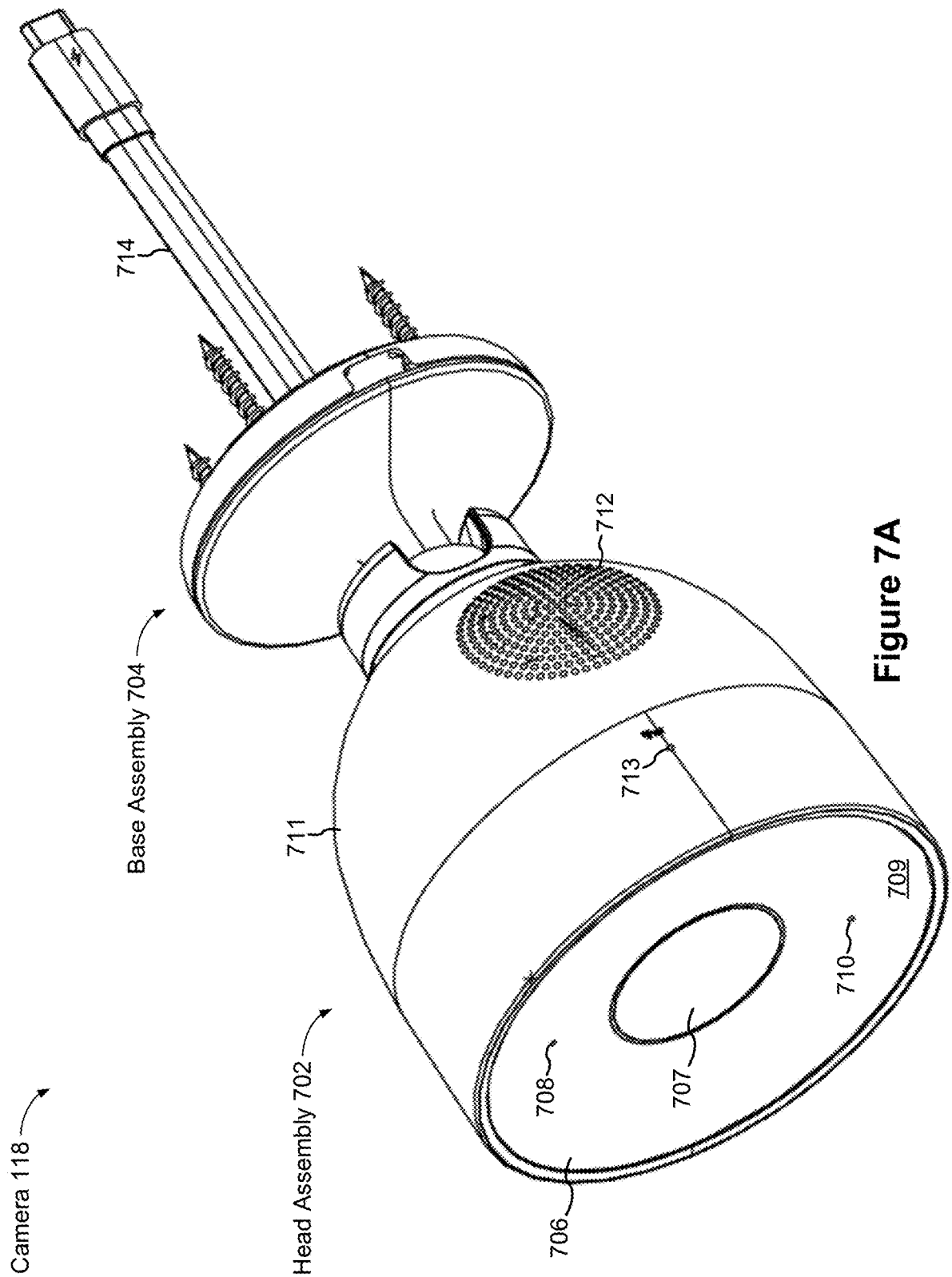
FIGS. 7A-7B are perspective views of a representative camera assembly in accordance with some implementations.
Figure 7B:
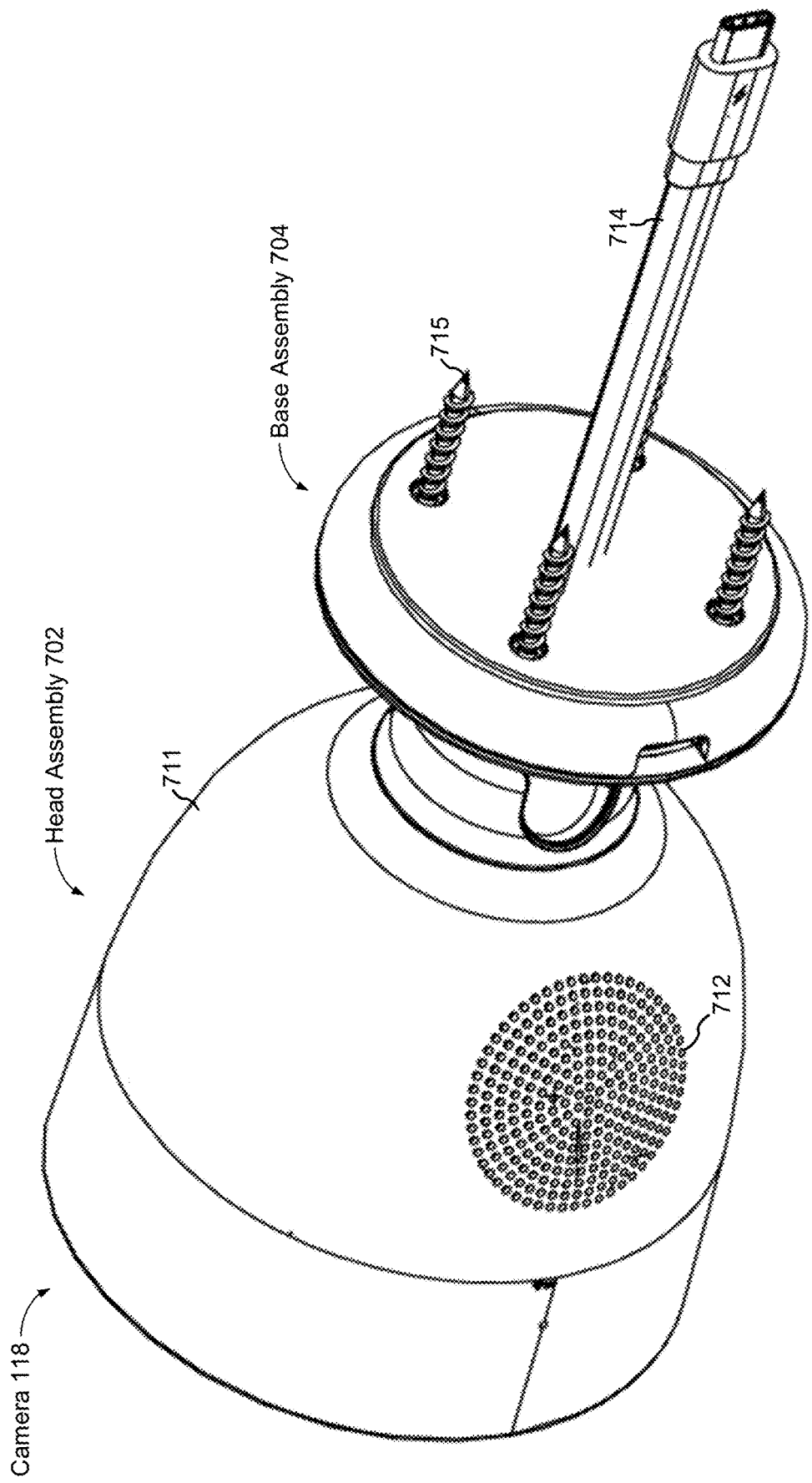

FIGS. 7A-7B are perspective views of the camera assembly 118 in accordance with some implementations. FIG. 7A shows a first perspective view of the camera 118. As shown in FIG. 7A, the camera 118 includes a head assembly 702, a base assembly 704, and a cable 714 (e.g., for powering the camera 118 and/or transferring data between the camera 118 and a second electronic device.). The head assembly 702 includes a front face 706 and a casing 711 (also sometimes called a housing). In some implementations, the casing 711 includes a metal shield configured to resist impacts. In some implementations, the casing 711 includes a plastic exterior configured to resist water and/or sun damage. In accordance with some implementations, the front face 706 has IR transparent portions for IR illuminators, a visible and IR transparent portion 707 for an image sensor, and one or more semi-transparent portions (corresponding to an ambient light sensor and/or a status LED). In accordance with some implementations, the front face 706 also includes apertures 708 and 710 for microphones. In accordance with some implementations, the periphery of the front face 706 is configured to direct light from a light ring outward from the face of the camera 118.

In accordance with some implementations, the casing 711 includes an aperture 713 for a microphone and a plurality of apertures 712 for a speaker. In some implementations, each aperture 708, 710, and 713 includes a waterproof membrane configured to inhibit and/or prevent water from entering an interior of the camera 118.

In some implementations, the speaker apertures 712 extend directly outward from the speaker, which results in holes with an elliptical outer surface. In some implementations, the speaker apertures 712 are parallel to one another. In some implementations, the speaker apertures 712 extend outward at an angle consistent with the surface of the casing 711 such that the holes have a circular, rather than elliptical, outer surface.

In some implementations, the casing 711 has two or more layers. In some implementations, the inner layer is composed of a thermally conductive resin. In some implementations, the outer layer is a structural jacket configured to protect the camera 118 from environmental conditions such as moisture or electromagnetic charge (e.g., static electricity). In some implementations, the structural jacket is configured to protect the camera 118 from impacts, such as from a collision with another object (e.g., a baseball bat) or the ground.

FIG. 7B shows a back perspective view of the camera 118. As shown in FIG. 7B the cable 714 is insertable into the base assembly 704. For example, a user may store the cable 714 separately from the camera 118 when desired. FIG. 7B also shows the screws 715 for affixing the base assembly 704 to a surface (e.g., a wall or ceiling).

Figure 8A:
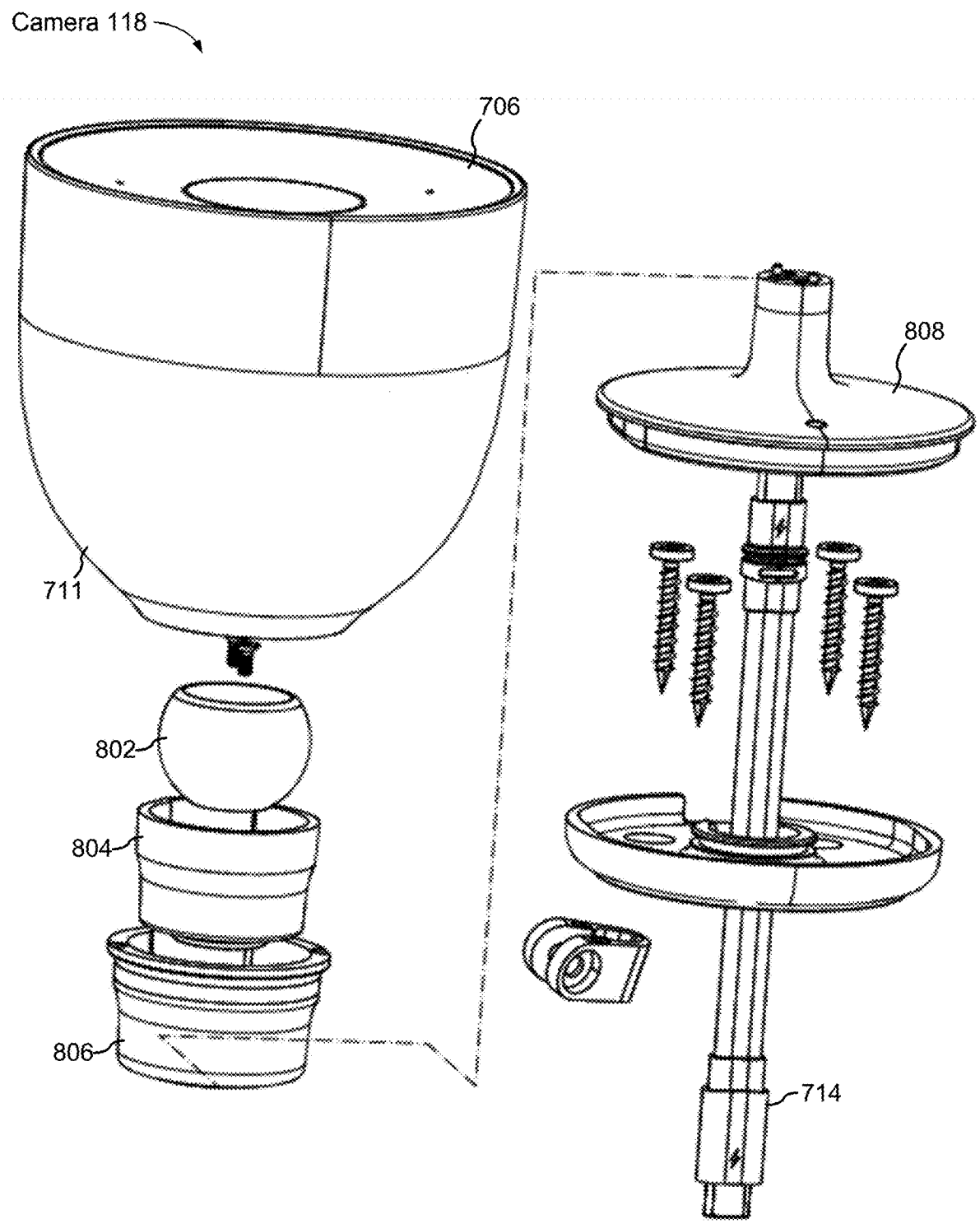
FIGS. 8A-8D are component views of a representative camera assembly in accordance with some implementations.

In some implementations, the camera assembly 118 is configured to have two or more degrees of freedom (e.g., pitch and yaw). FIGS. 8A-8D are component views of the camera assembly 118 in accordance with some implementations. FIG. 8A shows the head assembly 702 with the front face 706 and the casing 711. FIG. 8A also shows an expanded view of the base assembly 704, including ball assembly 802, hinge cradle 804, hinge housing 806, and base 808.

In some implementations, a ball assembly 802 is positioned against a first friction surface of the hinge cradle 804 that is configured to abut against the ball assembly 802. In some implementations, a second friction surface is positioned and configured to abut against a second portion of the ball assembly 802. In some implementations, first friction surface is positioned between the hinge housing 806 and the ball assembly 802. In some implementations, the first friction surface and the second friction surface are made of the same materials. In other implementations, the first friction surface and the second friction surface are made of different materials selected, for example, to have different coefficients of friction. For example, in some implementations, the second friction surface is selected to have a lower coefficient of friction than the first friction surface. In other implementations, the second friction surface is selected to have a higher coefficient of friction than the first friction surface. In some implementations, the surface of the ball assembly 802 is made from a metal or metal alloy and the first and second friction surfaces are made from plastic or thermoplastic materials. The surface of the ball assembly 802 and/or the first and second friction surfaces are made from materials with relatively low wear rates or high durability according to some implementations. In some implementations, the surface of the ball assembly 802 is treated to create a desired amount of friction. For example, in some implementations, the surface of the ball assembly 802 is textured, for example, by abrasive blasting, etching, etc. In some implementations, the surface of the ball assembly 802 is chemically treated, for example, anodized to create an oxide surface layer or electroplated. In some implementations, the surface of the ball assembly 802 is made from an aluminum alloy, for example, 6063 aluminum alloy, which has been abrasive blasted and/or anodized.

The first and second friction surfaces are optionally made from materials which are different than the material used to form the surface of the ball assembly 802. In some implementations, the first and second friction surfaces are made from polymeric materials or composite materials. In some implementations, the first and second friction surfaces are made from relatively low friction materials. In some implementations, use of low friction materials allow for smoother movement of the head assembly 702 about the surface of the ball assembly 802. For example, in some implementations, the first and/or second friction surfaces include polyoxymethylene or acetal resins (e.g., available under the tradename DELRIN®). In some implementations, the first and/or second friction surfaces include polytetrafluoroethylene (PTFE) or PTFE incorporated into other polymers (e.g, acetal resins impregnated with PTFE fibers).

In some implementations, the hinge assembly of the present invention is arranged to further conceal cables (e.g., coupling to connector 714) connecting to the electronic device in head assembly 702. In some implementations, an external power/data cable such as the connector 714 is routed into a mounting plate through either a lateral or bottom opening. The connector 714 is, in some implementations, a USB cable having, for example, a USB 2.0 plug, USB 3.0 plug, USB type-A plug, USB type-B plug, USB type-C plug, mini-USB plug, or micro-USB plug. In some implementations, the base assembly 704 includes a receptacle for receiving and an electronically connecting with the plug of the connector 714. In some implementations, the receptacle is a component of the base assembly 704. In some such implementations, the receptacle is housed within a stem of the base assembly 714. In some implementations, the stem includes a lumen 202 into which the plug of the connector 714 may be inserted to reach the receptacle. In some implementations, the plug of the connector 714 includes an outer gasket configured to make a liquid-tight seal against the walls of the lumen when the plug is inserted therein to prevent water from leaking into the camera 118. In some implementations, the receptacle is located at an end of the stem and positioned within the ball assembly 802. In some implementations, the receptacle may in turn be positioned on or electrically connected to a printed circuit board (PCB) that may also be positioned and secured within the ball assembly 802. The PCB may include, for example, electronic circuitry which is in electronic communication with and configured to receive signals from and/or transmit signals to the receptacle and the connector 714. In some implementations, the PCB may include a power converter (e.g., a buck converter or DC-to-DC step down converter). In some implementations, a voltage is input into camera 118 from the connector 714, and the power converter is configured to step down the input voltage.

Figure 8B:
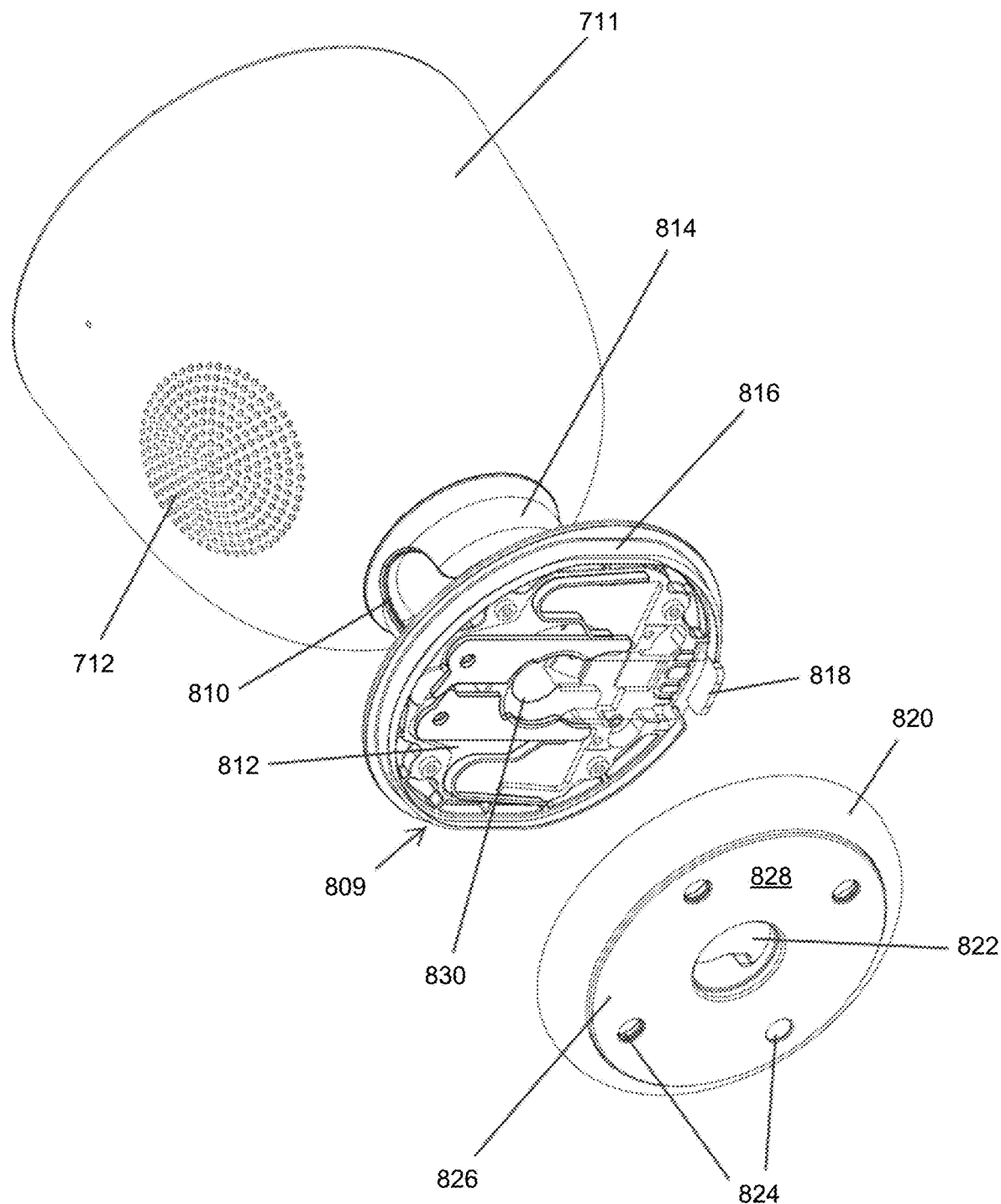
Figure 8C:
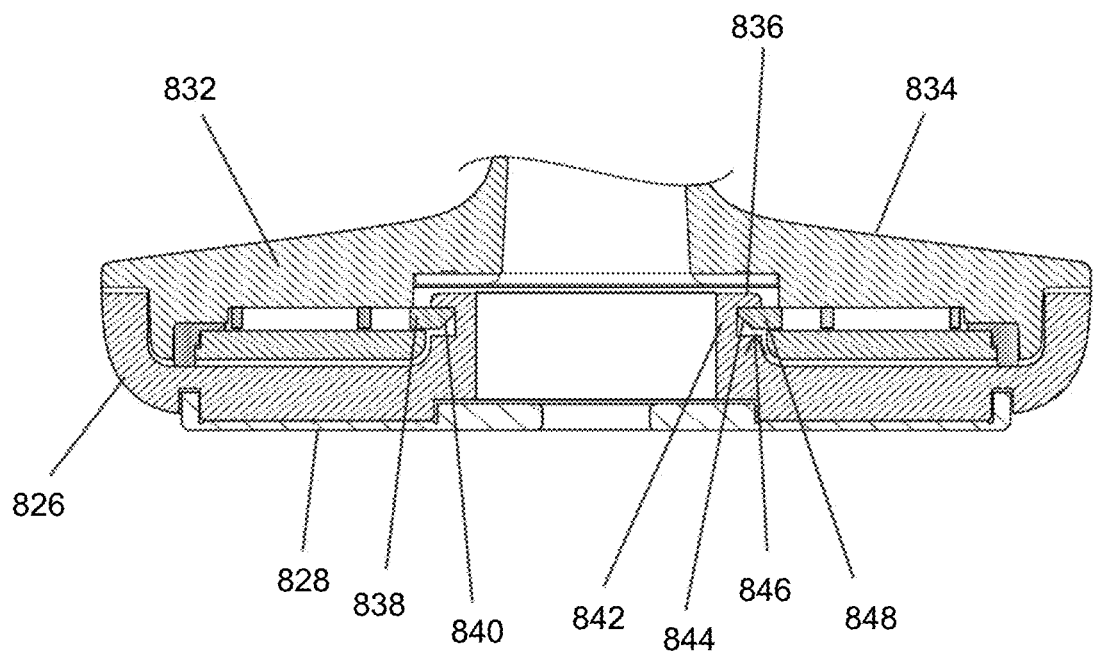
Figure 8D:
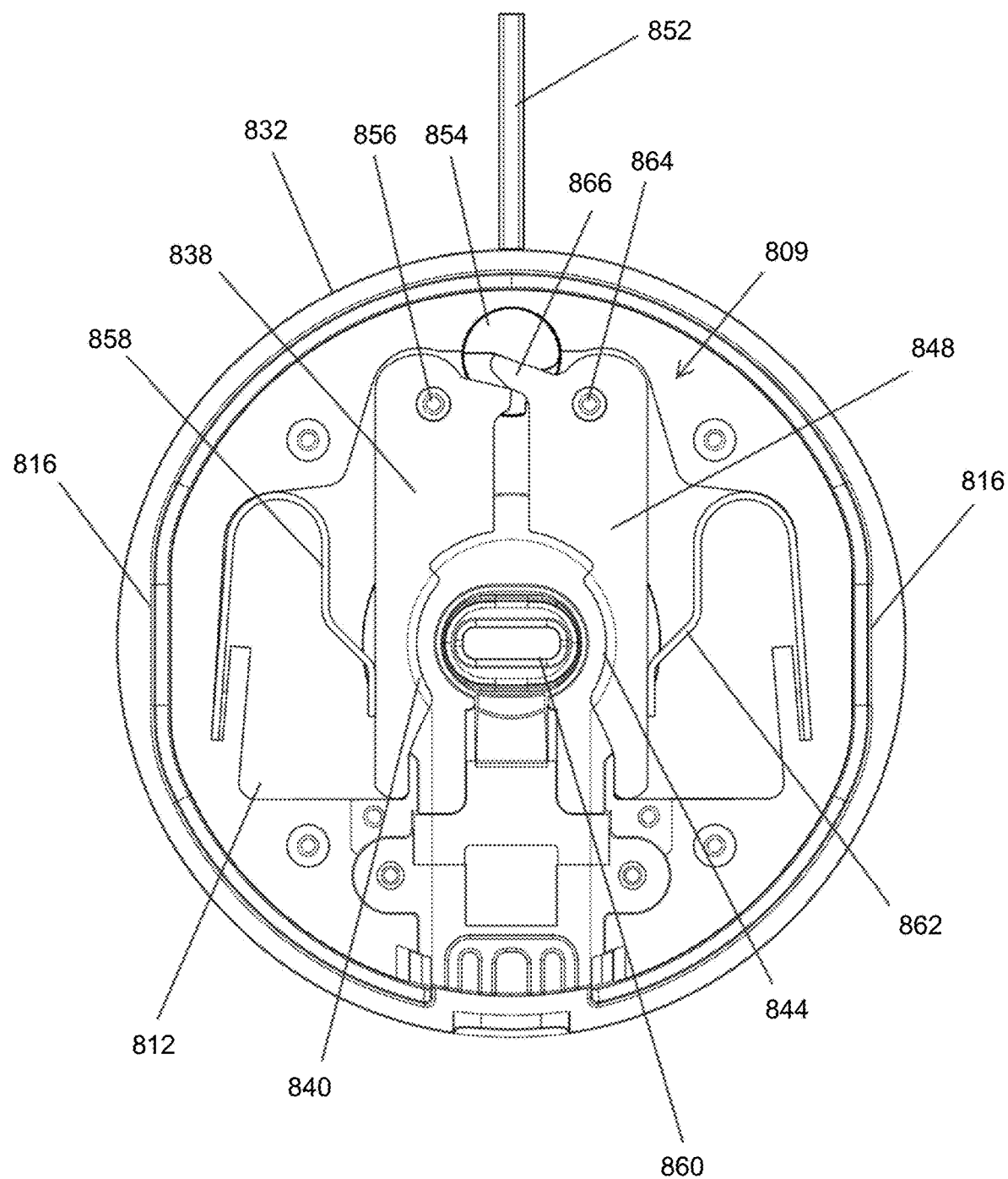

In some implementations, the camera assembly 118 is configured to be installed to a mounting plate 826 without the need for a specific tool. In some implementations, the camera assembly 118 is configured to require a specific tool to be uninstalled from the mounting plate 826. With reference now to FIGS. 8B-8D, the camera 118, in some implementations, includes an attachment mechanism generally designated 809 which is configured to secure the base assembly 704 onto a mounting plate 826. In some implementations, the attachment mechanism 809 is configured to releasably secure the base assembly 704 onto the mounting plate 826. In some implementations, the base assembly 704 is secured to the mounting plate 826 through a first motion by a user of the device, and unsecured from the mounting plate through a second motion by the user. The second motion, in some implementations, is different than the first motion and/or different than a reverse of the first motion. In some implementations, for example, the base assembly 704 is configured to be securely engaged with the mounting plate 826 by pressing the base assembly 704 into the mounting plate 826 in a linear motion along a first direction that is, or substantially is, perpendicular to a back surface 828, whereas the base assembly 704 is configured to be disengaged from the mounting plate 826 through a different second motion (e.g., a rotational motion). In some implementations, the attachment mechanism 809 is configured to allow the base assembly 704 to be securely engaged to the mounting plate 826 without the need or use of any tools. In some implementations, the attachment mechanism 809 is configured to allow the base assembly 704 to be disengaged from the mounting plate 826 only through the use of one or more separate tools. In some implementations, the attachment mechanism 809 is configured to allow the base assembly 704 to form a snap-fit engagement with the mounting plate 806. In some implementations, the attachment mechanism is positioned on the base assembly 704 and configured to engage with a feature of the mounting plate 806. In some such implementations, the attachment mechanism 809 is positioned on a mounting surface 812 of the base assembly 704 which is opposite of an external surface 834. In certain alternative implementations, the attachment mechanism 809 is positioned on the mounting plate 826 and configured to engage with a feature of the base assembly 704. In some implementations, the attachment mechanism 809 is completely positioned and/or concealed between the external surface 834 of the base assembly and the back surface 828 of the mounting plate 826 when the base assembly 704 is securely engaged with the mounting plate 826.

In certain implementations, attachment mechanism 809 includes a first arm 848 which is mounted onto the base assembly 704 and rotatable about a first pivot. First arm 848 may be configured to rotate about first pivot in a plane that is parallel to mounting surface 142. In some implementations, a first biasing member is further positioned and configured to bias first arm 848 in a first rotational direction about first pivot. First biasing member may be a spring, for example, a compression spring, torsion spring, leaf spring, cantilever spring, etc. In some implementations, first arm 848 includes an the engagement edge 844 which is configured to contact a portion of the mounting plate 826 when the base assembly 704 is being engaged with the mounting plate 826. As discussed, in some implementations, the base assembly 704 may be engaged with the mounting plate 826 by aligning the one or more keyed features of the mounting plate 826 (e.g., keyed surfaces 130) with the corresponding features of the base assembly 704 (e.g., corresponding surfaces 132) and linearly translating the base assembly 704 towards the mounting plate 826 in a direction that is substantially perpendicular to back surface 134.

In some implementations, during engagement of the base assembly 704 with the mounting plate 826, an engagement edge 844 is configured to contact an inner wall 842 of the mounting plate 826 which surrounds, at least partially, an opening 822. In some implementations, the inner wall 842 includes a lip 836 which partially defines a groove 846 along an outer surface of the inner wall 842 which is sized to receive a first arm 848. In some implementations, the first arm 848 is configured to snap fit around the lip 836 and the groove 846. In some implementations, the engagement edge 844 is configured to contact the lip 836 which in turn causes the first arm 848 to rotate about a first pivot and allow the first arm 848 to move past the lip 836 and be received within the groove 846 as the base assembly 704 is engaged with the mounting plate 826. In some such implementations, the engagement edge 844 includes a beveled or chamfered surfaced that is shaped and configured to translate a force impinging on the beveled or chamfered surface into a lateral force to move the first arm 848 in a second rotational direction about first pivot that is opposite the first rotational direction. In some implementations, the lip 836 also includes a beveled or radiused edge which is configured to contact the beveled or chamfered surface of the engagement edge 844 and help guide the first arm 848 past the lip 836. A first biasing member, in some implementations, biases the first arm 848 into the groove 846 once the first arm 848 moves past the lip 836. In some implementations, the base assembly 704 is securely engaged with the mounting plate 826 when the first arm 848 is received within the groove 846. The lip 836, in some implementations, interlocks with the first arm 848 when the first arm 848 is received within the groove 846 to prevent the base assembly 704 from disengaging with the mounting plate 826.

In some implementations, the attachment mechanism 809 further includes a second arm 838. In some implementations, the second arm 838 operates in concert with the first arm 848 to clamp onto a projection on the mounting plate 826, for example, the inner wall 842. In some implementations, the first arm 848 and the second arm 838 are configured to counter-rotate with respect to each other. The second arm 838 may be configured to rotate about a second pivot in a plane that is parallel to mounting surface 142. In some implementations, a second biasing member is further positioned and configured to bias the second arm 838 in a first rotational direction about the second pivot. In some implementations, the second biasing member is configured to bias the second arm 838 toward the first arm 848, and the first biasing member is configured to bias the first arm 848 toward the second arm 838. The second biasing member may be a spring, for example, a compression spring, torsion spring, leaf spring, cantilever spring, etc. In some implementations, the second arm 838 further includes an engagement edge 840 which is configured to contact a portion of the mounting plate 826 when the base assembly 704 is being engaged with the mounting plate 826.

In some implementations, during engagement of the base assembly 704 with the mounting plate 826, the engagement edge 840 of the second arm 838 is configured to contact the inner wall 842 of the mounting plate 826. In some implementations, the groove 846 is sized to receive the second arm 838. In some implementations, the second arm 838 is configured to snap fit around the lip 836 and the groove 846. In some implementations, the engagement edge 840 is configured to contact the lip 836 which in turn causes the second arm 838 to rotate about the second pivot and allow the second arm 838 to move past the lip 836 and be received within the groove 846 as the base assembly 704 is engaged with the mounting plate 826. In some such implementations, the engagement edge 840 includes a beveled or chamfered surfaced that is shaped and configured to translate a force impinging on the beveled or chamfered surface into a lateral force to move the second arm 838 in a second rotational direction about first pivot that is opposite the first rotational direction. Thus, in some implementations, the lip 836 is configured to move the second arm 838 and the first arm 848 away from each other as the base assembly 704 is engaged with the mounting plate 826. In some implementations, the lip 836 may also include a beveled or radiused edge which is configured to contact the beveled or chamfered surface of the engagement edge 840 and help guide the second arm 838 past the lip 836. The second biasing member may bias the second arm 838 into the groove 846 once second arm 838 moves past lip 836 according to some implementations. In some implementations, the base assembly 704 is securely engaged with the mounting plate 826 when both the first arm 848 and the second arm 838 are received within the groove 846. The lip 836, in some implementations, interlocks with the first arm 848 and the second arm 838 when the first arm 848 and the second arm 838 are received within the groove 846 to prevent the base assembly 704 from disengaging with the mounting plate 826.

In some implementations, the attachment mechanism 809 further includes a release mechanism that is configured to move the first arm 848 and/or the second arm 838 out of the groove 846 to allow the base assembly 704 to be disengaged from the mounting plate 826. In some implementations, the release mechanism may be accessed by a user through an opening in the external surface 834 of the base assembly 704. In some implementations, the release mechanism requires a separate tool to be inserted into the opening in order to be actuated. In some implementations, the release mechanism requires the tool to be inserted into opening and rotated. Similar to a security screw, opening in some implementations may be shaped such that only a tool having a specific predetermined shape (e.g., specific cross-sectional shape) may fit in opening and actuate the release mechanism. Requiring a specific shape for the tool, particularly a less common shape, may help prevent unauthorized removal of the base assembly 704 from the mounting plate 826 according to some implementations. In some implementations, the release mechanism may be designed to require a wrench or driver having one of, for example, a hex, torx, square, triangular, pentalobe, polydrive, torq-set, or any other shape known for driving security screws. In some implementations, the tool must be a hex key. In some implementations, the opening is configured such that a flathead or Phillips screw driver will not be able to actuate the release mechanism. In some implementations, the release mechanism is coupled to a radio and/or wired connector and is responsive to commands received via the radio and/or wired connector. For example, the release mechanism is coupled to a radio configured to wirelessly communicate with a security key fob or similar device. In another example, the radio is configured to wirelessly communicate with one or more user devices via a smart home application.

Figure 9A:
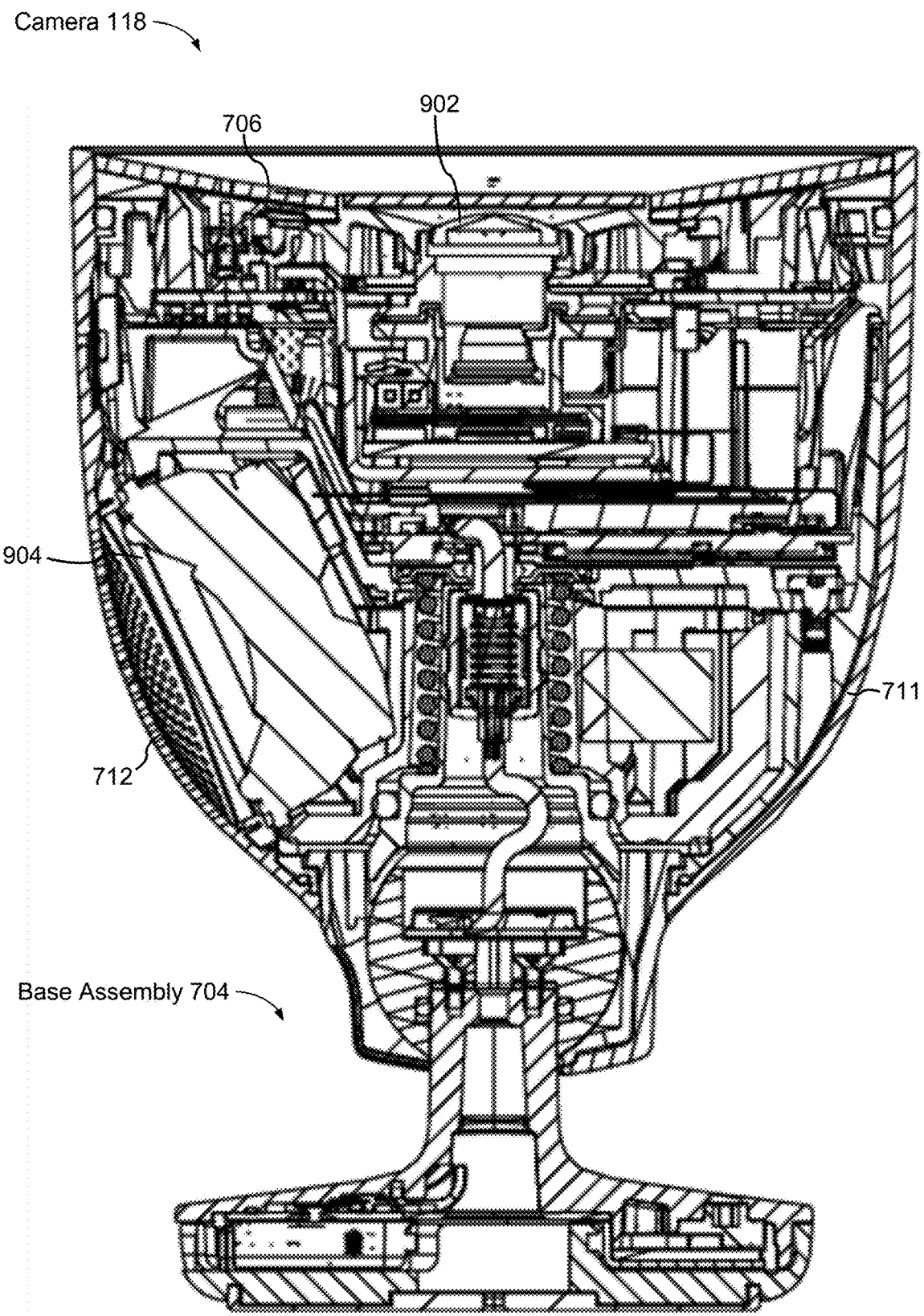
FIGS. 9A-9D are component views illustrating a representative camera assembly in accordance with some implementations.

FIGS. 9A-9D are component views of the camera assembly 118 in accordance with some implementations. FIG. 9A shows an interior view of the camera 118 in accordance with some implementations. As shown in FIG. 9A, the camera 118 includes the front face 706, an image sensor assembly 902 positioned behind the front face 706, and a speaker assembly 904 positioned adjacent to the speaker apertures 712 in the casing 711.

In some implementations, the camera 118 is a video streaming device with powerful computing capability embedded in the device. Therefore, in some instances, it will consume a lot of power and will also generate a lot of heat. In order to prevent the chipset and other components from being damaged by the heat, a thermal relief solution includes directing the heat from the CPU (e.g., a CPU of the SoC 1322) to the speaker assembly 904. In some implementations, the speaker assembly 904 is composed of a thermally conductive plastic that is structurally suitable and has good heat spreading properties. In some implementations, a thermal pad on top of the shield 1326 (FIG. 13C) is used to direct the heat to the speaker assembly.

In some implementations, the image sensor assembly 908 includes one or more of: a circuit board (e.g., a PCB board), an IR cut filter, a lens holder, and an image sensor. In some implementations, the image sensor comprises a 4k image sensor. In some implementations, the image sensor comprises a 12 megapixel sensor. In some implementations, the image sensor comprises a wide-angle lens.

In some implementations, the speaker assembly 904 includes a speaker and a heat sink. In some implementations, the heat sink is configured to dissipate heat generated at the speaker and one or more circuit boards within the camera 118. In some implementations, the speaker assembly 904 acts as a heat sink for the camera's system-on-a-chip (SoC) 1322, shown in FIG. 13C. In some implementations, the SoC 1322 is thermally coupled to the speaker assembly 904.

Figure 9B:
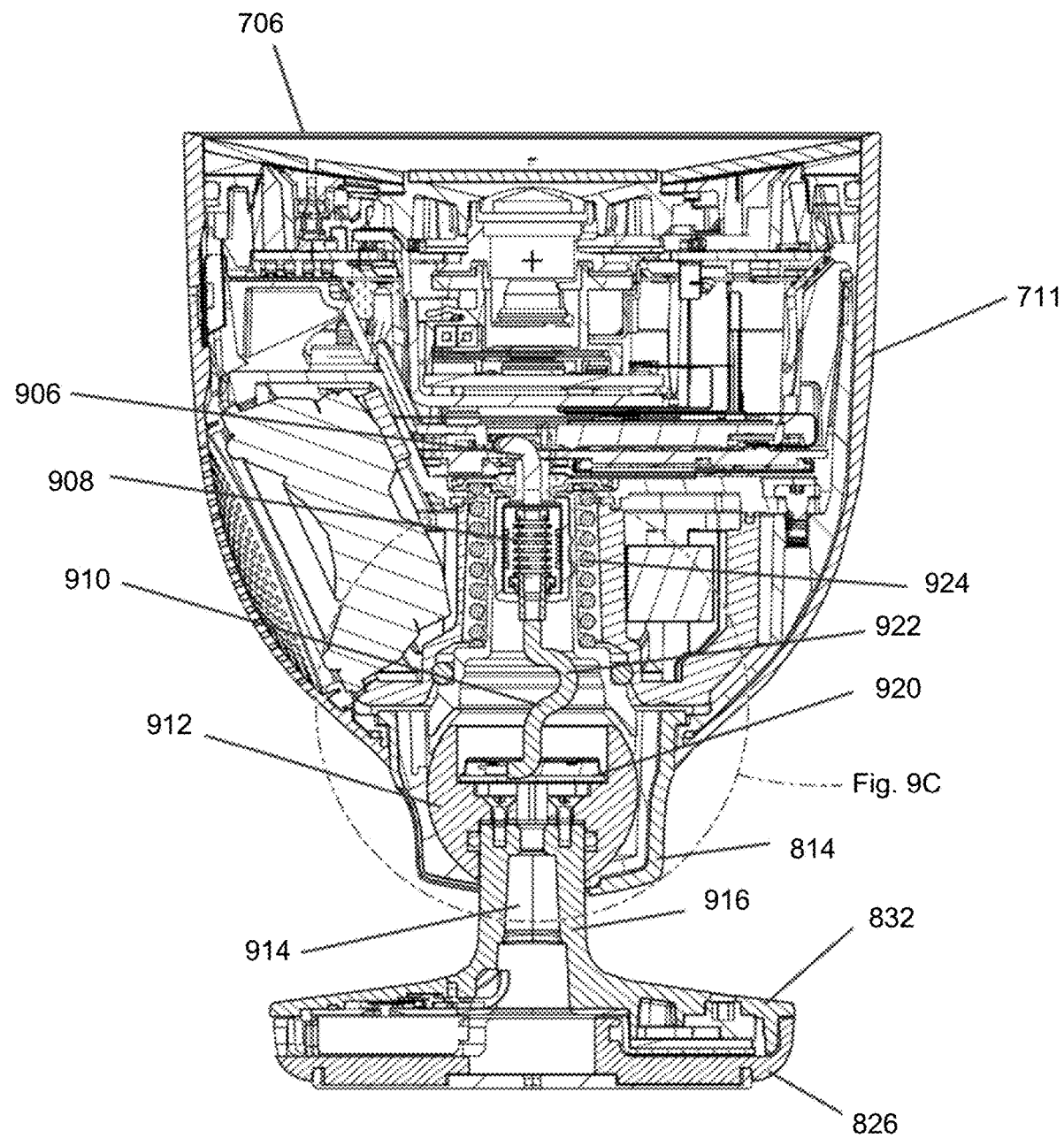
Figure 9C:
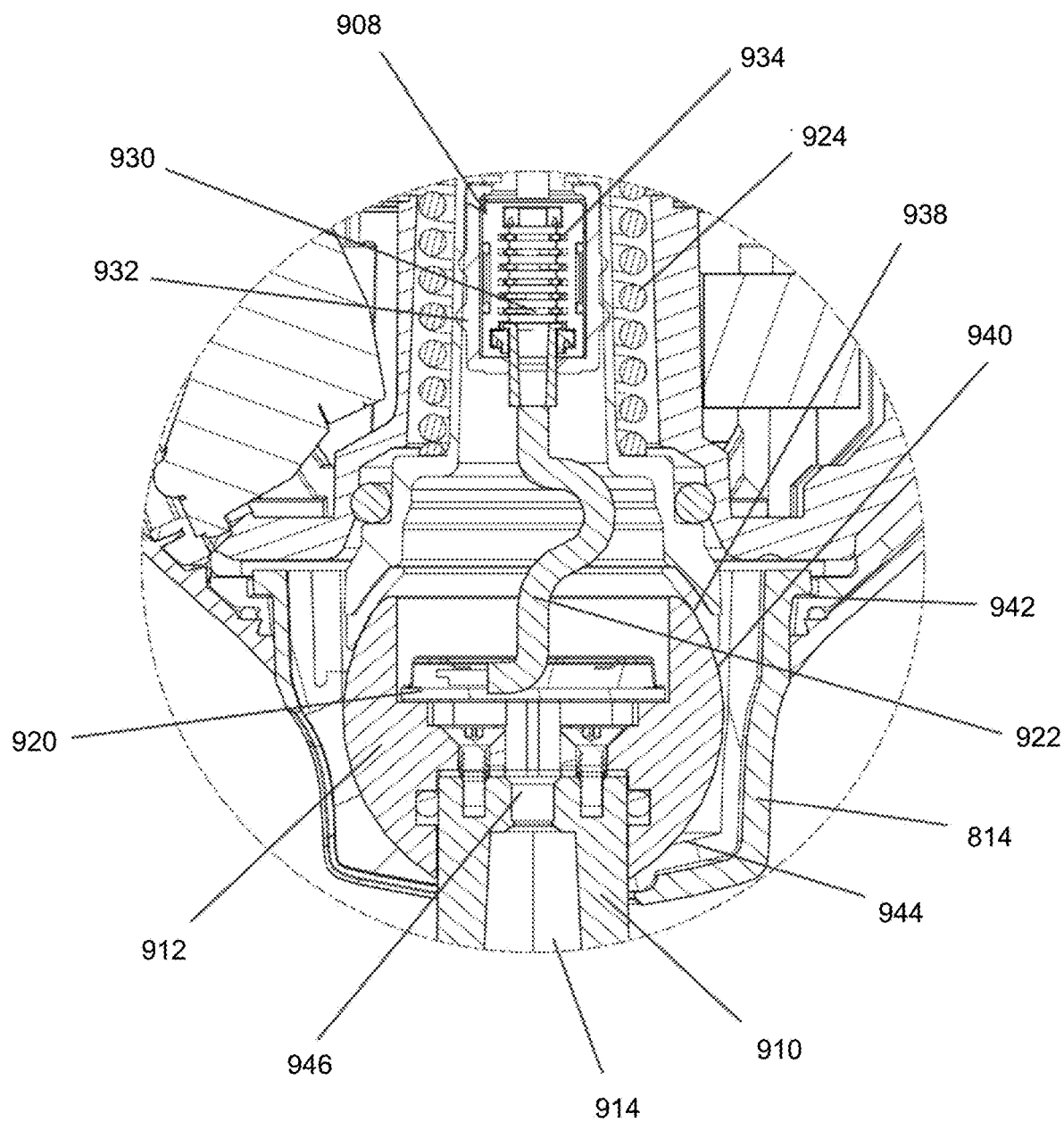
Figure 9D:
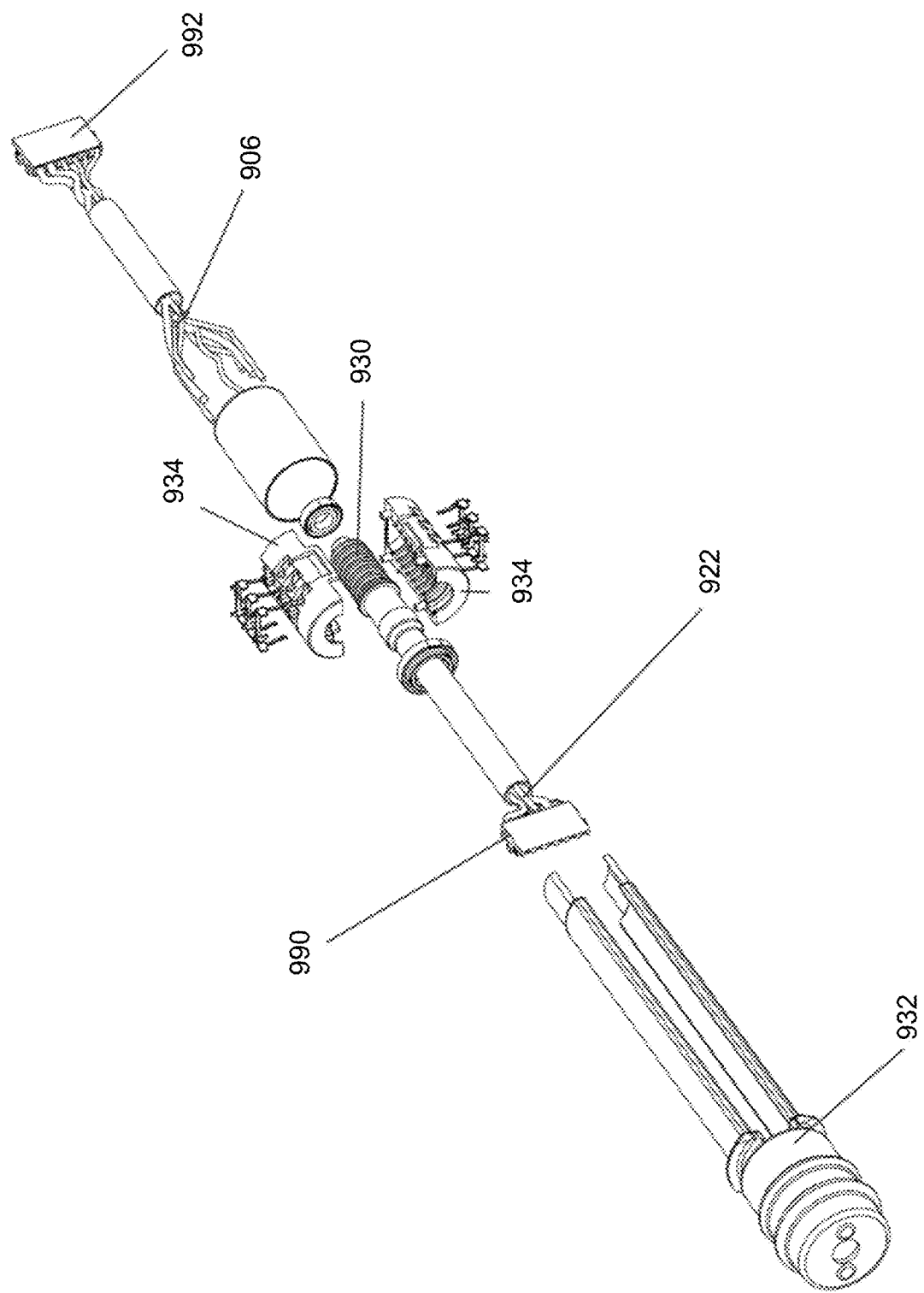

Turning now to FIGS. 9B-9D, the camera 118 in some implementations includes a hinge assembly having a ball assembly 912 about which the head assembly 702 may be configured to rotate in two or more degrees of freedom. In some implementations, the ball assembly 912 is coaxial with and rigidly fixed to the stem 916. In some implementations, the ball assembly 912 includes a spherically curved convex bearing surface 940 that is radially symmetric about an axis which is coaxial with an axis of the stem 916. In some implementations, the ball assembly 912 is positioned partially within the casing 711 of the head assembly 702. In some implementations, the ball assembly 912 may be disposed around at least a portion of the stem 916. In some implementations, the head assembly 702 is configured to rotate about one or more axes which pass through the center of the ball assembly 912. In some implementations, the head assembly 702 may be configured to tilt with respect to the stem 916 about the ball assembly 912 in a first degree of freedom such that the central axis of the head assembly 702 (e.g., the optical axis) forms an angle with respect to the axis of the stem 916 from 0° (where the central axis of the head assembly 702 is coaxial with the axis of the stem 916) up to, for example, 45°, 50°, 55°, 60°, 65°, 70°, 75°, 80°, 85°, or 90° (where the central axis of the head assembly 702 is perpendicular to the axis of the stem 916). In further implementations, the head assembly 702 is configured to rotate about an axis of the ball assembly 912 which is coaxial with the axis of the stem 916 in a second degree of freedom. In some implementations, the head assembly 702 is configured to be able rotate about the axis of the stem 916 while the head assembly 702 is tilted with respect to the axis of the stem 916.

In certain implementations, the ball assembly 912 may be positioned at least partially within a collar 814, which is coupled to the head assembly 702 at a position that is opposite of the front face 706. In some implementations, the collar 814 is disposed about at least a portion of the stem 916. In some implementations, the collar 814 is configured to move with the head assembly 702 when the head assembly 702 is tilted and/or rotated about the ball assembly 912. In some implementations, the collar 814 includes a cutout 810 (best which provides a clearance for the stem 916 when the head assembly 702 is tilted with respect to the stem 916. In further implementations, the head assembly 702 is configured to rotate with respect to the collar 814. In some implementations, the head assembly 702 is configured to rotate with respect to the collar 814 about the central axis of the head assembly 702 to allow for the clocking motion in a third degree of freedom. In some implementations a low friction liner 942 may be provided between collar 814 and the head assembly 702 to provide smooth rotation between the head assembly 702 and collar 814. The low friction liner 942, for example, may be a washer disposed around a portion of collar 814 and made from a low friction polymer, for example, a fluoropolymer such as polytetrafluoroethylene (PTFE).

In some implementations, the head assembly 702 may be rotated about the ball assembly 912 manually by the user without the use of or need for additional tools. In some embodiments, after the camera 118 has been affixed to a wall or other desired surface, the head assembly 702 may be rotated about the ball assembly 912 by a user using only a single hand. In further implementations, the hinge assembly is configured to maintain the head assembly 702 in the desired position and orientation set by the user without the need for the user to engage a separate clamping or locking mechanism (e.g., set screws). In some implementations, friction between bearing surface 940 of the ball assembly 912 and one or more other components is at least sufficient to maintain the position of the head assembly 702 with respect to the ball assembly 912 such that, for example, the weight of the head assembly 702 will not cause the head assembly 702 to drift or move away from the position set by the user. In some such implementations, the ball assembly 912 may be positioned between two or more surfaces configured to abut against bearing surface 940 with sufficient force to maintain the head assembly 702 in position with respect to the ball assembly 912 until, for example, an additional force greater than the frictional force and/or greater than the frictional force and weight of the head assembly 702 is applied to the head assembly 702 (e.g., by the user). In some implementations, the hinge assembly includes one or more biasing elements (e.g., springs) that are positioned and configured to bias the two or more surfaces against bearing surface 940 to generate the sufficient frictional force.

In some implementations the ball assembly 912 may be positioned against a first friction surface 944 that is configured to abut against a first portion of bearing surface 940 (e.g. on a first hemisphere of the ball assembly 912). In further implementations, a second friction surface 938 may be positioned and configured to abut against a second portion of bearing surface 940 (e.g., on a second hemisphere of the ball assembly 912). In some implementations, the first friction surface 944 is positioned between collar 814 and the ball assembly 912. In some implementations, the first friction surface 944 and the second friction surface 938 may be made of the same materials. In other implementations, the first friction surface 944 and the second friction surface 938 may be made of different materials selected, for example, to have different coefficients of friction. For example, in some implementations, the second friction surface 938 may be selected to have a lower coefficient of friction than the first friction surface 944. In other implementations, the second friction surface 938 may be selected to have a higher coefficient of friction than the first friction surface 944. In some implementations, bearing surface 940 may made from a metal or metal alloy and first and second friction surfaces may be made from plastic or thermoplastic materials. Preferably, bearing surface 940 and/or first and second friction surfaces are made from materials with relatively low wear rates or high durability according to some implementations. In some implementations, bearing surface 940 may be treated to create a desired amount of friction. For example, in some implementations, bearing surface 940 may be textured, for example, by abrasive blasting, etching, etc. In some implementations, bearing surface 940 maybe chemically treated, for example, anodized to create an oxide surface layer or electroplated. In one example implementation, bearing surface 940 may be made from an aluminum alloy, for example, 6063 aluminum alloy, which has been abrasive blasted and/or anodized.

The first and second friction surfaces may be made from materials which are different than the material used to form bearing surface 940. In some implementations, the first and second friction surfaces are made from polymeric materials or composite materials. In some implementations, the first and second friction surfaces may be made from relatively low friction materials. In some implementations, use of low friction materials may allow for smoother movement of the head assembly 702 about bearing surface 940. For example, in some implementations, first and/or second friction surfaces may include polyoxymethylene or acetal resins (e.g., available under the tradename DELRIN®). In some implementations, the first and/or second friction surfaces may include polytetrafluoroethylene (PTFE) or PTFE incorporated into other polymers (e.g, acetal resins impregnated with PTFE fibers).

In order to create the necessary frictional force with the use of low friction materials for the first and/or second friction surfaces, a biasing element 924 may be provided according to some implementations which is configured to increase the contact force or normal force between bearing surface 940 of the ball assembly 912 and the first and/or second friction surfaces. In some implementations, the biasing element 924 is a spring (e.g., a compression or coil spring) which is positioned to press the second friction surface 938 against bearing surface 940. In some implementations, the second friction surface 938 is at least partially positioned between the biasing element 924 and the ball assembly 912. In some implementations, biasing element is a compression spring that is disposed within the casing 711 and around the central axis of the head assembly 702 (e.g., the optical axis). In some implementations, the biasing element 924 is configured to provide a continuous spring force in a direction that is parallel to or coaxial with the central axis of the head assembly 702. In some implementations, the biasing element 924 is arranged and positioned to continuously provide a spring force toward the ball assembly 912 of at least 180 N, at least 190 N, at least 200 N, at least 210 N, at least 220 N, at least 230 N, at least 240 N, at least 250 N, at least 260 N, at least 270 N, at least 280 N, at least 290 N, or at least 300 N. In some implementations, the biasing element 924 is arranged and positioned to continuously provide a spring force toward the ball assembly 912 between 180 N and 300 N, between 190 N and 290 N, between 200 N and 280 N, between 210 N and 270 N, between 220 N and 260 N, or between 230 N and 250 N.

In some implementations, a communication board is connected to one or more interconnect wires arranged in a cable bundles 906, 922 that may be configured to transmit power and/or data signals between communication board and the one or more components in the head assembly 702 (e.g., the main board 1016). In some implementations, cable bundles 906,922 may be routed from communication board in ball assembly 912 and at least partially through biasing element 924, generally along the central axis of head assembly 702. In some implementations, cable bundles 906,922 may have a length to provide enough slack to accommodate the movement of head assembly 702 with respect to ball assembly 912, for example, the tilting of head assembly 702.

In some implementations, the cable bundle 906 connects to the communication board via connector 992. In some implementations, the cable bundle 922 is in electrical communication with electronics of head assembly 702 via connector 990. In some implementations, cable bundles 906 and 922 are coupled via a rotary electrical joint or slip ring connection (e.g., composed of ring assembly 930 and brush elements 934) to electrically connect cable bundle 906 with cable bundle 922 while further allowing the cable bundle 906 to rotate with respect to the cable bundle 922. In some implementations, the slip ring connection allows the head assembly 702 to rotate with respect to ball assembly 912 without cable bundles becoming impinged or severely twisted. In some implementations, the slip ring connection includes a ring assembly 930 having one or more ring-shaped electrical contacts electrically connected to the wires in the cable bundle 906. The slip ring connection, in some implementations, also includes one or more conductive brush elements 934 electrically connected to the wires in the cable bundle 922 and which are configured to touch and make electrical contact with the one or more ring-shaped electrical contacts of ring assembly 930. The brush elements 934 include, in some implementations, biasing elements configured to bias the brush elements against the one or more ring-shaped electrical contacts of ring assembly 930. The brush elements 934 are preferably configured to maintain electrical contact with the ring assembly 930 even as ring assembly 930 rotates with respect to the brush elements 934. In some implementations, the slip ring connection may be positioned within the biasing element 924. In some implementations, the slip ring connection is positioned within a tube which extends through biasing element 924. In some such implementations, slip ring connection may be further covered by a sealing element to provide a liquid-tight seal around slip ring connection to help prevent the flow of water into head assembly through the tube.

Figure 10A:
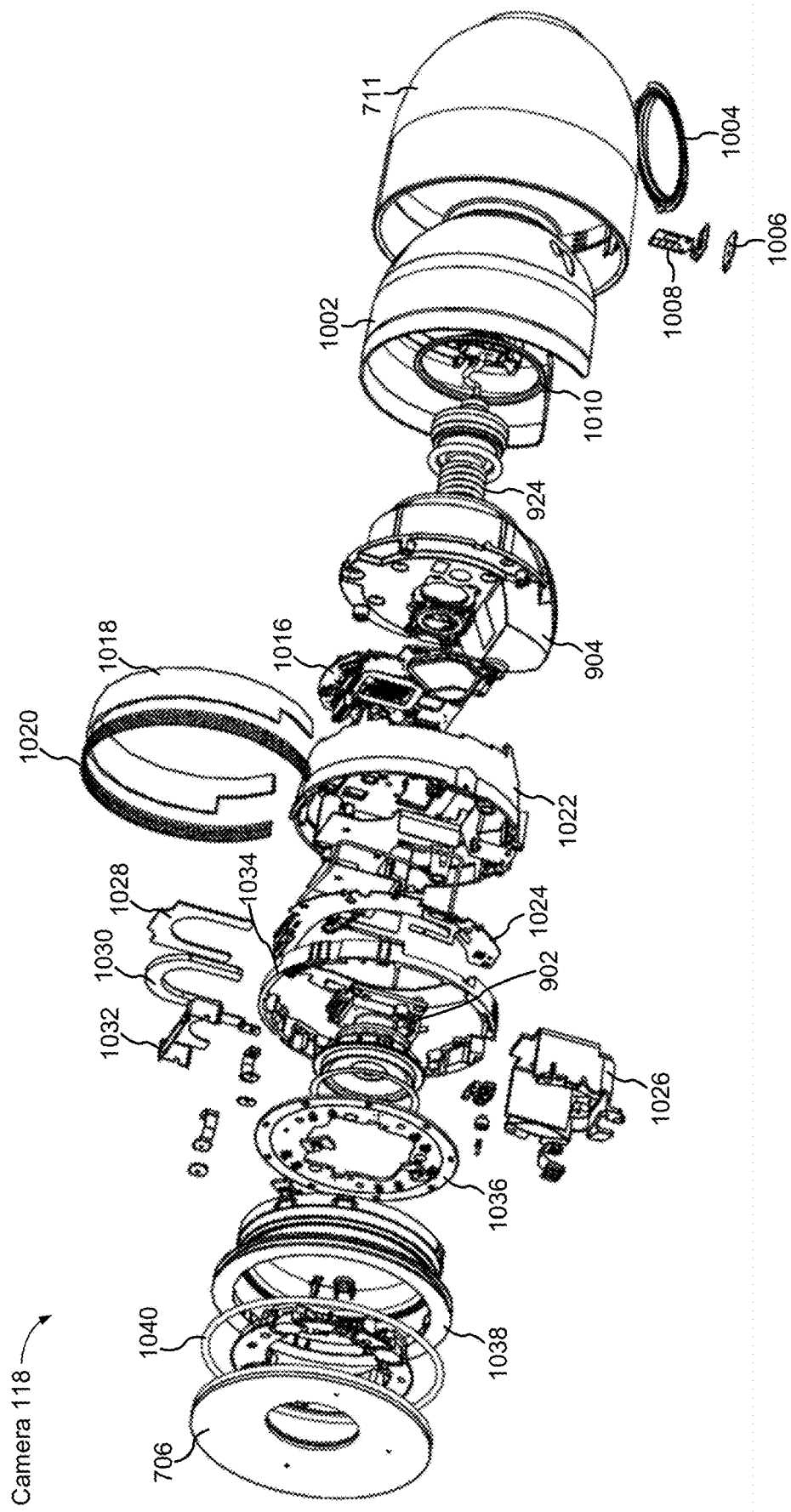
FIGS. 10A-10B are additional component views illustrating a representative camera assembly in accordance with some implementations.
Figure 10B:
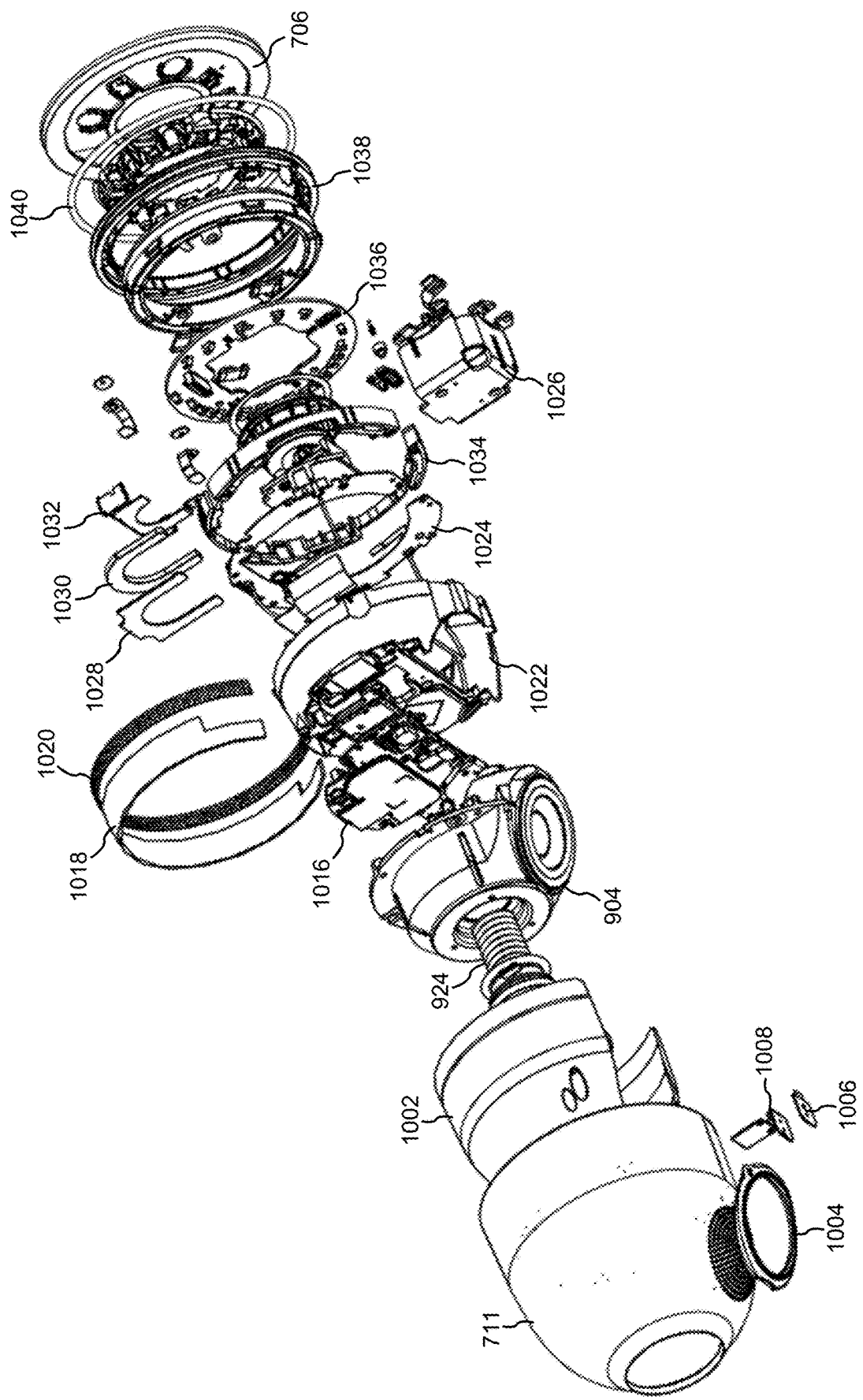

FIGS. 10A-10B are additional component views illustrating a representative camera assembly in accordance with some implementations. As shown in FIGS. 10A-10B, the camera assembly 118 includes the front face 706, a sealing ring 1040, a ring guide 1038, an illuminator assembly 1036, the image sensor assembly 902, a sensor heatsink 1026, sensor shielding 1032, sensor pressure material 1030, a sensor pressure plate 1028, and a front face snap ring 1034. In some implementations, the sealing ring 1040 and the ring guide 1038 are configured to prevent water from entering the camera assembly between the casing 711 and the front face 706. In some implementations, the illuminator assembly 1036 includes a plurality of RGB LEDs (e.g., 4, 6, or 8 LEDs). In some implementations, the illuminator assembly 1036 includes a status LED and/or an ambient light sensor. In some implementations, the front face snap ring 1034 is configured to attach to the front face 706. In some implementations, the front face snap ring 1034 is configured to attach to the front face 706 via a snapping motion. In some implementations, the front face snap ring 1034 is configured to engage the front face 706 via a snapping mechanism. In some implementations, the front face snap ring 1034 is configured to detach from the front face 706 via a twisting motion.

In some implementations, the image sensor assembly 902 includes an active heating module (e.g., a heating sticker). In some implementations, the active heating module is attached to an outside surface of the sensor heatsink 1026, such that, when active, the heating module heats the image sensor through the sensor heatsink 1026. In some implementations, the active heating module is attached to an interior surface of the sensor heatsink 1026 such that the active heating module is enabled to heat the image sensor directly. In some implementations, the active heating module is affixed to an image sensor board of the image sensor assembly 902.

In some implementations, the image sensor comprises a fixed-focus image sensor and the active heating module is configured to maintain the fixed-focus image sensor at temperatures that minimize a temperature impact on sharpness and/or focus of the fixed-focus image sensor. In some implementations, the active heating module is configured to maintain the image sensor at a target operating temperature so as to optimize sharpness during operation.

In some implementations, the active heating module is coupled to one or more temperature sensors (e.g., temperature sensors located on the image sensor assembly 902, the illuminator assembly 1036, and/or the main board 1016). In some implementations, the active heating module is affixed to a side of the image sensor and is enclosed by the sensor heatsink 1026. In some implementations, the active heating module is configured to maintain the image sensor at temperatures within a preferred temperature range (e.g., 50 degrees Fahrenheit to 70 degrees Fahrenheit) while the image sensor is in operation. In some implementations, the active heating module is configured to provide heat in the range of 20 degrees Fahrenheit to 30 degrees Fahrenheit to the image sensor. In some implementations, the active heating module is communicatively coupled to the main board 1016 and/or an image sensor board of the image sensor assembly 902.

In some implementations, the active heating module determines an operating temperature cycle for the image sensor (e.g., a 24 hour temperature cycle). In some implementations, the active heating module utilizes the determined temperature cycle to pre-emptively adjust the temperature of the image sensor. In some implementations, the active heating module does not comprise any moving parts and therefore is more robust and cheaper than an auto-focus system.

In some implementations, the optimal temperature differs for different cameras 118 and is determined on a per-device basis. In some implementations, the active heating module determines the optimal operating temperature for the image sensor by recording system temperature and image sharpness (of the current scene) through at least one thermal cycle. In some implementations, the thermal cycle corresponds to a 24-hour period. In some instances, the relationship between the temperature and sharpness is a parabola. The optimal temperature is thus determined by selecting the temperature at the peak of the parabola (e.g., at peak sharpness). In some implementations, the optimal temperature is determined after the camera 118 has been installed in the smart home environment 100.

In some implementations, the front face 706 comprises a chemically-strengthened glass. In some implementations, the front face 706 comprises a soda-lime glass (e.g., the inner portion of the front face 706 corresponding to the field of view of the image sensor).

In some implementations, the sensor heatsink 1026 is composed of magnesium. In some implementations, the sensor heatsink 1026 is adapted to dissipate heat from the image sensor assembly 902. In some implementations, the sensor heatsink 1026 is adapted to provide structural support to the camera 118. In some implementations, the sensor heatsink 1026 is adapted to protect the image sensor assembly 902 from environmental forces such as moisture and/or impact from objects and/or the ground. In some implementations, the sensor heatsink 1026 is configured to affix the image sensor assembly 902 to the front face 706. In some implementations, the sensor heatsink 1026 is configured to inhibit electromagnetic interference with the image sensor assembly 902 (e.g., from the antenna ring 1024).

In some implementations, the sensor pressure plate 1028 is configured to provide constant pressure on the image sensor assembly 902 against the front face 706 to increase adhesive effectiveness and waterproofing. In some implementations, the sensor heatsink 1026 and the sensor pressure plate 1028 are configured to provide constant pressure on the image sensor assembly 902 against the front face 706. In some implementations, the sensor pressure material 1030 is configured to inhibit electromagnetic interference with the image sensor assembly 902. In some implementations, the sensor pressure material 1030 is configured to transfer heat from the image sensor assembly 902 to the sensor heatsink 1026.

In some implementations, the sensor shielding 1032 is configured to inhibit electromagnetic interference with the image sensor assembly 902. In some implementations, the sensor shielding 1032 is configured to (e.g., in conjunction with the sensor heatsink 1206) reduce and/or eliminate radio frequency (RF) interference with the image sensor assembly 902 (e.g., from one or more antennas of the camera assembly 118). In some implementations, the sensor shielding 1032 is adapted as desense shielding for the image sensor 902.

As shown in FIGS. 10A-10B, the camera assembly 118 further includes an antenna ring 1024, a main heatsink 1022, shielding material 1020 (e.g., shielding foam), thermal material 1018, a main board 1016, the speaker assembly 904, the biasing element 924 (e.g., a hinge spring), a sealing ring 1010, an inner housing 1002, a microphone 1008, a microphone membrane 1006, a speaker seal 1004, and the casing 711.

In some implementations, the thermal material 1018 is adapted to thermally couple the inner layer 1002 and the main heatsink 1022 to the casing 711. In some implementations, the thermal material 1018 is composed of a metal or metal alloy. In some implementations, the thermal material 1018 is composed of one or more thermal pads.

In some implementations, the antennas ring 1024 includes a plurality of antennas (e.g., 2, 3, or 4 antennas). In some implementations, the antennas ring 1024 includes a plurality of antennas equidistance from one another. In some implementations, the antennas ring 1024 is composed of metal or a metal alloy. In some implementations, the shielding material 1020 is configured to inhibit signal interference between the components on the main board 1016 (e.g., the SoC) and the antennas on the antenna ring 1024. In some implementations, the shielding material 1020 is configured to isolate RF signals of the main board components from the antennas.

In some implementations, the antennas are configured to enable the camera 118 to wirelessly communication with one or more other electronic devices, such as a hub device 180, a smart device 204, and/or a server system 164. In some implementations, the plurality of antennas is configured to operate concurrently using two distinct frequencies. In some implementations, the plurality of antennas is configured to operate concurrently using two distinct communication protocols. In some implementations, one or more of the antennas is configured for broadband communications (e.g., Wi-Fi) and/or point-to-point communications (e.g., Bluetooth). In some implementations, one or more of the antennas is configured for mesh networking communications (e.g., ZWave). In some implementations, a first antenna of the plurality of antennas is configured for 2.4 GHz Wi-Fi communication and a second antenna of the plurality of antennas is configured for 5 GHz Wi-Fi communication. In some implementations, a first antenna of the plurality of antennas is configured for 2.4 GHz Wi-Fi communication and point-to-point communication, a second antenna of the plurality of antennas is configured for 5 GHz Wi-Fi communication and point-to-point communication, and a third antenna of the plurality of antennas is configured for mesh networking communication. In some implementations, two or more of the antennas are configured to transmit and/or receive data concurrently with others of the antennas.

MIMO (multi input multi output) provides the benefit of greater throughput and better range for the wireless communication. One of the parameters in the antenna system is the isolation between two antennas. Better isolation can ensure the data transmitted through two antennas are uncorrelated which is the key to the MIMO system. One way to achieve good isolation is to have large antenna separations. However, in modern consumer electronics the space left for antennas is very tight so having enough spacing between antennas is infeasible. While isolation is important, the antenna efficiency cannot be sacrificed.

Isolation is directly related to how much energy is coupled from one antenna to another. The Friis equation defines the power received by another antenna as inversely proportional to $(1/R)^2$, where R is the distance between two antennas. So increasing antenna spacing is one effective way to achieve good isolation. Another means to achieve isolation is through use of a decoupling network. For example, an artificial coupling channel is generated in additional to its original coupling channel (e.g., which is through air). By properly managing the two coupling channels, the good isolation can be achieved.

In some implementations, the antennas include at least one dual-band Inverted-F Antenna (IFA). In some implementations, the antennas are made by FPC, LDS, Stamping, or other state of art antenna manufacturing technology. In some implementations, the illuminator assembly 1036 is configured to provide an electrical ground for one or more of the antennas. In some implementations, the illuminator assembly 1036 includes a plurality of electrically-conductive contacts 1037 configured to contact the antenna ring 1024 and inhibit interference between antennas of the antenna ring 1024. In some implementations, the plurality of electrically-conductive contacts comprises a plurality of metallic protrusions along a backside of the illuminator assembly 1036. In some implementations, the plurality of electrically-conductive contacts 1037 is configured to contact an electrical ground of the antenna ring 1024.

In some implementations, the main heatsink 1022 is configured to provide structural support for the camera assembly 118 (e.g., to be resistant to impact from objects and/or the ground). In some implementations, the main heatsink 1022 is configured to dissipate heat to the casing 711. In some implementations, the main heatsink 1022 is configured to dissipate heat from the main board 1016 to the casing 711. In some implementations, the main board 1016 is configured to mount to the main heatsink 1022. In some implementations, the main heatsink 1022 is configured to couple to the speaker assembly 904 (e.g., with the main board 1016 in between). In some implementations, the main heatsink 1022 is configured to dissipate heat from the speaker assembly 904 to the casing 711. In some implementations, the main heatsink 1022 is composed of a thermally-conductive material (e.g., magnesium).

In some implementations, the main board 1016 and the speaker assembly 904 are thermally isolated from the image sensor assembly 902. Thermally de-coupling the main board 1016 from the image sensor assembly 902 prevents heat generated by the main board 1016 from interfering with the image sensor assembly 902. In accordance with some implementations, heat generated by the front of the main board 764 is transferred to the main heatsink 1022 to the thermal material 1018 and dissipated outside of the camera via the casing 711 (e.g., the sides of the casing). In accordance with some implementations, heat generated by the back of the main board 1016 is transferred to the speaker assembly 904 and dissipated outside of the camera via the casing 711.

In some implementations, the bottom seal 1010 is configured to inhibit water from entering an interior of the camera assembly 118 from the base assembly 704. In some implementations, the speaker seal 1004 is configured to inhibit water from entering an interior of the camera assembly 118. In some implementations, the speaker seal 1004 is configured to acoustically and/or hermetically seal the speaker assembly 904. In some implementations, the microphone membrane 1006 is configured to inhibit water from entering an interior of the camera assembly 118 via the microphone aperture 713. In some implementations, the microphone membrane 1006 is configured to enable air to flow from an interior of the camera assembly 118 to the environment. For example, the membrane 1006 is configured to equalize internal and external pressure of the camera assembly by enabling the release of air through the microphone aperture 713.

In some implementations, the camera assembly 118 includes one or more forward-facing microphones as well as microphone 1008. In some implementations, the microphone 1008 is operated in conjunction with the forward-facing microphones to determine directionality and/or location of incoming sounds.

Figure 11A:
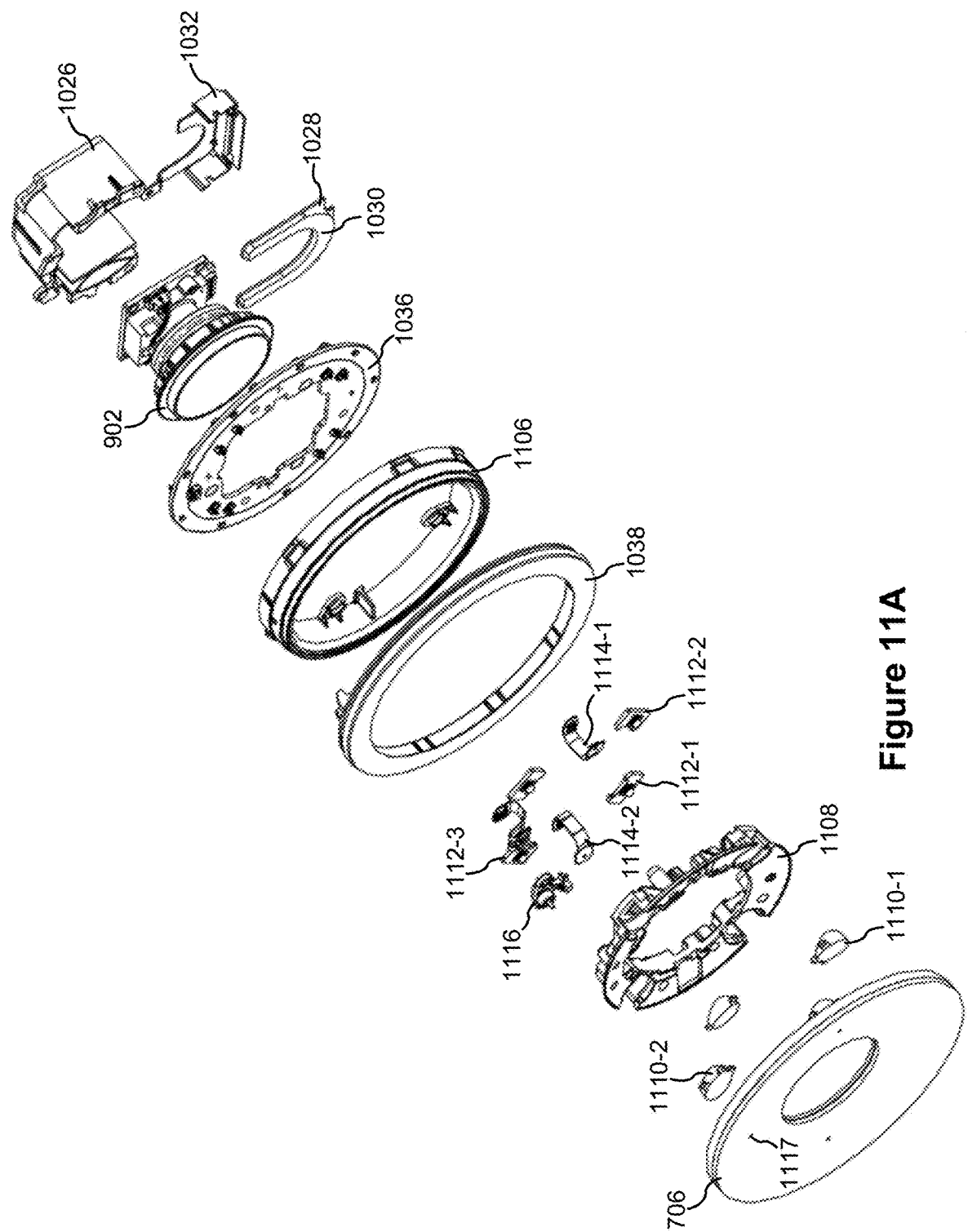
FIGS. 11A-11C are additional component views illustrating a representative camera assembly in accordance with some implementations.
Figure 11B:
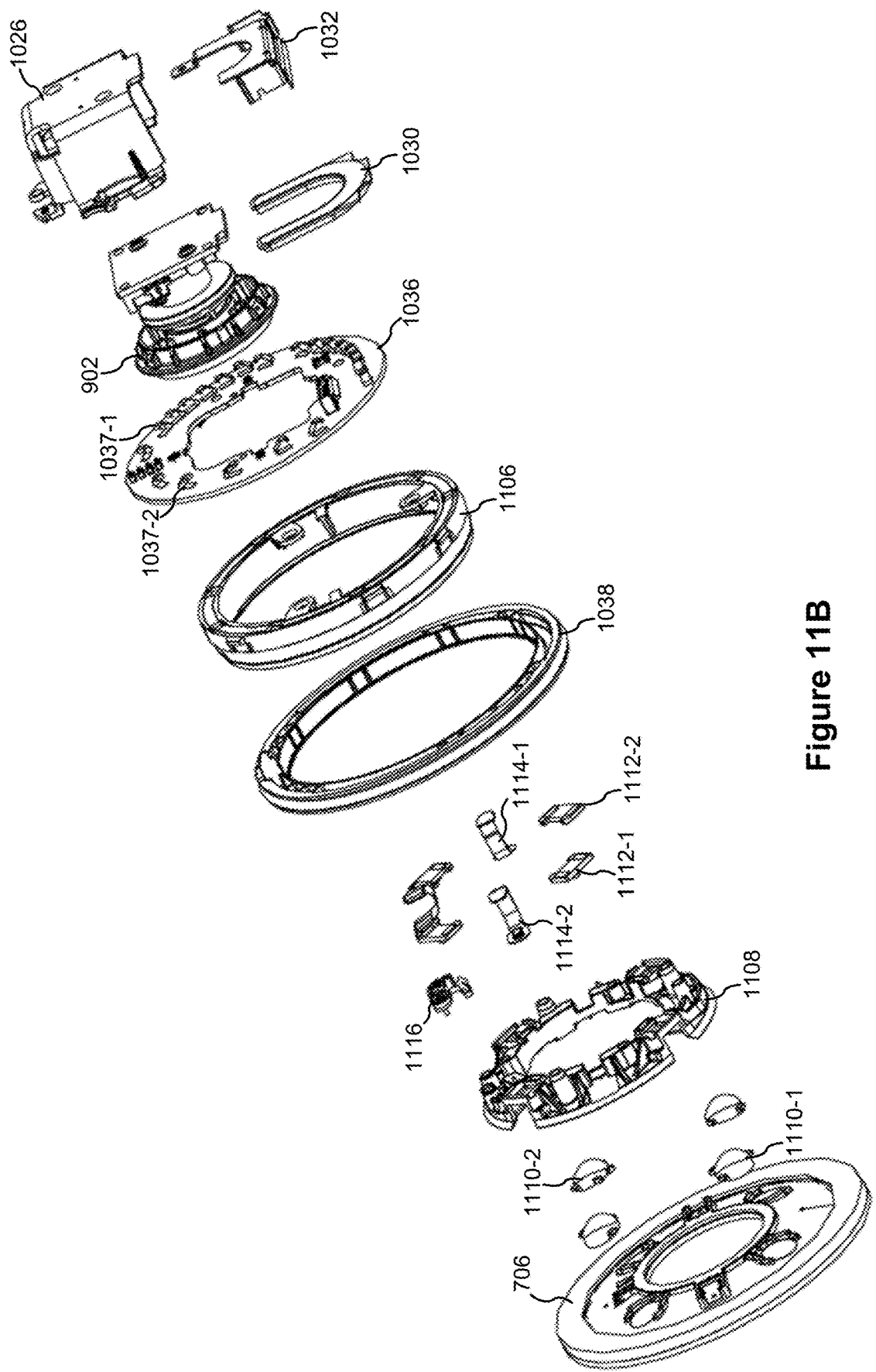
Figure 11C:
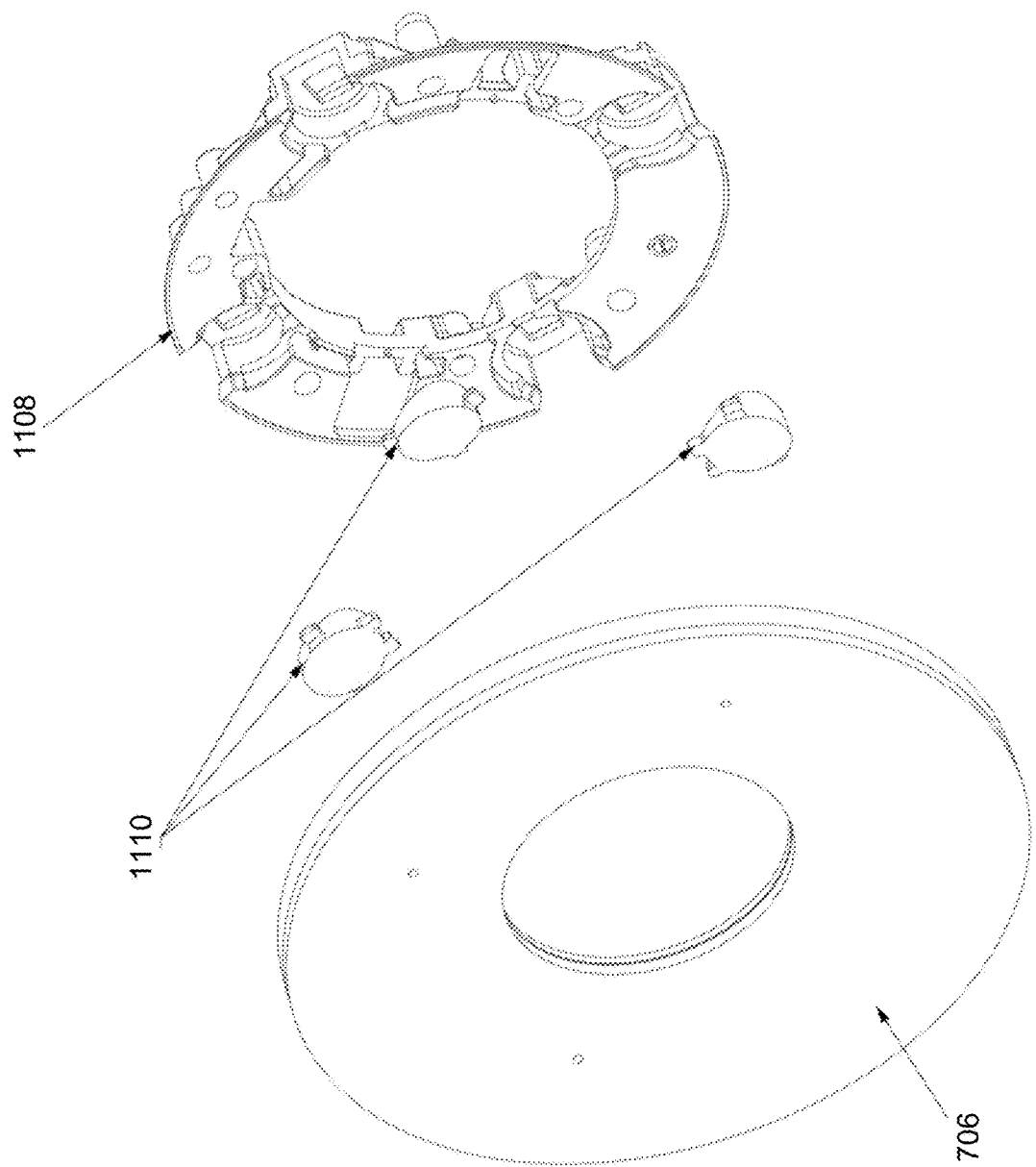

FIGS. 11A-11C are additional component views illustrating a representative camera assembly in accordance with some implementations. FIGS. 11A-11C show various perspective views of the front face 706 and image sensor assembly 902. As shown in FIGS. 11A-11C, the camera assembly 118 includes the image sensor assembly 902, the sensor pressure material 1030 (e.g., pressure foam), the sensor pressure plate 1028, the sensor heatsink 1026, the sensor shielding 1032, and a reset mechanism 1116 corresponding to reset aperture 1117 in the front face 706. In some implementations, the reset mechanism 1116 enables a user of the camera 118 to perform a factory reset. In some implementations, the reset mechanism 1116 includes one or more components (e.g., a membrane) to inhibit water from entering an interior of the camera assembly 118.

As shown in FIGS. 11A-11C, the camera assembly 118 also includes the front face 706, a plurality of lenses 1110 corresponding to a plurality of infrared (IR) illuminators 1112 (e.g., IR LEDs), a thermally-conductive mount 1108, IR illuminators 1112, microphones 1114 (e.g., flex microphones), a light guide 1106, and the illuminator assembly 1036. In some implementations, the thermally-conductive mount 1108 is composed of plastic and/or nylon. In some implementations, the thermally-conductive mount 1108 is configured to couple illuminator assembly 1036 to the front face 706. In some implementations, the thermally-conductive mount 1108 is configured to transfer heat from illuminator assembly 1036 to the front face 706. In some implementations, the thermally-conductive mount 1108 is configured to transfer heat from the IR illuminators 1112 to the front face 706. In some implementations, the thermally-conductive mount 1108 is configured to couple IR illuminators 1112 and the lenses 1110 to the front face 706. In some implementations, the thermally-conductive mount 1108 is composed of a thermally-conductive plastic. In some implementations, the thermally-conductive mount 1108 is composed of a plastic infused with metal to assist with heat transfer from the illuminators to the front face 706.

In some implementations, the IR illuminators 1112 are configured to be independently operated. In some implementations, subsets of the IR illuminators 1112 are utilized during particular modes of operation of the camera assembly 118. For example, subsets of the IR illuminators 1112 are used to perform depth mapping of the scene, or to relay IR commands to external devices.

In some implementations, the front face 706 includes a first element (e.g., a glass or plastic lens) that resides in front of the image sensor and a second element (e.g., a glass or plastic lens) that resides in front of the illuminators (e.g., between the first element and the periphery of the camera 118). In some implementations, the second element has a concave shape.

In some implementations, the front face 706 includes a cover glass having a thickness of 1 mm, or approximately 1 mm. In some implementations, a light absorbing coating (e.g., a film or ink) and anti-reflective coating is added onto the rear of the front face 706 to prevent the light scattering. In some implementations, the coating comprises a smooth, matte ink that is light absorbing across all wavelengths of light. In some implementations, the front face 706 includes a silkscreen logo. In some implementations, a first section of the front face 706 (e.g., a section that does not correspond to either the image sensors or the illuminators) is coated with an opaque film adapted to absorb visible and IR light. In some implementations, the film is an ink. In some implementations, second sections of the front face 706 (e.g., corresponding to the IR illuminators 1112) are coated with an IR transparent film adapted to absorb visible light (e.g., is opaque or semi-opaque to visible light). In some implementations, third sections of the front face 706 are coated with a film that is semi-transparent (e.g., semi-transparent to IR and/or visible light). In some implementations, the third sections correspond to a status illuminator and/or an ambient light sensor. In some implementations, the front face 706 is coated with an anti-reflection coating. For example, the front face 706 is coated first with the thin films then with the anti-reflection coating on top of the thin films. In some implementations, the coatings are applied to the inner surface of the front face 706. In some implementations, at least one of the coatings is applied to the outer surface of the front face 706. In some implementations, the front face 706 has an anti-reflection coating applied to both the inner and outer surfaces. In some implementations, the front face 706 includes an opaque coating to prevent, or substantially prevent, light from the illuminator assembly 1036 from entering the image sensor.

In some implementations, one or more of the coatings comprise a smooth ink adapted to absorb, not scatter, light. For example, an opaque ink adapted to absorb visible and IR light. In some implementations, one or more of the coatings are adapted to absorb at least 99% of the light. For example, the opaque coating is adapted to absorb at least 99% of visible and IR light. In some implementations, one or more of the coatings comprise a rough ink adapted to scatter light. In some implementations, one or more of the coatings are applied via vapor deposition. In some implementations, one or more of the coatings are applied via thin film deposition. In some implementations, one or more of the coatings are applied via a pattern printing process. In some implementations, one or more of the coatings are applied via a spray-on process. In some implementations, the one or more coatings and/or the silk screen are applied utilizing an in-mold labeling process.

In some implementations, the lenses 1110 comprise toroidal lenses configured to distribute light from the IR illuminators 1112. In some implementations, the lenses 1110 are adapted to improve efficiency of the IR illuminators 1112. The lenses 1110 are particularly important when using IR illuminators having a wavelength that is not optimal for the image sensor, since more intensity is needed in order to illuminate the scene for the image sensor. In some implementations, the lenses 1110 are adapted to prevent hot spots in the scene due to overlapping illumination from multiple IR illuminators. In some implementations, the lenses 1110 are adapted to direct and/or restrict the illumination from the IR illuminators to the portion of a scene captured by the image sensor. For example, when the image sensor is adapted to capture a 16:9 rectangular portion of the scene the lenses 1110 are adapted to provide substantially uniform illumination in that portion and/or substantially no illumination outside of that portion. In some implementations, the lenses 1110 are shaped and/or positioned so as to provide substantially uniform illumination in that portion and substantially no illumination outside of that portion. In some implementations, the lenses 1110 are shaped and/or positioned so as to minimize overlap between IR illuminators.

In some implementations, the camera 118 includes a plurality of lenses 1110, each corresponding to particular IR illuminator. For example, the camera 118 includes four IR illuminators 1112 and four lenses 1110. In some implementations, the lenses 1110 are configured such that the IR illumination from IR illuminators corresponding to the multiple lenses 1110 is directed to provide substantially uniform illumination in a portion of a scene corresponding to the camera's field of view, and/or substantially no illumination outside of that portion. In some implementations, the camera's image sensor is adapted to capture wide angle images (e.g., a fisheye view). In some implementations, the lenses 1110 are configured to provide substantially uniform illumination over the wide angle field of view.

In some implementations, the image sensor is configured to capture IR light (e.g., IR light having a wavelength of 940 nm or 850 nm). In some implementations, the IR light is converted (e.g., at the camera 118) to white light for display to a user. In some implementations, the IR illuminators 1112 consist of four IR LEDs. In some implementations, the wavelength of the IR illuminators 1112 is adjusted to be further from the visible spectrum. For example, the wavelength of the IR illuminators is adjusted to 940 nm rather than 850 nm. Adjusting the IR illuminators to be further from the visible spectrum of light means that the IR illumination from the illuminators is less visible (or invisible) to the human eye. Therefore it is important that the IR illuminators are used as efficiently as possible. For example, the IR illuminators are configured to only illuminate the portion of the scene that is captured by the image sensor.

In some implementations, the image sensor has a rectangular field of view corresponding to +/−32 degrees vertical and +/−56 horizontal. In some implementations, the IR illuminators 1112 are configured to emit light in a hemispherical pattern. Therefore, there is a need to direct and shape the light from the IR illuminators to illuminate the image sensor's field of view, while minimizing illumination outside of the field of view and overlap between IR illuminators causing hot spots in the sensed image.

In some implementations, the lenses 1110 are configured to direct and shape the light from the IR illuminators to illuminate the image sensor's field of view, while minimizing illumination outside of the field of view and overlap between IR illuminators causing hot spots in the sensed image. In some implementations, the lenses 1110 are each configured to shape the IR light from the IR illuminators to correspond to the field of view of the camera 118 (e.g., of an image sensor of the camera 118). In some implementations, the lenses 1110 and the illuminators 1112 are positioned to minimize overlap in illumination between the IR illuminators 1112. In some implementations, the lenses 1110 are positioned such that illumination from the IR illuminators 1112 is substantially uniform across the field of view of the image sensor. In some implementations, the lenses 1110 are positioned so as to provide increased illumination (e.g., 1.2, 1.5, or 2 times the illumination) in the center of the field of view of the camera.

In some implementations, the lenses 1110 are configured to optimize energy distribution from the IR illuminators in the field of view of the camera. In some implementations, the lenses 1110 are configured to maximize the energy from the IR illuminators within the field of view of the image sensor while minimizing the energy wasted outside of the image sensor's field of view. In some implementations, the lenses 1110 are configured to shape the illumination from the IR illuminators such that the field of view of the camera is uniformly illuminated and areas outside of the field of view of the camera are not substantially illuminated.

In some implementations, the IR illuminators 1112 comprise IR LEDs having a wavelength of 940 nanometers. In some implementations, the IR illuminators 1112 comprise IR LEDs having a wavelength of 850 nanometers. In some implementations, the image sensor for the camera 118 is less sensitive to 940 nm light than it is to 850 nm light. Therefore, IR LEDs having a 940 nm wavelength cause less interference with the image sensor than IR LEDs having an 850 nm wavelength.

In some implementations, the illuminator assembly 1036 comprises an illuminator board, a plurality of visible light illuminators (e.g., RGB LEDs), and circuitry for powering and/or operating the visible light illuminators. In some implementations, the illuminator assembly 1036 includes circuitry from powering and/or operating the IR illuminators 1112.

In accordance with some implementations, the light guide 1106 includes a first (inner) section and a second (outer) section. In some implementations, the inner section is comprised of structural poly-carbonite. In some implementations, the outer section is transparent or semi-transparent to visible light. In accordance with some implementations, the illuminator assembly 1036 includes visible light illuminators (e.g., RGB LEDs) and an ambient light sensor. In some implementations, the illuminator assembly 1036 includes a plurality of RGB LEDs (e.g., 6, 8, 9, or 12 LEDs) and the light guide 1106 includes a corresponding recess for each of the LEDs. In some implementations, the visible light illuminators are configured to be controlled individually (e.g., controlled by the SoC 1322). In some implementations, each illuminator corresponds to a portion of the light guide 1106. For example, the light guide 1106 includes a first portion corresponding to a first illuminator and a second portion corresponding to a second illuminator. In some implementations, each illuminator is oriented in a clockwise manner and the light guide 1106 includes a corresponding portion extending from the location of the illuminator 1106 in a clockwise direction. In some implementations, each portion of the light guide 1106 ends with, or is bounded by, a segmentor (e.g., a light-absorbing substance) that is adapted to prevent light from the illuminator from entering other portions of the light guide. In some implementations, one or more surfaces of the light guide 1106 not facing the front of the camera are coated or otherwise treated with a light absorbing substance (e.g., a black ink) to prevent light from the illuminators from exiting the light guide 1106 at that location.

In some implementations, the light guide 1106 is adapted to direct light from the visible light illuminators out the face of the camera 118. In some implementations, the light guide 1106 is adapted to prevent light from the visible light illuminators from entering the image sensor assembly 902. In some implementations, the light guide 1106 is adapted to spread the light from the visible light illuminators in a substantially even manner. In some implementations, the light guide 1106 is composed of a clear material. In some implementations, the light guide 1106 is composed of a poly-carbonite material. In some implementations, the light guide 1106 has a plurality of dimples to refract the light from the illuminators and prevent the light from entering the image sensor assembly 902. In some implementations, the light guide 1106 is adapted to provide more uniform color and light output to a user from the illuminators. In some implementations, the light guide 1106 includes a plurality of segments, each segment corresponding to a visible light illuminator. In some implementations, the light guide 1106 includes one or more light absorbing elements (e.g., black stickers) arranged between each segment to prevent light leakage from one illuminator segment to another illuminator segment.

In some implementations, the light guide 1106 includes two or more sections (e.g., an inner section and an outer section). In some implementations, the light guide 1106 is adapted to diffuse the light from the visible light illuminators. In some implementations, the light guide 1106 is adapted to direct the light from the illuminators toward the front face 706. In some implementations, the illuminator assembly 1036 (and corresponding elements such as the light guide 1106) causes a circular colored (or white) light to be emitted from the front of the camera 118. In some implementations, the components and corresponding light are circular and arranged around the periphery of the front face 706. The resulting illumination ring optionally encircles all or substantially all elements of the camera 118, such as the image sensor assembly 902, the IR illuminators 1112, a ambient light sensor, a status LED, and the microphones 1114. In other implementations, the resulting illumination ring is not around the periphery but rather at an inner diameter, e.g., around only the image sensor assembly 902. In yet other implementations, the illuminators do not surround any front-facing element of the camera 118. In some implementations, the illuminators are arranged in a non-circular shape, such as a square, oval, or polygonal shape. In some implementations, the illuminators are not arranged on the front of the device but rather a different surface of the device, such as the bottom, top, sides, or back. In some implementations, multiple such illuminators and light-guiding components are arranged onto the same or different surfaces of the camera 118.

The illuminator assembly 1036 (and corresponding elements) optionally operate to indicate a status of the camera 118, another device within or outside of the smart home environment 100 (e.g., another device communicatively coupled either directly or indirectly to the camera 118), and/or the entire connected smart home environment 100

(e.g., a system status). The illuminator assembly 1036 (and corresponding elements) optionally causes different colors and/or animations to be displayed to a user that indicate such different statuses.

For example, in the context of communicating camera 118 status, when the camera 118 is booting for the first time or after a reset operation, the ring may pulse blue once at a slow speed. When the camera 118 is ready to begin setup, the ring may breathe blue continually. When the camera 118 is connected to a remote cloud service and provisioning is complete (i.e., the camera is connected to a user's network and account), the ring may pulse green once. When there is a service connection and/or provisioning failure, the ring may blink yellow at a fast speed. When the camera 118 is being operated to facilitate two-way talk (i.e., audio is captured from the audio and communicated to a remote device for output by that remote device simultaneously with audio being captured from the remote device and communicated to the camera 118 for output by the camera 118), the ring may breathe blue continuously at a fast speed. When the camera 118 is counting down final seconds before a factory reset, the ring may close on itself at a rate equal to the time until reset (e.g., five seconds). When the camera 118 has been factory and while the setting are being erased the ring may rotate blue continuously. When there is insufficient power for the camera 118 the ring may blink red continuously at a slow speed. The visual indications are optionally communicated simultaneously, concurrently, or separately from audio indications that signal to the user a same or supplemental message. For example, when the camera 118 is connected to a remote cloud service and provisioning is complete (i.e., the camera is connected to a user's network and account), the ring may pulse green once and output an audio message that "remote cloud service and provisioning is complete."

Additionally or alternatively, the camera 118 may communicate the status of another device in communication with the camera 118. For example, when a hazard detector 104 detects smoke or fire sufficient to alarm, the camera 118 may output a light ring that pulses red continuously at a fast speed. When a hazard detector 104 detects smoke or fire sufficient to warn a user but not alarm, the camera 118 may output a light ring that pulses yellow a number of times. When a visitor engages a smart doorbell 106 the camera 118 may output a light ring depending on the engagement; e.g., if the smart doorbell 106 detects motion, the camera 118 may output a yellow light ring, if a user presses a call button on the smart doorbell 106, the camera 118 may output a green light ring. In some implementations, the camera 118 may be communicatively coupled to the doorbell 106 to enable audio communication therebetween, in which case an animation and/or color of the light ring may change depending on whether the user is speaking to the visitor or not through the camera 118 or another device.

Additionally or alternatively, the camera 118 may communicate the cumulative status of a number of network-connected devices in the smart home environment 100. For example, a smart alarm system 122 may include proximity sensors, window break sensors, door movement detectors, etc. A whole home state may be determined based on the status of such a plurality of sensors/detectors. For example, the whole home state may be secured (indicating the premises is secured and ready to alarm), alarming (indicating a determination that a break-in or emergency condition exists), or somewhere in between such as pre-alarming (indicating a determination that a break-in or emergency condition may exist soon or unless some condition is satisfied). For example, the camera 118 light ring may pulse red continuously when the whole home state is alarming, may pulse yellow when the whole home state is pre-alarming, and/or may be solid green when the whole home state is secured. In some implementations, such visual indications may be communicated simultaneously (or separately from) with audio indications that signal to the user the same or supplemental message. For example, when the whole home state is alarming, the ring may pulse red once and output an audio message that indicates the alarm "alarm". In some implementations, the audio message may provide supplemental information that cannot be conveyed via the light ring. For example, when the whole home state is alarming due to a basement window being broken, the audio message may be "alarm—your basement window has been broken." For another example, when a pre-alarm amount of smoke has been detected by a hazard detector 104 located in the kitchen, the audio message may be "warning—smoke is detected in your kitchen."

In some implementations, the camera 118 may also or alternatively have a status LED. Such a status LED may be used to less-instructively communicate camera 118, other device, or multiple device status information. For example, the status light may be solid green during initial setup, solid green when streaming video and/or audio data normally, breathing green when someone is watching remotely, solid green when someone is watching remotely and speaking through the camera 118, and off when the camera 118 is turned off or the status LED is disabled. It should be appreciated that the status LED may be displayed simultaneously with the light ring. For example, the status LED may be solid green during setup while the light ring breathes blue, until the end of setup when the device is connected to the service and provisioning is complete whereby the status LED may continue to be solid green while the light ring switches to a single pulse green.

Figure 12B:
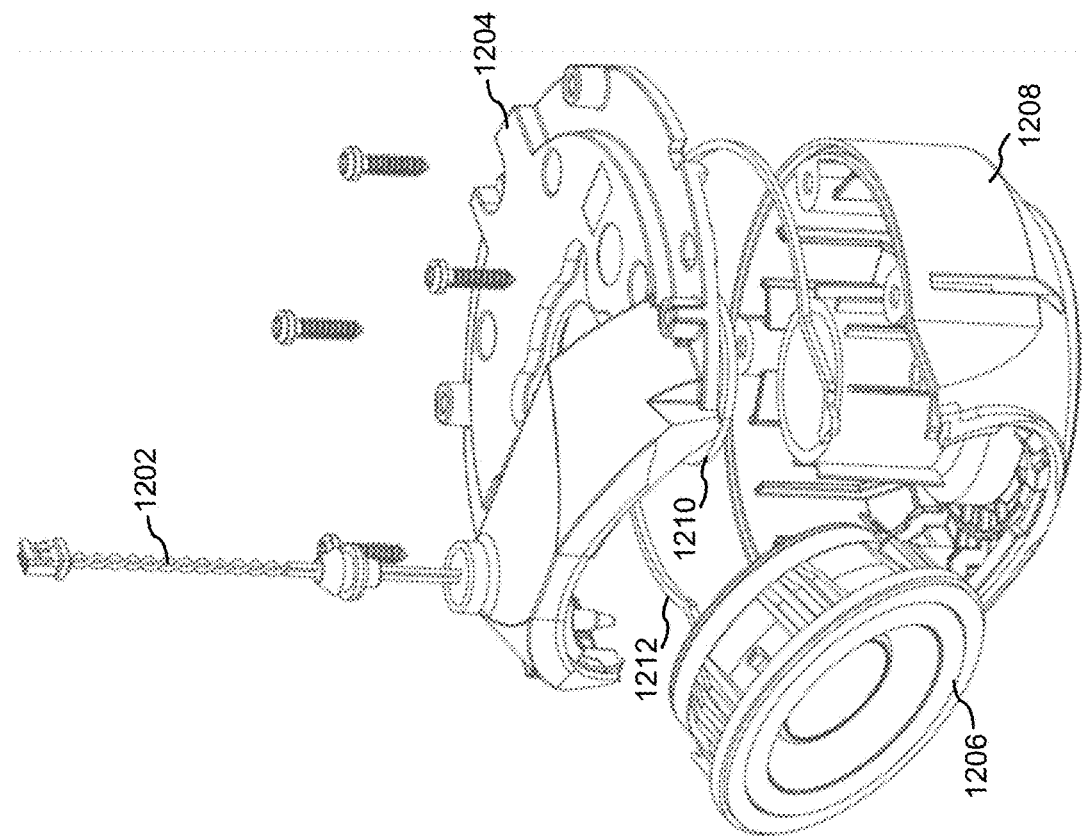
FIGS. 12A-12B are component views illustrating a representative speaker assembly in accordance with some implementations.
Figure 12A:
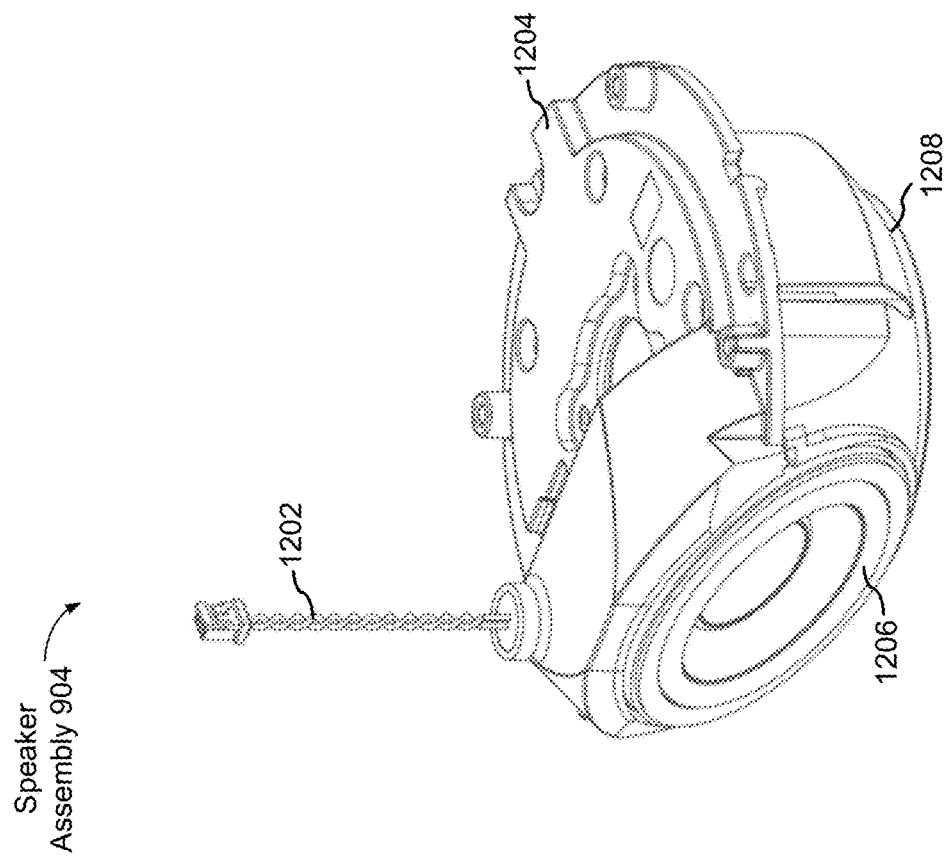

FIGS. 12A-12B are component views illustrating the speaker assembly 904 in accordance with some implementations. As shown in FIGS. 12A-12B, the speaker assembly 904 includes a connector 1202, a speaker lid 1204, a speaker base 1208, a speaker driver 1206, and gaskets 1210, 1212. In some implementations, the connector 1202 provides power to the speaker assembly and/or communicatively-couples the speaker assembly to the main board 1016 (e.g., the SoC 1322). In some implementations, the speaker lid 1204 is composed of a thermally-conductive material (e.g., metal). In some implementations, the speaker lid 1204 is configured to couple to, and dissipate heat from, the main board 1016. In some implementations, the speaker base 1208 is composed of a thermally-insulating material (e.g., plastic).

In some implementations, the speaker driver 1206 includes a speaker membrane. In some implementations, the speaker membrane is configured to enable air to flow from an interior of the camera assembly 118 to the environment. For example, the speaker membrane is configured to equalize internal and external pressure of the camera assembly by enabling the release of air through the speaker apertures 712. In some implementations, the speaker membrane is configured to acoustically- and hermetically-seal the speaker assembly 904.

In some implementations, the speaker driver 1206 includes a waterproof membrane configured to inhibit water from entering the speaker box 904 and/or an interior of the camera 118. In some implementations, the speaker lid 1204, speaker driver 1206, and speaker base 1208 are configured to couple together to acoustically- and hermetically-seal the speaker assembly 904. In some implementations, the gaskets 1210 and 1212 are configured to acoustically- and hermetically-seal the speaker assembly 904.

Figure 13B:
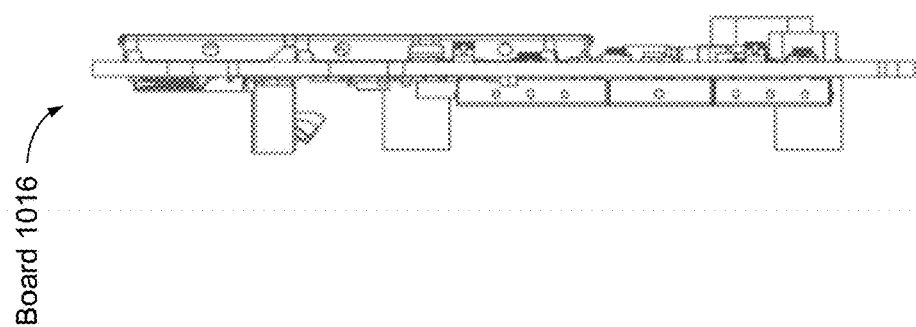
FIGS. 13A-13C are component views illustrating a representative circuit board assembly in accordance with some implementations.
Figure 13A:
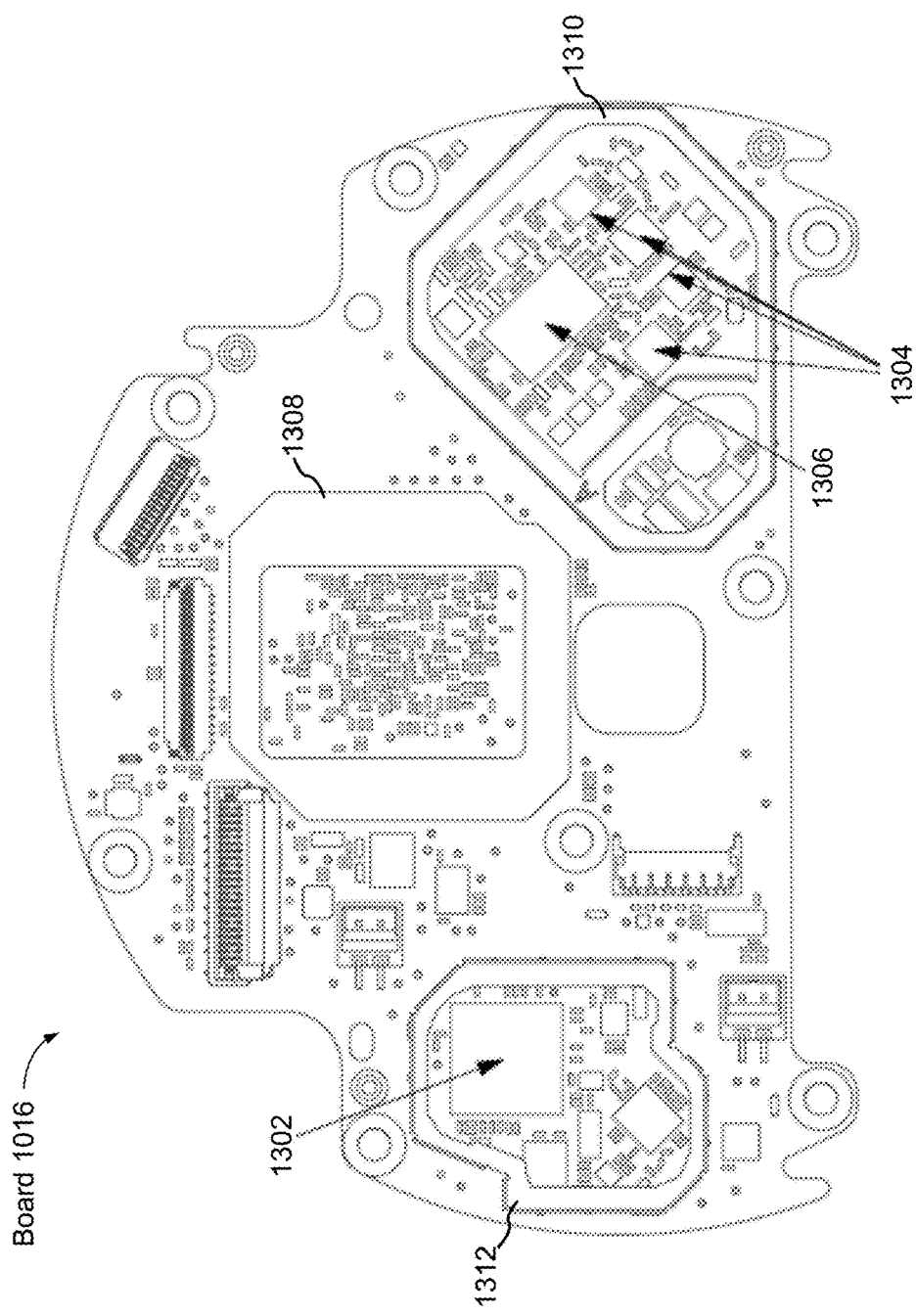
Figure 13C:
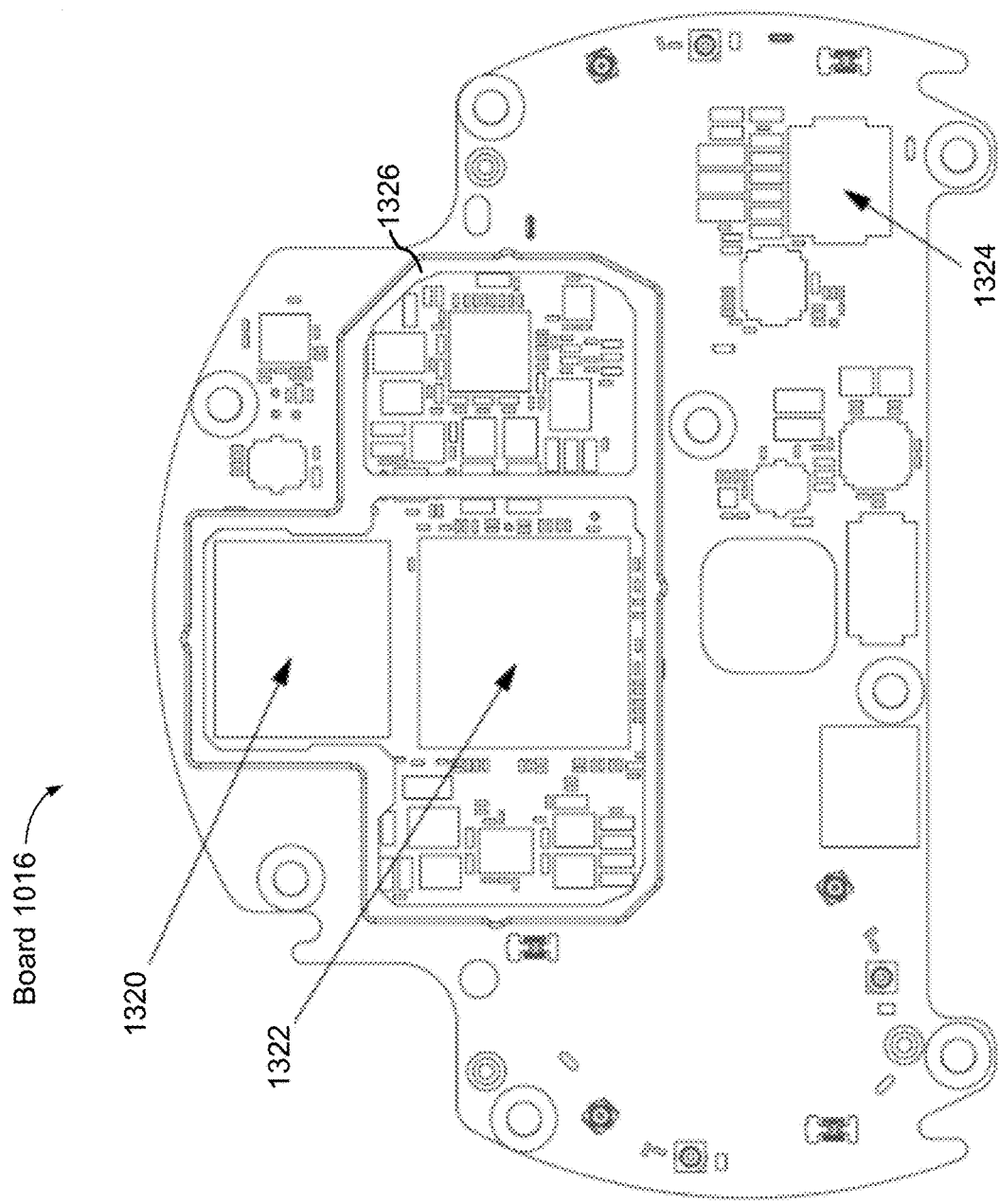

FIGS. 13A-13C are component views illustrating the main board 1016 assembly in accordance with some implementations. FIG. 13A shows a first side (e.g., a front-facing side) of the main board 1016, FIG. 13B shows a profile view of the main board, and FIG. 13C shows a second side of the main board (e.g., a rear-facing side).

As shown in FIG. 13A, the first side includes a first radio 1302 (e.g., a BlueTooth-configured radio) with corresponding shielding 1302, a second radio 1306 (e.g., a WiFi-configured radio), radio memories 1304, shielding 1310 for the second radio 1306 and the radio memories 1304, and shielding 1308.

In some implementations, the radio 1302 and/or the radio 1306 is configured for broadband (e.g., Wi-Fi, cellular, etc.) communications. In some implementations, the radio 1302 and/or the radio 1306 is configured for point-to-point (e.g., Bluetooth) communications. In some implementations, the radio 1302 and/or the radio 1306 is configured for mesh networking (e.g., Thread, Zigbee, ZWave, IEEE 15.4, etc.) communications. The radios 1302, 1306 are coupled to the antennas of the antenna ring 1024.

In some implementations, the main board 1016 also includes a connector for communicatively coupling the main board 1016 to the illuminator assembly 1036, a connector for communicatively coupling the main board 1016 to the image sensor assembly 902, a connector for communicatively coupling the main board 1016 to the connector 714, a connector for communicatively coupling the main board 1016 to the speaker assembly 904, and/or connectors for communicatively coupling the main board 1016 to the antenna ring 1024 (e.g., communicatively coupling the radios 1302 and 1306 to the antennas of the antenna ring). In some implementations, the connectors comprise flex connectors. For example, the connector for communicatively coupling the main board 1016 to the image sensor assembly 904 comprises a flex connector. In some implementations, the connectors for communicatively coupling the main board 1016 to the antennas of the antenna ring comprise spring connectors (e.g., spring finger connectors). In some implementations, the first side includes one or more connectors for communicatively-coupling with other components of the camera assembly 118 (e.g., for communicatively coupling with the image sensor assembly 902 and/or the illuminator assembly 1036). In some implementations, the first side includes one or more connectors (e.g., spring connectors) for communicatively-coupling the first radio 1302 and the second radio 1306 with the antenna ring 1024.

In some implementations, the shielding (e.g., shielding 1302, 1310, and/or 1308) comprises electromagnetic (EMI) shielding. In some implementations, the EMI shielding is composed of aluminum, stainless steel, and/or an aluminum alloy. In some implementations, each shielding is configured to enclose the components within the shielding. In some implementations, each shielding includes walls and a cover. In some implementations, a corresponding cover is configured to snap to the walls shown in FIGS. 13A and 13C.

In some implementations, the shielding is configured to minimize electromagnetic interference (e.g., from outside sources or between various components such as between the radios 1302 and 1306). In some implementations, the shielding is configured to substantially isolate the corresponding electrical components from sources outside of the shielding.

In some implementations, the first side of the main board 1016 is thermally-coupled to the main heatsink 1022. In some implementations, each shielding is configured to transfer heat from the enclosed components to the casing 711 (e.g., via the main heatsink 1022). In some implementations, each shielding is configured to inhibit signal interference between the enclosed components and components exterior to the shielding.

As shown in FIG. 13C, the second side of the main board 1016 includes the System-on-a-Chip (SoC) 1322, memory 1320 (e.g., including memory and a memory controller), shielding 1326 encasing the SoC 1322 and the memory 1320, and a power module 1324 (e.g., a power management integrated circuit (PMIC)). In some implementations, the shielding 1326 comprises electromagnetic (EMI) shielding. In some implementations, the shielding 1326 is composed of aluminum, stainless steel, and/or an aluminum alloy.

In some implementations, the second side of the main board 1016 is thermally-coupled to the speaker assembly 904. In some implementations, the shielding 1326 is configured to transfer heat from the SoC 1322 and the memory 1320 to the casing 711 (e.g., via the speaker lid 1204). In some implementations, the shielding 1326 is configured to inhibit signal interference between the SoC 1322 and the memory 1320 and components exterior to the shielding. In some implementations, the shielding 1326, is adapted to substantially prevent electromagnetic interference with the SoC 1322 and/or the memory controller 1320 from outside sources.

In some implementations, the top components encased in shielding (e.g., the SoC 1322 and/or the memory chip 1320) is coated with a thermal substance (e.g., a putty or paste) to dissipate heat from the component to the shielding. In some implementations, the thermal substance is in contact with the shielding after the shielding is affixed to main board 1016. Thus, the thermal substance transfers heat from the corresponding component (e.g., the SoC 1322) to the shielding (e.g., shielding 1326).

In accordance with some implementations, a camera assembly (e.g., camera assembly 118) for deployment in a smart home environment (e.g., smart home environment 100) comprises: (1) a housing (e.g., casing 711); (2) an image sensor encased in the housing and configured to capture activity of the smart home environment (e.g., an image sensor of image sensor assembly 902); (3) a wireless radio (e.g., radio 1302 and/or radio 1306) configured to transmit video frames captured by the image sensor to an electronic device via a remote server; (4) at least one infrared transmitter (e.g., IR illuminator 112) configured to selectively illuminate the smart home environment; (5) one or more circuit boards (e.g., main board 1016) encased in the housing, the one or more circuit boards including at least one processor mounted thereon; and (6) a heating component (e.g., the active heating module of the image sensor assembly 902) coupled to the image sensor, the heating component configured to continuously maintain the image sensor at a temperature above a threshold temperature while the image sensor is capturing the activity of the smart home environment.

In some implementations, the camera assembly further includes a plurality of thermally-conductive components (e.g., the main heatsink 1022 and the thermal material 1018) configured to passively conduct heat from the one or more circuit boards to the housing. In some implementations, the plurality of thermally-conductive components comprises one or more components composed of metal. In some implementations, the plurality of thermally-conductive components comprises one or more thermal pastes (e.g., the thermal material 1018). In some implementations, the heating component is connected to a metal clasp (e.g., sensor heatsink 1026) holding the image sensor to a front face of the camera assembly. In some implementations, the heating component is in contact with the image sensor.

In some implementations, an electronic assembly includes: (1) a housing (e.g., casing 711); (2) a temperature-sensitive component encased in the housing, the temperature-sensitive component having an associated low-temperature operating threshold and high-temperature operating threshold; (3) a plurality of thermally-conductive components (e.g., sensor heatsink 1026 and front face 706) coupled to temperature-sensitive component, the plurality of thermally-conductive components configured to maintain the temperature-sensitive component at a temperature below the high-temperature operating threshold by passively conducting heat to the housing; and (4) a heating component (e.g., the active heating component of the image sensor assembly 902) coupled to the temperature-sensitive component, the heating component configured to maintain the temperature-sensitive component at a temperature above the low-temperature operating threshold by selectively heating the temperature-sensitive component.

In some implementations, the camera assembly further includes a plurality of thermally-conductive components coupled to the one or more circuit boards and the wireless radio (e.g., the main heatsink 1022 and the thermal material 1018), the plurality of thermally-conductive components configured to passively conduct heat from the one or more circuit boards and the wireless radio to the housing.

In some implementations, the camera assembly further includes a plurality of thermally-insulating components separating the one or more circuit boards and the wireless radio from the image sensor, the plurality of thermally-insulating components comprising one or more plastic components and one or more air gaps. In some implementations, the plurality of thermally-insulating components comprises one or more components composed of plastic. In some implementations, the plurality of thermally-insulating components comprises one or more air gaps.

In some implementations, the image sensor comprises a fixed focus image sensor. In some implementations, the image sensor comprises a 4 k sensor.

In some implementations, the camera assembly further includes: (1) a temperature sensor coupled to the image sensor; and (2) control circuitry configured to: (a) determine a temperature of the image sensor based on data from the temperature sensor; and (b) set an operating parameter of the heating component based on the determined temperature. In some implementations, the control circuitry is configured to optimize camera sharpness by maintaining the image sensor at temperatures above a threshold temperature. In some implementations, the control circuitry comprises the at least one processor and/or one or more controllers. In some implementations, the temperature sensor is in contact with the image sensor. In some implementations, the temperature sensor is connected to a same circuit board as the image sensor. In some implementations, the temperature sensor is connected to one of the one or more circuit boards (e.g., the main board 1016).

In some implementations: (1) the control circuitry is further configured to determine whether the temperature of the image sensor is less than a preset target temperature for the image sensor; and (2) setting the operating parameter of the heating component based on the determined temperature comprises: (a) initiating an active heat transfer from the heating component to the image sensor in accordance with a determination that the temperature of the image sensor is less than the preset target temperature; and (b) forgoing an active heat transfer from the heating component to the image sensor in accordance with a determination that the temperature of the image sensor is not less than the preset target temperature. In some implementations, the preset target temperature is in the middle of a band of optimal operating temperatures for the image sensor. In some implementations, the preset target temperature is a minimum optimal operating temperature for the image sensor (e.g., a minimum temperature that doesn't negatively impact a focus of the image sensor).

In some implementations, the control circuitry is further configured to manage operation of the one or more additional components so as to maintain the image sensor at temperatures below a high-temperature threshold, one or more additional components including one or more of: (1) a system-on-a-chip (e.g., SoC 1322); (2) a speaker assembly (e.g., speaker assembly 904); (3) a power conversion assembly; and (4) a communications assembly (e.g., antenna ring 1024 and/or radios 1302 and 1306). In some implementations, managing operation of the one or more additional components includes minimizing or restricting operation of the components in accordance with a determination that a temperature of the camera assembly exceeds a particular threshold temperature. In some implementations, the power conversion assembly is configured to convert AC power to DC power. In some implementations, the communications assembly comprises one or more wireless antennas and one or more wireless radios. In some implementations, the system-on-a-chip includes the control circuitry.

In some implementations: (1) the camera assembly further includes one or more additional components, including one or more of: (a) a system-on-a-chip (e.g., SoC 1322); (b) a speaker assembly (e.g., speaker assembly 904); (c) a power conversion assembly; and (d) a communications assembly; and (2) the plurality of thermally-conductive components are further configured to passively conduct heat from the one or more additional components to the housing. In some implementations, the plurality of thermally-conductive components is further configured to passively conduct heat away from the image sensor (e.g., the plurality of thermally-conductive components are thermally-isolated or thermally-insulated from the image sensor).

In some implementations, the camera assembly further includes a second plurality of thermally-conductive components coupled to the image sensor (e.g., the sensor heatsink 1026), the second plurality of thermally conductive components configured to passively conduct heat from the image sensor to a front face (e.g., front face 706) of the camera assembly. In some implementations, the front face comprises a concave face configured to reduce water and/or light interference on the front face. In some implementations, the front face is waterproof. In some implementations, the second plurality of thermally-conductive components is thermally-insulated from the first plurality of thermally-conductive components (e.g., via one or more air gaps).

In some implementations, the second plurality of thermally-conductive components is further configured to inhibit interference between the image sensor and one or more antennas of the camera assembly (e.g., the one or more antennas on the antenna ring 1024). In some implementations, the second plurality of thermally-conductive components comprises a metal shielding (e.g., the sensor heatsink 1026). In some implementations, the heating component comprises a heat sticker coupled to the metal shielding.

In some implementations, the camera assembly further includes one or more illuminators coupled to the second plurality of thermally-conductive components. In some implementations, the illuminators include one or more RGB LEDs (e.g., illuminator assembly 1036) and/or one or more IR LEDs (e.g., the IR illuminators 1112). In some implementations, the camera assembly further comprises a light guide configured to direct light from the LEDs to the scene (e.g., the light guide 1106).

In some implementations, the camera assembly further includes: (1) one or more illuminators (e.g., the IR illuminators 1112); and (2) one or more toroidal lens (e.g., the lenses 1110) configured to disperse light from one or more illuminators to a scene in a field of view of the camera assembly.

In some implementations, the housing includes one or more microphone holes (e.g., the apertures 708, 710, and 713), and the camera assembly further comprises: (1) one or more microphones (e.g., the microphones 1114 and 1008) coupled to the one or more microphone holes; and (2) one or more membranes (e.g., the membrane 1006) separating the one or more microphones from the one or more microphone holes, the one or more membranes configured to prevent water from entering an interior of the housing. In some implementations, at least one of the membranes is further configured to equalize internal and external air pressure of the camera assembly. In some implementations, the one or more membranes are configured to inhibit water entry by maintaining a higher pressure inside the camera assembly than the external pressure of the environs. In some implementations, the membranes (e.g., the microphone membrane 1006 and/or the speaker membrane) are configured to prevent water flow into an interior of the camera assembly when the camera assembly is washed or sprayed with a hose.

In some implementations, the housing includes one or more speaker holes (e.g., the speaker apertures 712), and the camera assembly further comprises: (1) one or more speakers (e.g., the speaker assembly 904 with the speaker driver 1206) coupled to the one or more speaker holes; and (2) one or more membranes separating the one or more speakers from the one or more speaker holes, the one or more membranes configured to (a) prevent water from entering an interior of the housing and (b) equalize internal and external air pressure.

In some implementations, the camera assembly further includes a speaker assembly (e.g., the speaker assembly 904), wherein the speaker assembly is hermetically-sealed. In some implementations, the speaker assembly is composed of metal and plastic. In some implementations, the speaker assembly is acoustically-sealed.

In some implementations, the camera assembly further includes a plurality of antennas coupled to the one or more circuit boards via an antenna ring (e.g., the antenna ring 1024). In some implementations, the antenna ring is configured to electrically ground the antennas. In some implementations, the antennas of the plurality of antennas are equidistance from one another. In some implementations, the antenna ring is configured to encircle the image sensor assembly (e.g., the image sensor assembly 902).

In some implementations, the camera assembly further includes a board coupled to the antenna ring (e.g., illuminator assembly 1036) and configured to reduce interference between antennas of the plurality of antennas. In some implementations, the board includes a plurality of metal clips (e.g., the connectors 1037) that contact the antenna ring at locations between each of the plurality of antennas.

In accordance with some implementations, a method is performed at a camera assembly (e.g., the camera assembly 118) that includes a housing (e.g., the casing 711) encasing an image sensor, a wireless radio (e.g., the radio 1302 or the radio 1306), and one or more circuit boards. The method includes: (1) capturing activity of a smart home environment via the image sensor; (2) transmitting video frames captured by the image sensor to a remote server via the wireless radio; (3) passively conducting heat from the one or more circuit boards and the wireless radio to the housing via a first plurality of thermally-conductive components of the camera assembly; and (4) while capturing the activity of the smart home environment: (a) monitoring a temperature of the image sensor; and (b) selectively heating the image sensor to maintain the image sensor at temperatures above a threshold temperature during operation of the image sensor.

In accordance with some implementations, the camera assembly 118 is adapted for outdoor use in a smart home environment. In some implementations, the camera assembly 118 comprises: the housing 711; an image sensor assembly 902 positioned within the housing and having a field of view corresponding to a scene in the smart home environment; and the concave-shaped front face 706 positioned in front of the image sensor such that light from the scene passes through the front face prior to entering the image sensor. In some implementations, the front face 706 includes: an inner section 707 corresponding to the image sensor; and an outer section 709 between the housing and the inner section, the outer section having a concave shape. In some implementations, the front face 706 is configured to inhibit water accumulation on the front face while the camera assembly is oriented in a downward position. In some implementations, the concave shape promotes water dripping from the housing in front of the front face, rather than accumulating on and rolling down the front face (e.g., when the front face is facing toward the ground).

In some implementations, the configuration of the housing and the front face is further configured to inhibit direct sunlight from entering the image sensor. In some implementations, the housing and the front face are symmetrical around a central axis. In some implementations, the front face is further configured to inhibit water entry into the camera assembly. In some implementations, the front face includes the sealing ring 1040 that prevents water entry while the front face is connected to the housing 711.

In some implementations, the inner section 707 is substantially flat. In some implementations, the outer section 709 is composed of a plastic; and the inner section 707 is composed of a glass. In some implementations, both sections are glass and/or plastic. In some implementations, the inner section is bonded to the outer section via a waterproof adhesive.

In some implementations, the inner section is separated from the outer section by a bounding component, the bounding component configured to inhibit transmission of light from the outer section to the inner section. In some implementations, the camera assembly further includes an anti-reflection coating applied to the front face 706. In some implementations, the anti-reflection coating is applied to an inner surface of the front face.

In some implementations, the camera assembly 118 further comprising one or more infrared (IR) illuminators 1112 configured to selectively illuminate the scene. In some implementations, the front face 706 is positioned in front of the one or more IR illuminators 1112 such that light from the one or more IR illuminators is directed through the front face.

In some implementations, the inner section 707 is substantially transparent to IR and visible light; and at least a portion of the outer section 709 is coated with a thin film that is substantially transparent to IR light and substantially opaque to visible light.

In some implementations, the one or more IR illuminators 1112 are configured to emit a particular wavelength of IR light (e.g., 850 nm); and at least a portion of the outer section 709 of the front face is coated with a thin film that is substantially transparent to the particular wavelength of IR light and substantially opaque to visible light.

In some implementations, the camera assembly further includes a mounting assembly (e.g., sensor heatsink 1026) configured to thermally couple the image sensor to the front face such that heat from the image sensor is dissipated to the front face.

In some implementations, the camera assembly further includes a visible illuminator (e.g., on the illuminator assembly 1036) configured to convey status information of the camera assembly to a user; and the front face is positioned in front of the visible illuminator such that light from the visible illuminator is directed through the outer section. In some implementations, the outer section includes a portion corresponding the visible illuminator, the portion being at least semi-transparent to visible light.

In some implementations, the camera assembly further includes an ambient light sensor configured to detect ambient light corresponding to the scene; and the front face is positioned in front of the ambient light sensor such that light from the scene passes through the outer section prior to entering the ambient light sensor. In some implementations, the outer section includes a portion corresponding the ambient light sensor, the portion being at least semi-transparent to visible light.

Although the implementations are described as including particular numbers of components (e.g., 3 microphones, 3 antennas, 2 IR illuminators, etc.), these numbers are not intended to be limiting. The number of these components is optionally varied, from zero or one to many (e.g., 4, 6, or 10) in different implementations, as would be apparent to one skilled in the art based on technical, aesthetic, and/or budgetary requirements and/or preferences.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A camera assembly for deployment in a smart home environment, comprising:
    a housing;
    an image sensor encased in the housing and configured to capture activity of the smart home environment;
    a wireless radio configured to transmit video frames captured by the image sensor to an electronic device via a remote server;
    at least one infrared transmitter configured to selectively illuminate the smart home environment;
    one or more circuit boards encased in the housing, the one or more circuit boards including at least one processor mounted thereon; and
    a heating component, directly or indirectly, physically coupled to the image sensor, the heating component configured to continuously maintain the image sensor at a temperature above a threshold temperature while the image sensor is capturing the activity of the smart home environment;
    wherein the heating component is attached to a sensor heatsink coupled to the image sensor, is affixed to an image sensor board associated with the image sensor, or is disposed directly in contact with the image sensor.

2. The camera assembly of claim 1, wherein the image sensor comprises a fixed focus image sensor.

3. The camera assembly of claim 1, further comprising:
    one or more illuminators; and
    one or more toroidal lens configured to disperse light from one or more illuminators to a scene in a field of view of the camera assembly.

4. The camera assembly of claim 1, wherein the housing includes one or more speaker holes, further comprising:
    one or more speakers coupled to the one or more speaker holes; and
    one or more membranes separating the one or more speakers from the one or more speaker holes, the one or more membranes configured to (a) prevent water from entering an interior of the housing and (b) equalize internal and external air pressure.

5. The camera assembly of claim 1, further comprising a plurality of thermally-conductive components coupled to the one or more circuit boards and the wireless radio, the plurality of thermally-conductive components configured to passively conduct heat from the one or more circuit boards and the wireless radio to the housing.

6. A camera assembly for deployment in a smart home environment, comprising:
    a housing;
    an image sensor encased in the housing and configured to capture activity of the smart home environment;
    a wireless radio configured to transmit video frames captured by the image sensor to an electronic device via a remote server;
    at least one infrared transmitter configured to selectively illuminate the smart home environment;
    one or more circuit boards encased in the housing, the one or more circuit boards including at least one processor mounted thereon;

a heating component coupled to the image sensor, the heating component configured to continuously maintain the image sensor at a temperature above a threshold temperature while the image sensor is capturing the activity of the smart home environment; and a plurality of thermally-insulating components separating the one or more circuit boards and the wireless radio from the image sensor, the plurality of thermally-insulating components comprising one or more plastic components and one or more air gaps.

7. The camera assembly of claim 6, further comprising a plurality of thermally-conductive components coupled to the one or more circuit boards and the wireless radio, the plurality of thermally-conductive components configured to passively conduct heat from the one or more circuit boards and the wireless radio to the housing.

8. The camera assembly of claim 7, further comprising one or more additional components, including one or more of:
  a system-on-a-chip (SoC);
  a speaker assembly;
  a power conversion assembly; and
  a communications assembly; and
  wherein the plurality of thermally-conductive components are further configured to passively conduct heat from the one or more additional components to the housing.

9. The camera assembly of claim 7, wherein the plurality of thermally-conductive components are further configured to passively conduct heat away from the image sensor.

10. The camera assembly of claim 6, further comprising a second plurality of thermally-conductive components coupled to the image sensor, the second plurality of thermally-conductive components configured to passively conduct heat from the image sensor to a front face of the camera assembly.

11. The camera assembly of claim 10, wherein the second plurality of thermally-conductive components is further configured to inhibit interference between the image sensor and one or more antennas of the camera assembly.

12. The camera assembly of claim 10, further comprising one or more illuminators coupled to the second plurality of thermally-conductive components.

13. A camera assembly for deployment in a smart home environment, comprising:
  a housing;
  an image sensor encased in the housing and configured to capture activity of the smart home environment;
  a wireless radio configured to transmit video frames captured by the image sensor to an electronic device via a remote server;
  at least one infrared transmitter configured to selectively illuminate the smart home environment;
  one or more circuit boards encased in the housing, the one or more circuit boards including at least one processor mounted thereon;
  a heating component coupled to the image sensor, the heating component configured to continuously maintain the image sensor at a temperature above a threshold temperature while the image sensor is capturing the activity of the smart home environment;
  a temperature sensor coupled to the image sensor; and
  control circuitry configured to:
    determine a temperature of the image sensor based on data from the temperature sensor; and
    set an operating parameter of the heating component based on the determined temperature.

14. The camera assembly of claim 13, wherein the control circuitry is further configured to determine whether the temperature of the image sensor is less than a preset target temperature for the image sensor; and
  wherein setting the operating parameter of the heating component based on the determined temperature comprises:
    initiating an active heat transfer from the heating component to the image sensor in accordance with a determination that the temperature of the image sensor is less than the preset target temperature; and
    forgoing an active heat transfer from the heating component to the image sensor in accordance with a determination that the temperature of the image sensor is not less than the preset target temperature.

15. The camera assembly of claim 13, wherein the housing includes one or more microphone holes, and the camera assembly further comprises:
  one or more microphones coupled to the one or more microphone holes; and
  one or more membranes separating the one or more microphones from the one or more microphone holes, the one or more membranes configured to prevent water from entering an interior of the housing.

16. The camera assembly of claim 15, wherein at least one of the membranes is further configured to equalize internal and external air pressure.

17. The camera assembly of claim 13, wherein the housing includes one or more speaker holes, and the camera assembly further comprises:
  one or more speakers coupled to the one or more speaker holes; and
  one or more membranes separating the one or more speakers from the one or more speaker holes, the one or more membranes configured to (a) prevent water from entering an interior of the housing and (b) equalize internal and external air pressure.

18. The camera assembly of claim 13, further comprising one or more additional components, wherein the one or more additional components include one or more of:
  a system-on-a-chip (SoC);
  a speaker assembly;
  a power conversion assembly; and
  a communications assembly; and
  wherein a plurality of thermally-conductive components is configured to passively conduct heat from the one or more additional components to the housing.

19. A camera assembly for deployment in a smart home environment, comprising:
  a housing;
  an image sensor encased in the housing and configured to capture activity of the smart home environment;
  a wireless radio configured to transmit video frames captured by the image sensor to an electronic device via a remote server;
  at least one infrared transmitter configured to selectively illuminate the smart home environment;
  one or more circuit boards encased in the housing, the one or more circuit boards including at least one processor mounted thereon;
  a heating component coupled to the image sensor, the heating component configured to continuously maintain the image sensor at a temperature above a threshold temperature while the image sensor is capturing the activity of the smart home environment; and
  a plurality of antennas coupled to the one or more circuit boards via an antenna ring.

20. The camera assembly of claim 19, further comprising a board coupled to the antenna ring and configured to reduce interference between antennas of the plurality of antennas.

21. The camera assembly of claim 19, further comprising a plurality of thermally-conductive components coupled to the one or more circuit boards and the wireless radio, the plurality of thermally-conductive components configured to passively conduct heat from the one or more circuit boards and the wireless radio to the housing.

22. The camera assembly of claim 19, wherein a plurality of thermally-conductive components is configured to passively conduct heat away from the image sensor.

23. The camera assembly of claim 19, wherein the housing includes one or more microphone holes, and the camera assembly further comprises:
  one or more microphones coupled to the one or more microphone holes; and
  one or more membranes separating the one or more microphones from the one or more microphone holes, the one or more membranes configured to prevent water from entering an interior of the housing.

24. The camera assembly of claim 23, wherein at least one of the membranes is further configured to equalize internal and external air pressure.

25. A method, comprising:
  at a camera assembly comprising a housing encasing an image sensor, a heating component, a wireless radio, and one or more circuit boards:
    capturing activity of a smart home environment via the image sensor;
    transmitting video frames captured by the image sensor to a remote server via the wireless radio;
    passively conducting heat from the one or more circuit boards and the wireless radio to the housing via a first plurality of thermally-conductive components of the camera assembly; and
    while capturing the activity of the smart home environment:
      monitoring a temperature of the image sensor; and
      selectively heating the image sensor by the heating component to maintain the image sensor at temperatures above a threshold temperature during operation of the image sensor, wherein the heating component is, directly or indirectly, physically coupled to the image sensor;
  wherein the heating component is attached to a sensor heatsink coupled to the image sensor, is affixed to an image sensor board associated with the image sensor, or is disposed directly in contact with the image sensor.

26. The method of claim 25, further comprising passively conducting heat from the image sensor to a front face of the camera assembly via a second plurality of thermally-conductive components.

27. The method of claim 25, further comprising selectively illuminating a scene within a field of view of the camera assembly via one or more illuminators of the camera assembly.

28. The method of claim 25, wherein the camera assembly further comprises:
  one or more illuminators; and
  one or more toroidal lens configured to disperse light from one or more illuminators to a scene in a field of view of the camera assembly.

29. The method of claim 25, wherein the housing includes one or more speaker holes, and the camera assembly further comprises:
  one or more speakers coupled to the one or more speaker holes; and
  one or more membranes separating the one or more speakers from the one or more speaker holes, the one or more membranes configured to (a) prevent water from entering an interior of the housing and (b) equalize internal and external air pressure.

30. The method of claim 25, wherein the camera assembly further comprises a plurality of thermally-conductive components coupled to the image sensor, and the plurality of thermally-conductive components is configured to passively conduct heat from the image sensor to a front face of the camera assembly.

* * * * *

UNITED STATES PATENT AND TRADEMARK OFFICE
CERTIFICATE OF CORRECTION

PATENT NO. : 10,602,035 B2  
APPLICATION NO. : 15/793908  
DATED : March 24, 2020  
INVENTOR(S) : Rukes et al.

Page 1 of 1

It is certified that error appears in the above-identified patent and that said Letters Patent is hereby corrected as shown below:

In the Claims

Claim 8, Column 55, Lines 24-25, please delete "components are further" and insert --components is further--;

Claim 9, Column 55, Line 29, please delete "components are further" and insert --components is further--.

Signed and Sealed this  
Ninth Day of June, 2020

Andrei Iancu  
*Director of the United States Patent and Trademark Office*